Feb. 23, 1965 — R. F. POST — 3,170,841
PYROTRON THERMONUCLEAR REACTOR AND PROCESS
Filed July 14, 1954 — 9 Sheets-Sheet 1
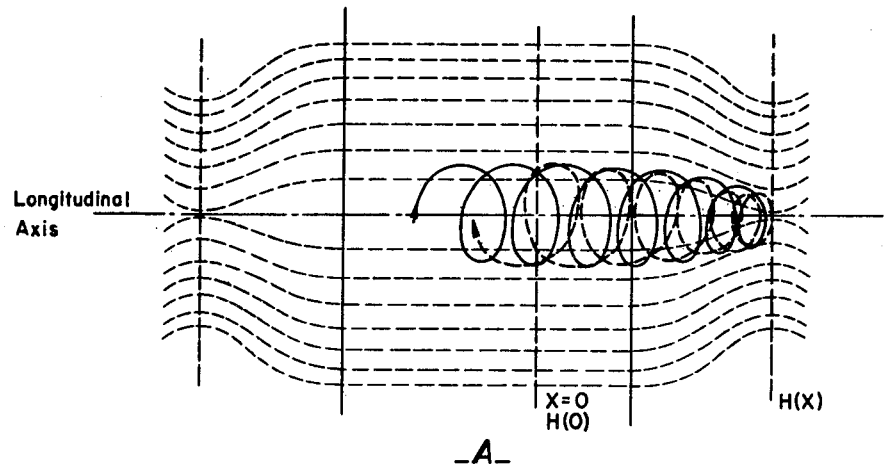
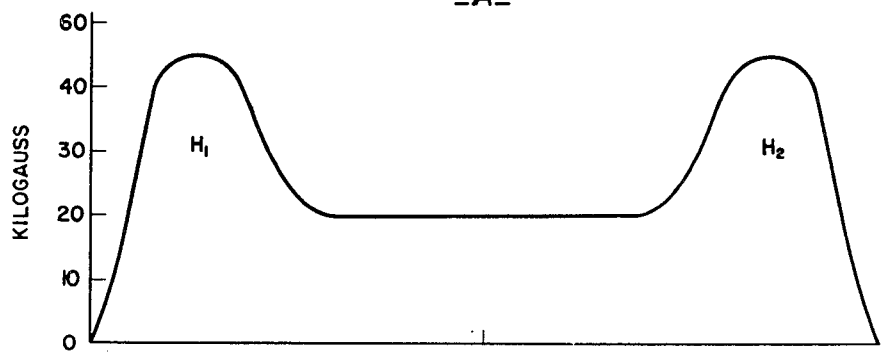
Fig. 1.
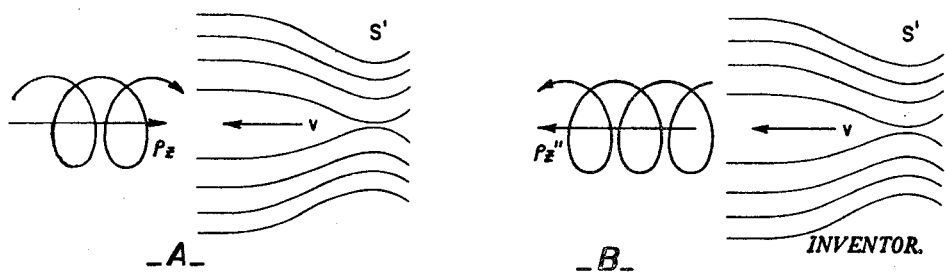
Fig. 12.
INVENTOR.
RICHARD F. POST
BY
ATTORNEY.

Feb. 23, 1965 R. F. POST 3,170,841
PYROTRON THERMONUCLEAR REACTOR AND PROCESS
Filed July 14, 1954 9 Sheets-Sheet 2
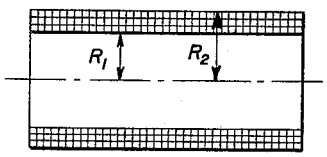
*Fig.17.*
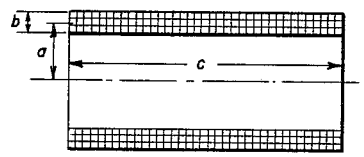
*Fig.20.*
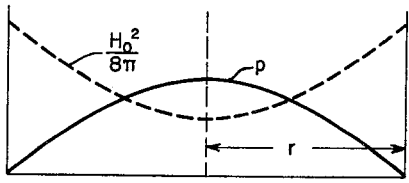
*Fig.15.*
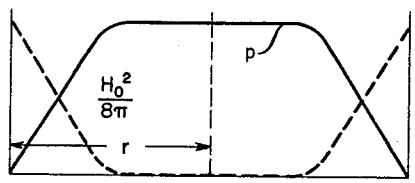
*Fig.16.*
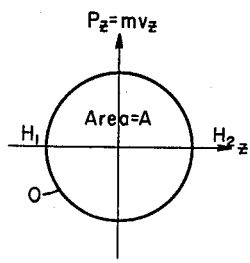
*Fig.10_A_*
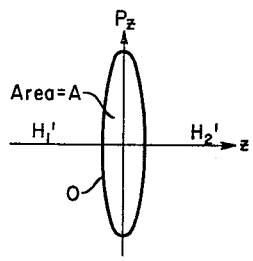
*Fig.10_B_*
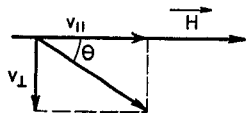
*Fig.2.*
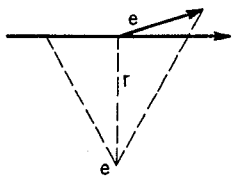
*Fig.13.*
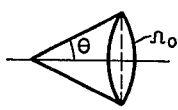
*Fig.3.*
INVENTOR.
RICHARD F. POST
BY
ATTORNEY.

Feb. 23, 1965  R. F. POST  3,170,841
PYROTRON THERMONUCLEAR REACTOR AND PROCESS
Filed July 14, 1954  9 Sheets-Sheet 3
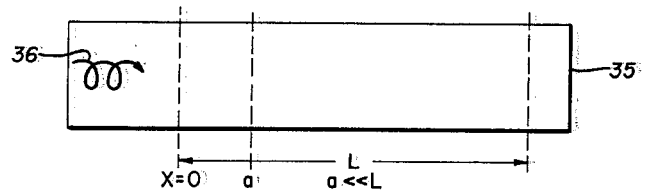
_A_
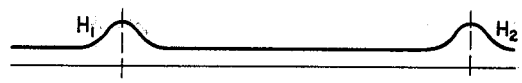
_B_
*Fig. 4.*
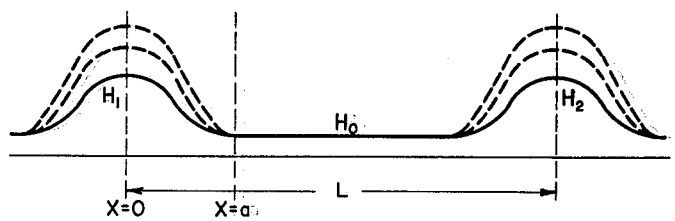
*Fig. 6.*
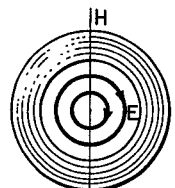
*Fig. 8.*
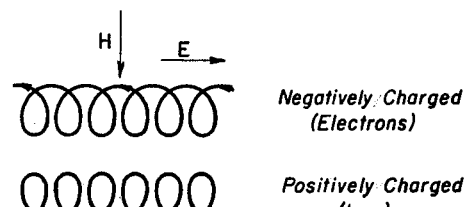
*Fig. 7.*
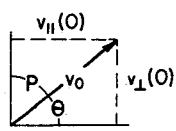
*Fig. 5.*
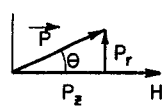
*Fig. 11.*
INVENTOR.
RICHARD F. POST
BY
ATTORNEY.

Feb. 23, 1965 — R. F. POST — 3,170,841
PYROTRON THERMONUCLEAR REACTOR AND PROCESS
Filed July 14, 1954 — 9 Sheets-Sheet 4
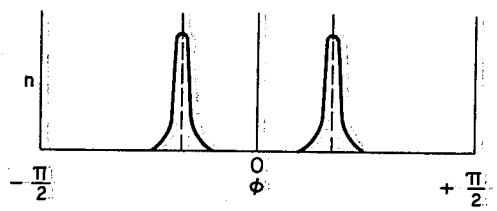
_A_
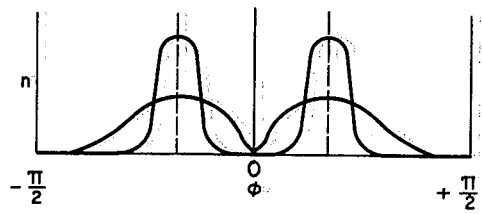
_B_
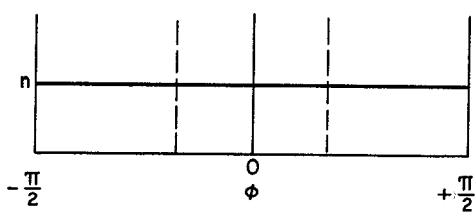
_C_
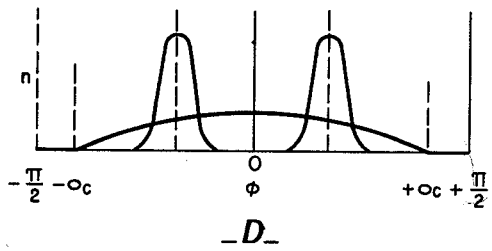
_D_
Fig.14.
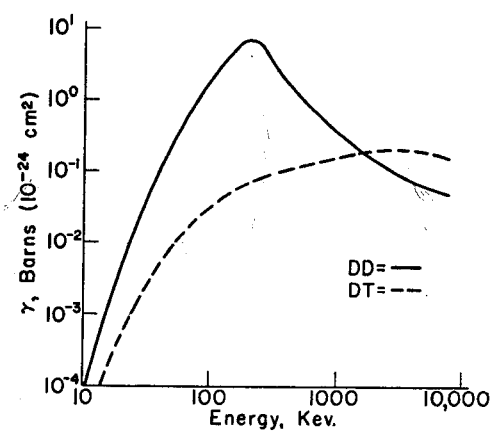
Fig.9.
INVENTOR.
RICHARD F. POST
BY
ATTORNEY.

Feb. 23, 1965 R. F. POST 3,170,841
PYROTRON THERMONUCLEAR REACTOR AND PROCESS
Filed July 14, 1954 9 Sheets-Sheet 6
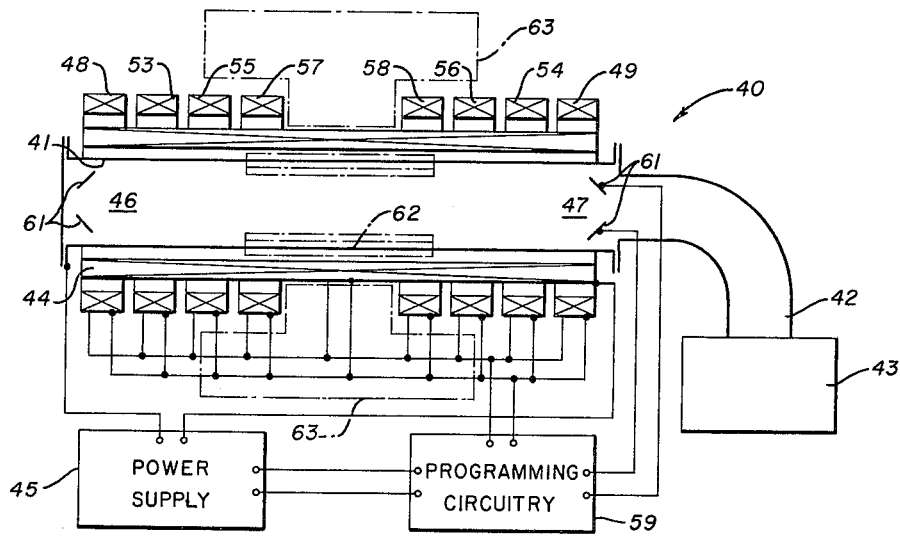
*Fig. 21.*
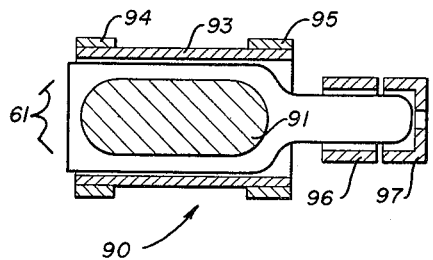
*Fig. 23_A_*
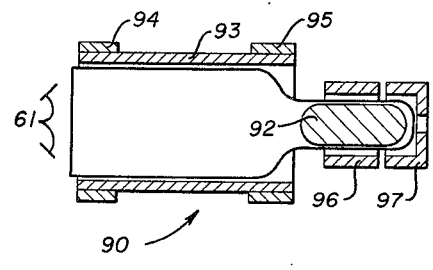
*Fig. 24_A_*
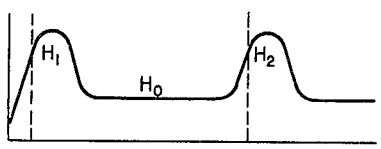
*Fig. 23_B_*
*Fig. 24_B_*
INVENTOR.
RICHARD F. POST
BY
ATTORNEY.

INVENTOR.
RICHARD F. POST
BY

ATTORNEY.

Feb. 23, 1965 R. F. POST 3,170,841
PYROTRON THERMONUCLEAR REACTOR AND PROCESS
Filed July 14, 1954 9 Sheets-Sheet 9
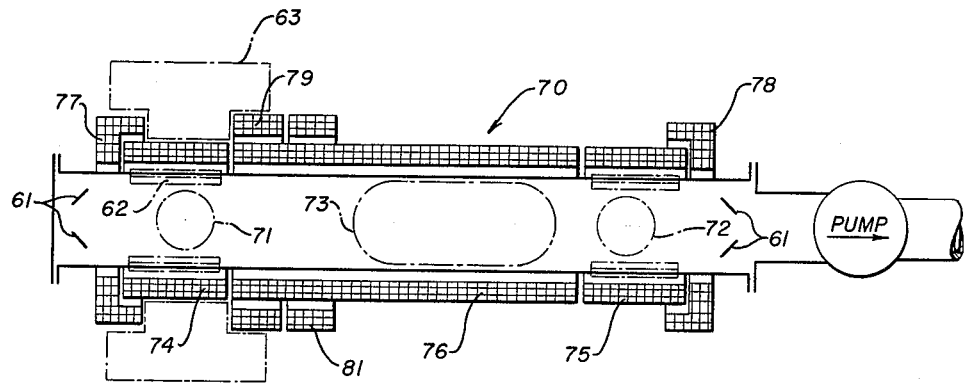
—A—
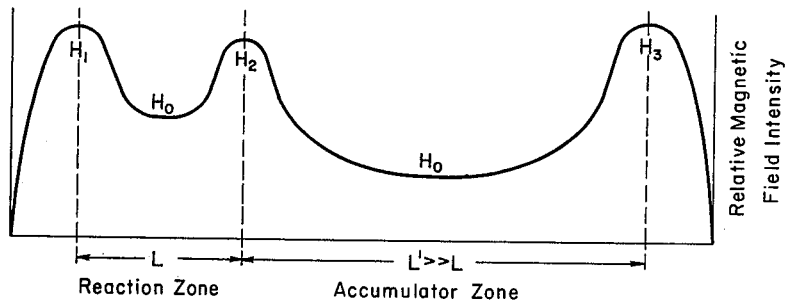
—B—
*Fig. 22.*
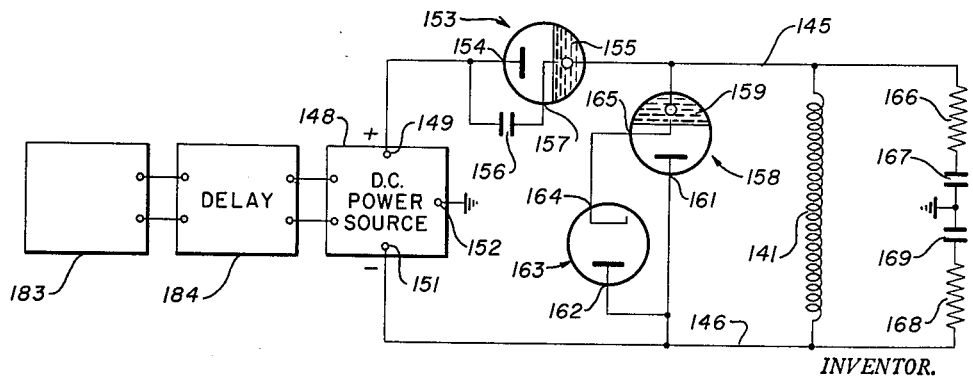
*Fig. 28.*
INVENTOR.
RICHARD F. POST
BY
ATTORNEY.

United States Patent Office 3,170,841
Patented Feb. 23, 1965

3,170,841
PYROTRON THERMONUCLEAR REACTOR
AND PROCESS
Richard F. Post, Walnut Creek, Calif., assignor to the
United States of America as represented by the United
States Atomic Energy Commission
Filed July 14, 1954, Ser. No. 443,447
30 Claims. (Cl. 176—5)

The present invention relates generally to the thermonuclear field, i.e., to that class of nuclear reactions which occur at very highly elevated temperatures and with corresponding confinement pressures. More particularly, the invention relates to methods and apparatus for conducting controlled thermonuclear reactions, whereby manifold utilitarian purposes may be served.

Speculation as to the possibility of conducting terrestial thermonuclear reactions had its beginning with the original proposal of Atkinson and Houtermans (Zeit. f. Phys. 54, 656 (1928)) that the source of stellar energy was thermonuclear. A few early suggestions considered the use of high-energy discharge methods or some modification thereof. However, no proposal of demonstrable feasibility appears in the literature.

With reference to nuclear reactions, generally, it may be noted that nuclear chain fission reactions of certain heavy isotopes, wherein neutrons are the fission-inducing agents which neutrons are reproduced in excess of those initiating the reaction, are more or less self-propagating when merely a proper geometrical critical mass arrangement of components is provided. Thermonuclear reactions on the other hand are more nearly like temperature-induced chemical reactions than are the nuclear chain reactions, in that a volume element of reactant material must be heated to a high temperature and, in order that the reaction be sustained or be propagated, the reaction rate in this volume must be sufficient to balance the energy loss or be sufficient to heat neighboring volume elements, respectively. Otherwise, the reaction is quenched, i.e., the rate diminishes to zero.

Some analogies exist between the thermodynamics of chemical reactions and the thermodynamics of thermonuclear reactions. In chemical chain reactions, e.g., the ordinary reactions of chemistry, the activation energy is of the order of one volt which means that these reactions will proceed with great rapidity if the system is preheated to a few thousand degrees and in favorable circumstances, e.g., with appropriate catalysis, with much lower temperatures. Moreover, a considerable reaction rate which obeys certain statistical laws is permitted by the phenomena of penetration of the activation energy barrier, a phenomena which is very sensitive to temperature changes. As a consequence, many inorganic and a few organic chemical reactions proceed at such a rate, that, in ordinary reactions, the rate seems almost instantaneous, i.e., due to high reactant densities. With organic chemical reactions, generally, the rate is slow or almost non-existent, at room temperatures and increases markedly with increase in temperature. Chemical reactions involve only the outermost valence electrons of the reacting atoms which electrons are available with little difficulty and with relatively little repulsion permitting approach of reacting atoms at relatively low velocities.

On the other hand, the energy (related to the approach velocity) necessary to cause two nuclei to approach sufficiently close for thermonuclear fusion of the nuclei to occur is of the order of one Mev. (million electron volts). It is therefore extremely unlikely that such a reaction can be initiated by chemical energy means alone. The potential or coulomb barrier between nuclei which is due to the mutually repulsive positive charge residing thereon requires a great deal of energy to overcome and, moreover, the potential barrier between heavy nuclei is proportionally much greater than between light nuclei, i.e., those with fewer nuclear protons. However, quantum mechanical leakage, i.e., penetration, of these barriers may proceed to an appreciable degree at somewhat lower temperatures. Furthermore, studies, e.g., of thermonuclear fusion reactions in the stars, have shown that quantum mechanical barrier porosities effectively reduce the activation energy below the coulomb barrier energy. Therefore, kinetic temperatures (of the order of about $10^8$ to $10^9$ degrees Kelvin) equivalent to a few of tens of kilo-electron-volts (kev.) should, under appropriate circumstances and especially with certain light elements, be sufficient to initiate a thermonuclear reaction.

Under normal circumstances in a population of energetic particles at ordinary material densities the energies of the individual particle, i.e., the temperatures thereof, are represented by a "thermalized" or Maxwellian equilibrium distribution and the system is in radiation equilibrium. With such a system it is difficult to increase the temperature to the required degree since all of the particles present, e.g., neutral atoms, ions, electrons and photons must all be heated to a very high average temperature and in the face of all the loss processes to provide a sufficient number of particles with the energy necessary to initiate the reaction. The reaction system at the temperatures contemplated herein will comprise a tenuous system of highly ionized atoms and about an equivalent number, chargewise, of electrons, since all matter at these kinetic temperatures is essentially completely ionized. The system will not be in radiation equilibrium because of the tenuity thereof; therefore, heating of the plasma is more simple and the reaction more easily sustained. Throughout the description of the invention, the term plasma will be employed to designate such a tenuous system of highly-ionized atomic nuclei and the associated electrons, generically, with context relied upon to convey more specific meaning.

The controlled thermonuclear process of my invention basically contemplates the establishment of a plasma comprising appropriate thermonuclear reactants wherein the fuel ions have a high kinetic energy, the containment of such plasma by magnetic field means, introduction (injection( trappings an accumulation of energetic thermonuclear reactant particles (fuel ions) within the reaction zone, and heating, i.e., increasing the kinetic energy of the contained reactants, so as to promote, establish and/or maintain a thermonuclear reaction. It is further contemplated that such reaction will be employed to accomplish manifold purposes including the production of heat, power, energetic nuclear particles and the use of such particles for promoting nuclear reactions, with or without attendant production of heat and power, the direct conversion of the energy derived from the thermonuclear reaction into electrical energy, synthesis of isotopic species and others which will be apparent from the following description.

More particularly, in the process of my invention the thermonuclear reaction is conducted in a vacuum, i.e., a region from which extraneous neutral gaseous materials are evacuated to a sufficient degree to prevent interference with the progress of the reaction. Firstly, provision is made for the containment of the reaction plasma within such evacuated region by establishing therein a manipulated magnetic field, preferably, a magnetic field which is axially symmetric, i.e., one which is radially symmetric about an axis which is conveniently considered a longitudinal axis. Of prime importance for accomplishing the purposes of the invention, such magnetic field is provided in such a manner that the intensity of the magnetic field in longitudinally spaced regions or nodal regions is gradientially increased, while in the intervening space between these regions of increased magnetic intensity the field is of relatively lower intensity. A magnetic field, so provided, may be considered to establish a containment zone in which an energetic charged particle will be effectively retained for considerable periods. Such reaction zone being situated within the intervening space between the gradientially increased regions, whereby the contained particles describe helical paths more or less coaxially oriented or parallel with the longitudinal axis of the said magnetic field and are alternately reflected by the gradientially increased magnetic field regions. Such gradientially increased magnetic fields may, therefore, be considered to be terminal reflectors or closures of the containment zone while the central portions of the magnetic field provide radial closure. It will be understood that, in this region, charged particles of whatever origin or method of introduction and with energies within the capabilities of the magnetic containment means would be contained therein. Depending on the function being served such containment zone may be designated in the specification by other terms, the meaning of which will be apparent from context and such zones may be employed singly or in plurality as required for hereinafter disclosed methods of operation.

Secondly, provision is made for the introduction of thermonuclear fuel ions into the containment zone. Ions may be formed in situ therein or may be introduced and accumulated or collected within the containment zone from external sources by certain methods, the necessary features of which will be more fully described hereinafter. However, preferred methods of injection may be accomplished by utilizing external ion source means providing an accelerated space-charge neutralized beam of the fuel ions directed into appropriately determined locations of the magnetic field correlatively with hereinafter described manipulation of the positions and intensities of the aforesaid reflector regions. By virtue of these manipulative operations a plasma charge of the ionic fuel, preferably having an energy distribution skewed in favor of a high proportion of the more energetic components, is trapped and accumulated in the aforesaid reaction zone, whereby, as the density increases above a minimum value, thermonuclear fusion reactions may begin and proceed at an appreciable rate.

In this connection it may be noted that considerable energy can be imparted to the introduced fuel ions. While it is practicable to inject such particles with sufficient energy to immediately initiate the thermonuclear reaction (when adequate densification is achieved by injection), it is often preferred, at least initially, to inject the particles, as allowed by features of the present invention, at a lower temperature to be trapped and accumulated under conditions wherein losses and thermalization occur at materially reduced rates. Additional energy is later applied to elevate the temperature of these "preheated" particles to the reaction temperature and/or the plasma is densified, e.g., as by compression, to initiate, establish and/or promote the reaction. A very important consideration in selecting the ion source means employed in injecting the ionic fuel is that little extraneous gaseous material be simultaneously injected since these materials tend to unduly increase energy loss by "thermalizing" and radiative processes. Furthermore, it is desirable that the energy distribution of the particles contain few low energy (low temperature) groups, particularly groups which are considerably below preheat temperature, since the present method preserves, for a very appreciable time, these non-Maxwellian ionic temperature distributions, whereby the initiation and sustenance of the thermonuclear reaction is greatly facilitated.

Thirdly, provision is made for heating of the accumulated preheated charge by adiabatic compression obtained by increasing the intensity of the overall magnetic field favoring a sharper increase in the reflector regions and by causing such reflector field regions to move proximally along the longitudinal axis. The inward movement of the reflector regions and overall increase of magnetic field intensity of the containment zone produce both radial and axial compression of the plasma reactant charge. The attendant adiabatic heating of the preheated particles and the forcing of the reactant ions into a severely limited region establish the conditions requisite to the initiation and/or promotion of the thermonuclear reaction with such reaction then continuing with a tremendous exothermic release of energy and production of nuclear particles, utilizable as set forth hereinafter. Auxiliary heating methods may be employed therewith, e.g., radiofrequency electromagnetic radiation and especially microwaves may be applied at certain stages of the operation.

Appropriately, a fourth operation, i.e., decompression, is provided by manipulation of the magnetic field, whereby the plasma is allowed to expand after initiation, during and/or on completion of the reaction to obtain various beneficial effects. Such expansion may be employed to reduce and, therefore, regulate the rate of the reaction while in progress. As a prime feature, however, the decompression may be employed to convert the charged particle energy produced by the reaction and recover energy supplied to the magnetic field and particles on injection and compression, as will be described more fully hereinafter.

The invention also provides apparatus in which the processes of the invention may be conducted, such apparatus comprising, in general, means for establishing an evacuated spacial region, means for establishing the indicated magnetic fields within the evacuated region, means for supplying the electrical energizing currents for the said magnetizing means, said magnetizing means and/or electrical energization means comprehending further means for causing correlated movement of the reflector field regions and for correlating magnetic field intensities as required by hereinafter disclosed operational schemes, and thermonuclear fuel injection means. Accessory apparatus for utilizing the nuclear particles, heat, kinetic energy of the combustion products, other products and/or effects of the reaction are also provided. Continuous, pulsed, single phase, multiphase and cyclic modes of operation for accomplishing the foregoing are contemplated. Apparatus of the character disclosed herein is now identified by the generic term "Pyrotron."

Accordingly, it is an object to provide methods and apparatus for conducting controlled thermonuclear reactions.

Another object of the invention is to provide a process for conducting a thermonuclear reaction wherein the reaction zone is confined within a magnetic field which is characterized by displaying symmetry about an axis.

A further object of the invention is to provide methods and apparatus for conducting thermonuclear reactions wherein a magnetic field having general symmetry about a longitudinal axis is employed for radial confinement and longitudinally-spaced, gradientially-increased magnetic field regions thereof provide axial confinement of thermonuclear reactants the combination of said magnetic fields defining a thermonuclear containment zone centrally disposed about the axis thereof.

Still another object of the invention is to provide methods whereby ions with a high kinetic energy may be injected and trapped in a containment zone provided in an axially symmetric magnetic field having spaced gradientially intensified reflector field regions.

Another object of the invention contemplates the initiation and/or promotion of a thermonuclear reaction by providing densification and heating of a tenuous fuel plasma charge.

A very important object of the invention is to provide methods and apparatus for conducting a thermonuclear reaction wherein the field intensities of radial confining and gradientially increased magnetic reflector field regions are increased to produce compression of a thermonuclear fuel plasma contained therein.

A further object of prime importance is to provide methods and apparatus for conducting a thermonuclear reaction wherein longitudinally-spaced, gradientially-increased magnetic reflector field regions are caused to move proximally and/or together with magnetic field intensification to effect accumulation and compression of a contained plasma fuel charge.

Another important object of the invention is to provide methods and apparatus for introducing a thermonuclear fuel in a preheated ionic form in order to minimize certain difficulties of non-preheated fuel charges and in order to increase the effectiveness of subsequent heating to thermonuclear reaction temperatures.

Still another object of the invention is to provide operational schemes wherein the injection of thermonuclear fuel ions is correlated with predetermined variations of the magnetic fields so as to cause the introduced fuel to be trapped in a magnetically defined containment zone.

An extremely important object of the invention is to convert energy produced in the reaction and residing in energetic charged particles into electrical energy for use in an external electrical circuit.

Other objects of the invention relate to the production of heat, nuclear and other elemental particles, synthesis of elemental materials, and utilization of energetic neutrons and other utilitarian products of a thermonuclear reactor.

Still further objects of the invention relate to the use of a plurality of containment and/or reaction zones in mutually phased and correlated fashion to provide sustained operating characteristics and other advantageous features.

Still other objects of the invention relates to the provision of accessory equipment and methods of utilizing the various products and effects produced in controlled thermonuclear reactions.

Other objects and advantages of the invention will become apparent by consideration of the following description taken in conjunction with the accompanying drawings, of which:

FIGURE 1, portion (*a*), is an illustration of a particle path in a magnetic field containment zone provided in accordance with the invention and portion (*b*) is a graphical illustration of typical magnetic field intensity profile along the axis of said zone with portion (*b*) disposed in corresponding position beneath portion (*a*);

FIGURE 2 is a vectorial diagram indicating various relationships of particle velocities and magnetic field intensities employed in determining the angle of exclusion of particles from a reflector field;

FIGURE 3 is a diagram illustrating relationships employed in calculating the solid angle of particle loss through a reflector field;

Figure 18:
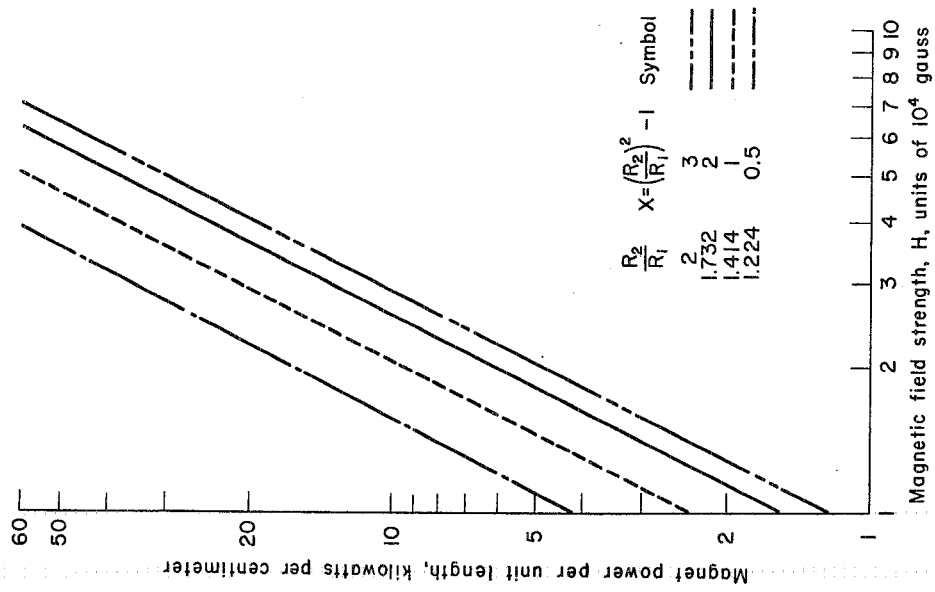
Figure 19:
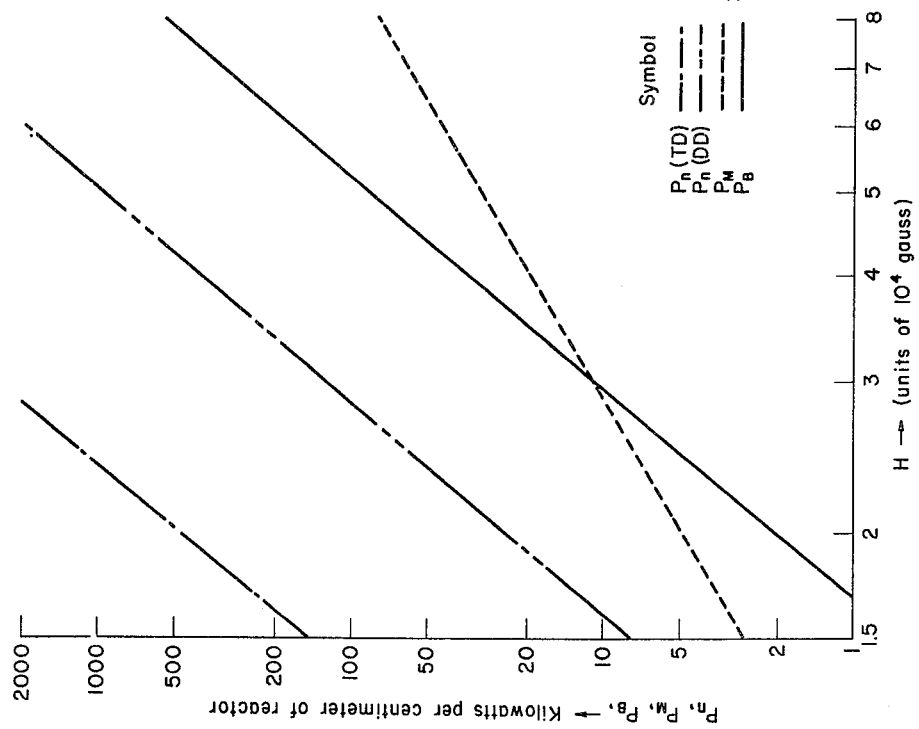

FIGURE 4, portion (*a*), schematically represents a containment zone and portion (*b*) is a graphical representation of a corresponding magnetic field intensity profile along the axis therein which profile is of importance in a preferred method of injecting and trapping an ionic fuel charge in the containment zone;

FIGURE 5 is a vectorial diagram of certain particle velocity relationships of importance in accomplishing injection, trapping and accumulation of an ionic fuel charge in the containment zone;

FIGURE 6 is a graphical illustration of the variation of magnetic reflector field intensity profiles as employed in a second preferred method for injecting an ionic fuel into the containment zone;

FIGURE 7 is an illustration of the relative motions of negatively and positively charged particles in crossed magnetic and electrostatic fields;

FIGURE 8 is an illustration of a radial cross section of the electrostatic field generated in an axially symmetric magnetic field which is varying in intensity as a function of time;

FIGURE 9 is a graphical representation of the variation in thermonuclear reaction cross section for certain hydrogen isotopes;

FIGURE 10A illustrates a typical particle orbit early in compression and FIGURE 10B illustrates a typical particle orbit later in compression, relevant to the compressive adiabatic heating process of the invention;

FIGURE 11 is a vectorial diagram of particle path relationships in a magnetic field;

FIGURE 12, portion (*a*), indicates relationships of a particle before reflection and portion (*b*) indicates the relationships of a particle after reflection by a magnetic reflector field, as utilized in a theoretical explanation of the reflection phenomena;

FIGURE 13 is an illustration of relationships employed in determining the collision times of particles in the containment zone;

FIGURE 14, portion (*a*), illustrates particle angular distributions immediately following a rapid compression cycle; portion (*b*) the distribution a short time later; portion (*c*) the distribution which would be obtained with no losses at the reflector fields; and portion (*d*) a comparison of early and late distributions, the latter being indicative of relative distributions when loss begins to increase seriously;

FIGURE 15 is a graphical illustration of a typical equilibrium density distribution of plasma particles across a diameter of the containment zone;

FIGURE 16 is a graphical illustration of possible magnetic field densities as distributed across a diameter of the containment zone;

FIGURE 17 illustrates dimensional relationships of a solenoidal coil structure relevant to calculation of losses therein;

FIGURE 18 graphically illustrates the electrical power per unit length required to energize a solenoid as a function of magnetic field intensity;

FIGURE 19 graphically illustrates typical values for thermonuclear power, $P_n$, bremsstrahlung loss, $P_B$, and magnet power, $P_M$ (at limiting densities), as a function of the centrally applied magnetic field in a thermonuclear reactor;

FIGURE 20 illustrates dimensional relationships of a solenoid which are employed in calculating the unperturbed energy storage of solenoids employed to establish the containment fields;

FIGURE 21 is a semi-diagrammatic illustration of basic components of a single-zone thermonuclear reactor suitable for conducting a thermonuclear reaction in accordance with the invention;

FIGURE 22, portion (*a*), is a semi-diagrammatic illustration of basic components of a multiple zone thermonuclear reactor, and portion (*b*) a graphical representation of the axial magnetic field intensity profile employed therein at a particular period in the cyclic operation;

FIGURE 23A is a semi-diagrammatic illustration of a reactor embodiment in which the final reaction zone is contained by fields produced by solenoids of a diameter small as compared to those employed in the accumulator zone and FIGURE 23B is a graphical illustration of the axial magnetic field intensity profile employed therein as during injection.

Figure 25:
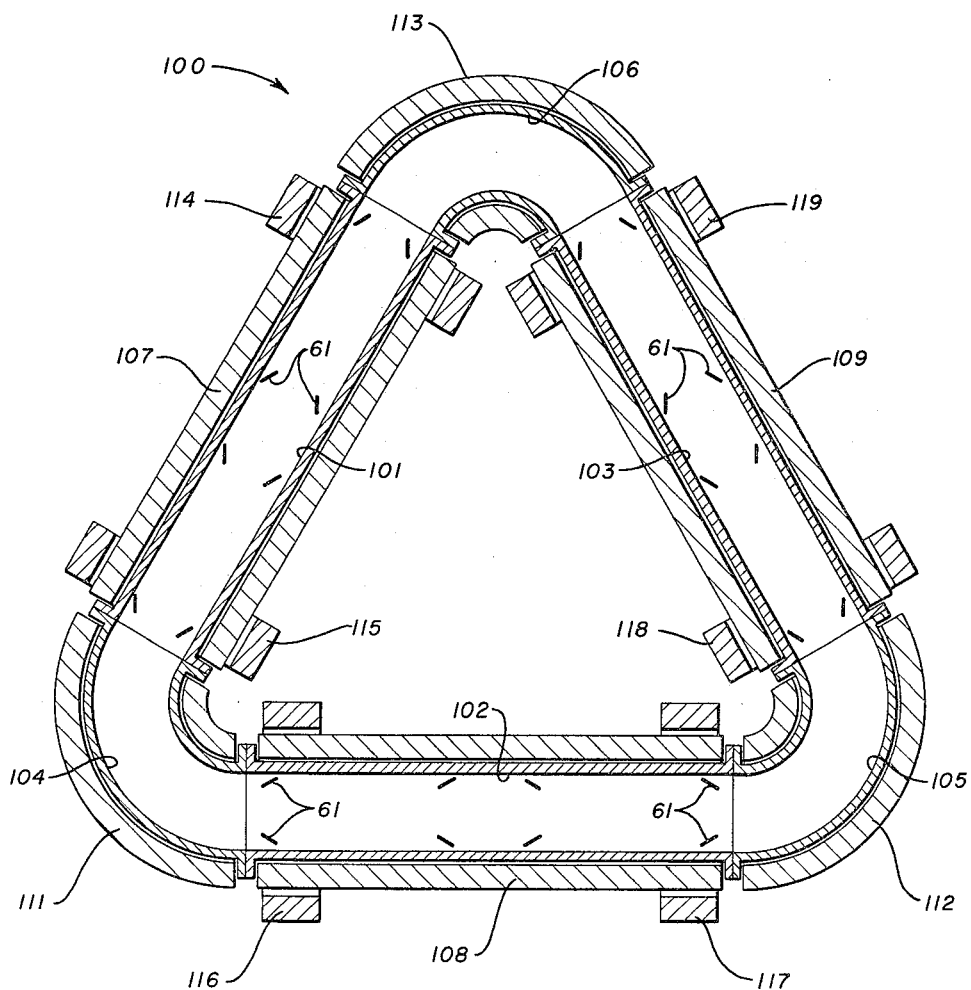
Figure 26:
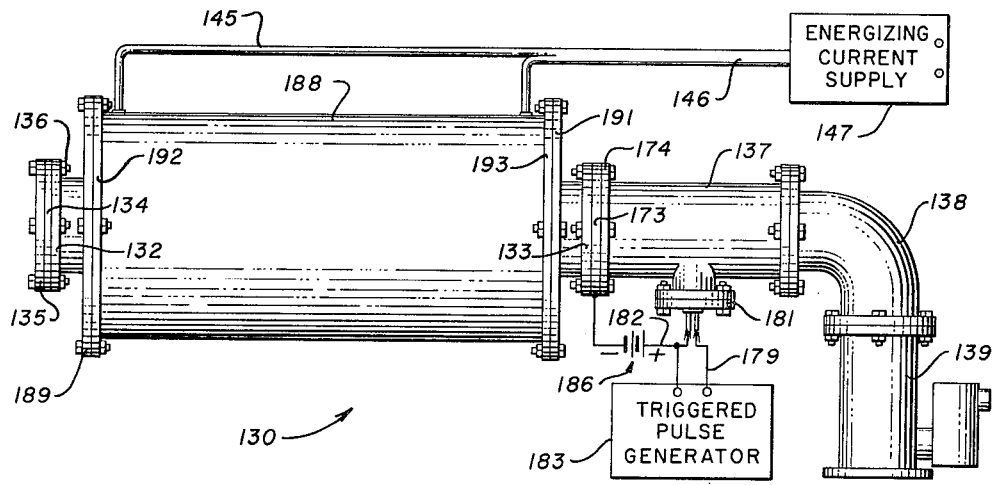
Figure 27:
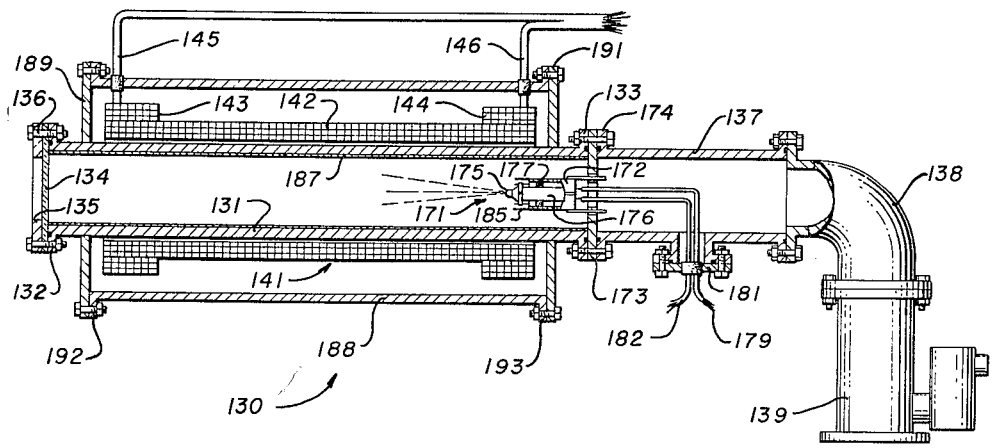

FIGURE 24A indicates the reactor of FIGURE 23, after compression, and FIGURE 24B is a graphical representation of the axial magnet field intensity profile as employed therein;

FIGURE 25 is a diagrammatic illustration of a multiple zone continuous closed loop thermonuclear reactor system;

FIGURE 26 is a side elevation of a single zone thermonuclear reactor in accordance with the invention;

FIGURE 27 is a vertical cross sectional view of the reactor of FIGURE 26; and

FIGURE 28 is a circuit wiring diagram employed with the reactor of FIGURE 26.

It will be of assistance to, at the outset, consider thermonuclear reaction and the nuclear processes which occur in such reactions. For a variety of practical and theoretical reasons it is considered that isotopes of hydrogen, especially deuterium, D, and tritium, T, are preferred fuels while other light elements and isotopes, e.g., $He^3$, Li, Be and others selected from the light nuclide portion of the mass defect curve, may also be employed either singly or in admixture. Moreover, a variety of such light elements as well as heavy elements, particularly fissionable materials including slow and fast neutron fissionable materials, may be employed in accessory or subsidiary manners to utilize products derived of the controlled thermonuclear reaction, e.g., as in fission, transmutation, fuel regeneration, and other nuclear processes. For the sake of brevity, illustrative reference will be made to reactions which occur with hydrogen isotopes and certain products which are derived therefrom; however, it will be understood that the teachings of the invention will apply equivalently to the other materials noted above.

The availability of deuterium in nature is sufficient to support a tremendous power output. While deuterium comprises only about 1 part in 5000 of terrestial hydrogen, the energy derivable from this amount of deuterium causes each gallon of water to be equivalent, energy-wise, to about 300 gallons of gasoline. Since there is about $10^{21}$ gallons of water on earth, this is equivalent to about $3 \times 10^{23}$ gallons of gasoline.

Estimates have established the total electrical power output from all world sources at about $10^5$ megawatts. If this rate were increased by a factor of $10^3$ (possible in a century) irreplaceable sources, such as the known fossil energy sources, would be exhausted in the relatively short time yet the deuterium supply would last indefinitely as shown by the following ideal efficiency estimative calculation:

$$10^8 \text{ megawatts} = 10^{14} \text{ joules/second}$$

and the deuterium supply, used at this rate, would last $$\frac{4.0 \times 10^{31}}{10^{14}} = 4.0 \times 10^{17} = \frac{4.0 \times 10^{17}}{3.1 \times 10^7} (\text{sec.}) = 1.3 \times 10^{10} \text{ years}$$

At a reasonable efficiency, the deuterium would supply this power for at least $10^9$ years, i.e., for a period of about equal to the age of the universe. A substantially eternal solution of the world's power supply problem would result from practical solution of conducting a controlled thermonuclear reaction with deuterium fuel.

Certain properties relevant to thermonuclear reactions and which will aid in comprehending the invention are now to be discussed. Primary and secondary reactions which deuterium is known to undergo are as follows:

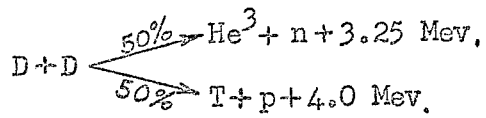

and

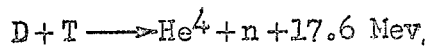

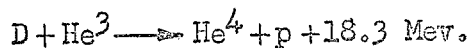

Whenever a D-D reaction occurs which produces a triton, T, the triton will almost immediately react with another deuteron. Also at the high $He^3$ energies which result from the reaction, the value of $\sigma$, the reaction cross-section, of the $D-H^3$ reaction becomes considerably larger than that of D-D and so that most of the $He^3$ will also burn promptly. It will be apparent therefrom that $He^3$ and T, either alone or in admixture with D, would be valuable fuels if available from exterior sources or produced regeneratively within the reactor.

Totaling up the yields, which are obtained in a D-D, thermonuclear reaction, there is obtained:

$$6D \rightarrow 2He^4 + 2p + 2n + 43.2 \text{ Mev.}$$

For comparison, note that if the T-D reaction alone is used, the yield for each triton or deuteron burned is

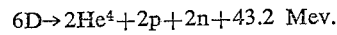

The division of kinetic energy between the products of the reactions is also of importance. Of this energy nearly all of that residing in the kinetic energy of the charged particles will remain in the containment zone while the energetic neutrons will, of course, depart from the system and, therefore, may be utilized externally of the containment zone to produce nuclear reactions as described hereinafter. For example, per deuteron reacting one obtains kinetic energies for charged ($W_c$) and neutral ($W_n$) particles;

$$W_c = \frac{7.1 + 17.7 + 1.7}{6} = 4.43 \text{ mev.}$$

$$W_n = \frac{16.55}{6} = 2.76 \text{ mev.}$$

Thus it is seen that, in general, more energy will appear in the form of kinetic energy of the charged particles than in the form of kinetic energy of the neutrons. It is therefore apparent that methods of efficiently recovering the charged particle energy would provide a major source of power. It is instructive to note that the calculated energy yield per gram of deuterium amounts to about $3.4 \times 10^{11}$ joules or about 3.5 times as much energy per unit weight as may be obtained from fissionable materials and without the production of large amounts of troublesome fission products.

The various operational steps of the process of the invention, viz., containment, injection, compression and decompression, described briefly above, will now be discussed, in detail, hereinafter.

CONTAINMENT

As disclosed above, the fuel comprising the thermonuclear reactant fuel charge is in the form of a "plasma," i.e., atomic species in a highly ionized gaseous state. Solid containment walls would either disintegrate or unduly cool the reactants; therefore in operating the process of the invention, magnetic fields are employed to contain the reactant charge. However, at an appropriate position exteriorly of the containment zone, solid material surfaces and structures may be employed to provide an evacuated spacial region in which is disposed such thermonuclear containment zone; likewise solid secondary reactants, heat transfer surfaces and the like may be disposed in close proximity about the magnetic containment zone to serve various purposes. For example, radiation-absorptive, heat transfer surfaces, thermonuclear fuel regeneration substances, target materials for nuclear transmutation, fissionable materials, subcritical neutron reactor assemblies, and the like, may be so disposed. While such magnetic fields may be manipulated to accomplish various purposes and are dynamically influenced by the course of the reaction, it will be convenient to describe various operations including containment by reference to instantaneous and, therefore, essentially momentarily static magnetic field conditions which are easily portrayed graphically and are easily generalized.

A magnetically contained thermonuclear reaction zone may be provided, in accordance with the invention, as illustrated in FIG. 1a, of the accompanying drawing. Only a generally cylindrical elongated central region of the entire magnetic field, e.g., the portion enclosed by the solenoid producing the field, is considered, since it is only these portions which were primarily concerned in defining the containment zone. More particularly, the magnetic field which defines the containment zone is preferably provided by any suitable means in such a manner that the field intensity patterns in radial planes about an axis are generally symmetrical, i.e., in such a manner that the field intensities are substantially axially symmetric. Moreover, such fields are provided with a relatively elongated central region along which the magnetic field intensity, $H_0$, is approximately uniform as indicated in corresponding portions of the magnetic field intensity profile of FIG. 1b, and which merge smoothly with gradientially-increased terminal magnetic intensity, reflector field regions, $H_1$ and $H_2$.

A charged energetic particle, i.e., one which has a finite velocity with radial and axial components and other distinctive class properties and which is produced in situ or introduced into such a field, in accordance with hereinafter described methods, will be contained in such field. Such particle will describe the typical helical path illustrated in FIG. 1a, having an axis of rotation generally parallel with the longitudinal axis of the said field, i.e., parallel to the magnetic lines of force. It will be appreciated that the action of a particle in the presence of a dense plasma will differ markedly from the simplification noted above; nevertheless, on a statistical average, the bulk of a plasma is effectively contained. The zone of containment may be visualized as being generally cylindrical, as being coaxially disposed within the central portions of the magnetic field and with the terminal regions of the zone being constricted, i.e., closed in the regions of the reflector fields $H_1$ and $H_2$.

Such a field may be provided by various equivalent means, e.g., by means of an electrically-energized, elongated solenoid, axially aligned solenoid segments, toroidal solenoidal windings (in curved reactor sections), etc., whereby, the magnetic field regions and especially the containment zone, of FIG. 1a, would be concentrically enclosed therein. The approximately uniform field portion, $H_0$, may be obtained merely by disposing the solenoidal windings so as to uniformly distribute the ampere turns effective in this region while the gradientially-intensified reflector field regions may be provided merely by increasing the ampere turns of the solenoid effective in these regions as by overlapping layers of conductor, using overlapping solenoids segments and/or increasing the electrical current in the solenoid portions effective in these regions. Other means may be employed as auxiliary aids, at least, in shaping the fields.

CONTAINMENT

*Theory.*—Containment, which has been demonstrated in practical operation, is explainable on theoretical bases, as follows: First, consider a perturbation treatment of the motion of a particle in a magnetic field, H, wherein it is assumed:

(1) $$\vec{r} \cdot \mathrm{grad}|\vec{H}| \ll |\vec{H}|$$

(2) $$T\left|\frac{d\vec{H}}{dt}\right| \ll |\vec{H}|$$

where $r$=radius of gyration and $T$=cyclotron period.

The above assumes that the change of H in time and space is small during transit of one revolution of the helical path; a condition which is more nearly approached in large containment systems. The second condition will be very well satisfied for all cases of interest in the present disclosure; however, qualitatively, the approximations do not materially affect the results. With the above conditions satisfied the paths of the individual particles in the field will be helices in which the center of rotation is along the magnetic lines of force. We may then consider the total kinetic energy of the particle, W, as divided into two vectorial parts—a rotational energy, $W_\perp$, from motion perpendicular to the magnetic field and a translational energy, $W_{\parallel}$, from motion parallel to the field, so that at all times:

$$W = W_\perp + W_{\parallel}$$

Under the conditions described, at any time during the motion of the particle through regions where H is varying with position of the particle in the field, the usual cyclotron relationship is satisfied (centrifugal force=magnetic force), i.e., $$\frac{mv_\perp^2}{r} = \frac{Hev_\perp}{c}$$

where $m$=mass of particle
$r$=radius of rotation
$H$=magnetic field intensity
$e$=charge
$c$=velocity of light This can be rewritten as $$\frac{\tfrac{1}{2}mv_\perp^2}{H} = \left[\frac{e}{2mc}\right]\left[mv_\perp r\right]$$

Thus $$\frac{W_\perp}{H} = \frac{e}{2mc}|\vec{\alpha}|$$

where $\vec{\alpha}$ is the angular momentum of the particle in its helical orbit. Now in the perturbation limit, it is apparent that the angular momentum about the center of rotation of the particle is constant since the magnetic forces are all exerted perpendicular to the circular motion of the particle. Thus it may be seen that (I) $$\frac{W_\perp}{H} = \left|\vec{\mu}\right| = \mathrm{constant}$$

wherein $$\vec{\mu} = \frac{e}{2mc}\vec{\alpha} = \text{magnetic moment of the particle}$$

The conditions for reflection of a particle at the terminal magnetic field regions, i.e., axial containment, can now be deduced by simply considering the conservation of energy and the effect of $$\frac{W_\perp}{H}$$

over the region between the planes $x=0$ and $H(x)$ where $H(0)$=field intensity at $x=0$ in the central region and $H(x)$=field intensity in the reflector field region ($H_2$) as indicated in FIG. 1a.

As a consequence of the fact that $$\frac{W_\perp}{H} = \mu = \mathrm{constant}$$

with a contained particle moving into a region of intensified magnetization, $W_\perp$ must increase at the expense of $W_{\parallel}$, since the total kinetic energy, $W = W_{\parallel} + W_\perp$, must be conserved on the average. Thus the axial motion of the particle in the original direction is diminished to the vanishing point and the particle reverses the axial direction of travel with a simultaneous transferal of kinetic energy, i.e., $W_\perp$ to $W_{\parallel}$. This is a general consideration satisfied whenever a moving charged particle is encountering an intensified field of sufficient magnitude.

We have thus:

$$W_{\parallel}(x) + W_\perp(x) = W_{\parallel}(0) + W_\perp(0)$$

We may substitute for $W_\perp(x)$, $$W_\perp(x) = W_\perp(0)\frac{H(x)}{H(0)}$$

$$\therefore W_{\parallel}(x) = W_\perp(0) + W_\perp(0) - W_\perp(x)$$

$$= W_{\parallel}(0) + W_\perp(0) - W_\perp(0)\frac{H(x)}{H(0)}$$

(II) $$\therefore W_{\parallel}(x) = W_{\parallel}(0) - W_\perp(0)\left[\frac{H(x)}{H(0)} - 1\right]$$

It will be noted that this equation indicates that as a particle moves into a region of intensified magnetization the axial component of energy is continually diminished until, if H(x) is of sufficient magnitude, such axial component finally vanishes, at which time the particle is stopped and the direction of travel along the axis of the containment field is reversed, whereby the particle is alternately reflected between the magnetic reflector field regions $H_1$ and $H_2$ and is, therefore, effectively contained. This behavior is also apparent from the viewpoint that a rotating charged particle has a magnetic moment such that it is always repelled from a region having an intensified magnetic field. Also, the cause of the reflection becomes apparent if one notes the direction of the lines of force in traversing a zone of increasing magnetic intensity.

The condition governing reflection may be derived merely by equating the expression (II), to zero, i.e., representing the time at which the particle comes to rest and spirals back out of the region of intensified magnetization H(x) as shown in FIG. 1a and in accordance with the following considerations:

$$W_{\parallel}(0) - W_{\perp}(0)\left[\frac{H(x)}{H(0)} - 1\right] = 0$$

i.e., $$W_{\parallel}(0) = W_{\perp}(0)\left[\frac{H(x)}{H(0)} - 1\right]$$

or $$\frac{W_{\parallel}(0)}{W_{\perp}(0)} = \frac{H(x)}{H(0)} - 1 = R - 1$$

wherein $$R = \frac{H(x)}{H(0)}$$

and H(x) is the field strength at the point of reflection, x. The value R will be known hereinafter as the reflector ratio, i.e., ratio of reflector field intensity to central axial field intensity in the magnetic containment zone. It will be apparent that the points, x, may be considered to lie in a radial zone, thus at the zone of reflection, R, for such points is as follows:

(III) $$R = \frac{H(x)}{H(0)} = 1 + \frac{W_{\parallel}(0)}{W_{\perp}(0)}$$

Consider now the slightly different requirement, i.e., with a fixed maximum ratio, R, of central to reflector magnetic field intensities, the conditions which, in any case, a particle must satisfy to be reflected and effectively contained by the reflector field regions. If the particle possesses axial energy ($W_{\parallel}$) excessively large in relation to the energy perpendicular ($W_{\perp}$) to the field, reflection will not occur, i.e., the reflector field region will usually be penetrated by the particle. Let the reflector field intensity be $H_R$ and the central field be $H_0$, then the maximum ratio of $W_{\parallel}/W_{\perp}$ which a particle may have and still be reflected comprises, $$\left[\frac{W_{\parallel}(0)}{W_{\perp}(0)}\right]_{max} = \frac{H_R}{H_0} - 1$$

In other words all particles will be reflected by the gradientially intensified magnetic reflector field regions for which the first term, foregoing, does not exceed the second, viz., (IV) $$\frac{W_{\parallel}(0)}{W_{\perp}(0)} \leq \left[\frac{H_R}{H_0} - 1\right]$$

In this connection it is important to note that it is the ratio of energies that is significant—not the absolute values and also, it is the ratio of field intensities that controls, not the absolute value.

Having shown that particles whose ratio of parallel to perpendicular energy is less than a certain value will be contained by the reflector fields, the angle of exclusion of such fields can now be calculated. With reference to FIG. 2 of the drawing, given a particle velocity, $v$, the ratio of the parallel $v_{\parallel}$, to perpendicular, $v_{\perp}$, components of the particle velocity defines an angle, $\theta$, for which $$\tan \theta = \frac{v_{\perp}}{v_{\parallel}}$$

where $\theta$ must be greater than a minimum value, the angle of exclusion, in order for the particle to be reflected. We have then $$\frac{W_{\parallel}(0)}{W_{\perp}(0)} = \frac{v_{\parallel}^2}{v_{\perp}^2} \leq R - 1$$

$$\therefore \frac{v_{\parallel}}{v_{\perp}} \leq \sqrt{R-1}$$

$$\therefore \text{(V)} \quad \tan \theta \geq \frac{1}{\sqrt{R-1}} \text{ for reflection}$$

As a consequence (VI) $$\sin \theta \geq \frac{1}{\sqrt{R}}$$

These results may now be used to compute the solid angle, using the relationships, shown in FIG. 3, of the drawing, into which particles may be lost at a reflector field and the albedo for an incident random distribution of particle velocities.

First:

$$\Omega = 2\pi(1 - \cos \theta)$$

Accordingly, the solid angle $\Omega_0$ inside of which particles will be lost can be found from the relations above.

$$\cos \theta_0 = \sqrt{1 - \sin^2 \theta_0}$$

$$\therefore \Omega_0 = 2\pi\left[1 - \sqrt{1 - \frac{1}{R}}\right]$$

Therefore the fractional solid angle, $L_a$, into which particles are lost per hemisphere must be (VII) $$L_a = \frac{\Omega_0}{2\pi} = 1 - \sqrt{1 - \frac{1}{R}}$$

if $R \gg 1$, then $$L_a \approx \frac{1}{2R} = \frac{H_0}{2H_R}$$

Then the fractional solid angle of reflection per hemisphere, S, is:

(VIII) $$S = \sqrt{1 - \frac{1}{R}}$$

As a corollary, some loss may be expected through the reflector regions, visualable as being through an orifice, not actually physical but as angular. An analogy is the angular cone of vision when looking upward from beneath the surface of a lake. Beyond a certain angle all light is internally reflected.

To compute the albedo, note that the flux of particles moving toward the reflector field is proportional to $v_{\parallel}$ for the individual particles, i.e., to find the ratio of particle flux entering to flux reflected we must include this factor in the calculation as the ratio, $$A = \frac{(\text{Flux reflected})}{(\text{Flux incident})}$$

Now:

$$(\text{Flux incident}) = 2\pi \int_0^{\frac{\pi}{2}} n(v_0 \cos \theta) \sin \theta \, d\theta$$

$$(\text{Flux reflected}) = 2\pi \int_{\theta_0}^{\frac{\pi}{2}} n(v_0 \cos \theta) \sin \theta \, d\theta$$

where $n$=number of particles, $v_0$=original velocity.

$$\therefore A = \frac{\int_{\theta_0}^{\pi/2} \cos\theta \sin\theta \, d\theta}{\int_{\theta_0}^{\pi/0} \cos\theta \sin\theta \, d\theta} = 1 - \sin^2\theta_0$$

But $$\sin\theta_0 = \frac{1}{\sqrt{R}}$$

(IX) $\quad A = 1 - \frac{1}{R} = 1 - \frac{H_0}{H_R}$

This reflection coefficient is not particularly determinative of the reflector capabilities in the present intsance since the assumption is included that the distribution remains random. Actually the angular distribution of particle velocities will not be random as will be shown hereinafter due to the great length of the mean free paths in the present system; therefore, the actual reflection coefficient obtained in practice will be much better than this unduly pessimistic minimum.

The above relationships allow derivation of a useful expression indicative of the transformation of energies and angles of the particle helices as they move from one part of the field to another, as follows:

[II] $\quad W_\parallel(x) = W_\parallel(0) - W_\perp(0)\left[\frac{H(x)}{H(0)} - 1\right]$ Also $$W_\perp(x) = W_\perp(0)\frac{H(x)}{H(0)} \left(\text{since } \frac{W_\perp}{H} = \text{constant}\right)$$

$$\therefore \frac{W_\parallel(x)}{W_\perp(x)} = \left\{\frac{W_\parallel(0)}{W_\perp(0)} - \left[\frac{H(x)}{H(0)} - 1\right]\right\}\frac{H(0)}{H(x)} =$$

$$\frac{W_\parallel(0)}{W_\perp(0)}\left(\frac{1}{R(x)}\right) - 1 + \left(\frac{1}{R(x)}\right), \text{ where } R(x) = \frac{H(x)}{H(0)}$$

(X) $\quad \therefore \frac{W_\parallel(x)}{W_\perp(x)} = \frac{1}{R(x)}\left[\frac{W_\parallel(0)}{W_\perp(0)} + 1\right] - 1$ This expression yields the energy ratio at any point in the field in terms of its value at another point.
Then $$\frac{v_\parallel^2(x)}{v_\perp^2(x)} = \frac{1}{R(x)}\left[\frac{v_\parallel^2(0)}{v_\perp^2(0)} + 1\right] - 1$$

i.e., $$\text{ctn}^2 \theta' = \frac{1}{R(x)}\left[\text{ctn}^2 \theta + 1\right] - 1$$

$$1 + \text{ctn}^2 \theta' = \frac{1}{R(x)}\left[\text{ctn}^2 \theta + 1\right]$$

$$\frac{1}{\sin^2 \theta'} = \frac{1}{R(x)} \cdot \frac{1}{\sin^2 \theta}$$

(XI) $\quad \sin\theta' = \sqrt{R(x)} \sin\theta$

As before, angles $\theta$ and $\theta'$ are to be measured with respect to the local field direction which at the peak reflector field will be parallel to the longitudinal axis. This relation will be employed hereinafter, in connection with the disclosure of methods of accomplishing fuel injection. Note then in XI, when $R(x) > 1$, since the maximum value of $\sin\theta'$ is 1, orbital path angles such that $$\sin\theta > \frac{1}{\sqrt{R(x)}}$$

are not permitted, i.e., such angles can not give rise to an orbital path which can finally arrive at point, $x$, in FIG. 1a.

Before considering fuel injection it is necessary to consider the behavior of the invariants under adiabatic changes in the magnetic field. As a consequence it is found that $$\frac{W_\perp}{H} = \mu$$

is an adiabatic invariant for changes of H in time as well as space, the latter having been shown in the foregoing.

In accordance with Alfvén (Alfvén, H., Cosmical Electrodynamics, Oxford, University Press, New York, 1950), i.e., a first order theory is assigned, but noting that Kruskal has shown the results to be true to all orders in a perturbation expansion. For a path fixed in space $$\oint \vec{E} \cdot \vec{ds} = -\frac{1}{c}\frac{d\phi}{dt} \text{ (standard generator equation)}$$

Here $\phi = \pi r^2 H$ = flux through an orbit of radius, $r$, at any instant of time. Therefore the energy gain in one spiral revolution of the particle in the field is $$\Delta W_\perp = -|e|\oint \vec{E} \cdot \vec{ds} = \frac{\pi r^2 e}{c} \cdot \frac{dH}{dt}$$

The energy gain per unit time (second) is obtained by dividing the above quantity by the units per revolution, i.e., the cyclotron period. We find this from the relation $$\frac{mv^2}{r} = \frac{Hev_\perp}{c}$$

$$\therefore v_\perp = \frac{Her}{mc}$$

$$\therefore T = \frac{\text{distance}}{\text{velocity}} = \frac{2\pi r}{v_\perp} = \frac{2\pi r}{\frac{Her}{mc}} = \frac{2\pi mc}{eH} = \text{time}$$

$$\therefore \frac{dW_\perp}{dt} = \frac{\Delta W_\perp}{T} = \frac{\pi r^2 e}{c} \cdot \frac{eH}{2\pi mc} \cdot \frac{dH}{dt}$$

$$= \frac{eHr}{mc} \cdot \frac{er}{2c} \cdot \frac{dH}{dt} = \frac{\tfrac{1}{2}mv_\perp^2}{H} \cdot \frac{dB}{dt}$$

$$\therefore \frac{dW_\perp}{dt} = \frac{W_\perp}{H} \cdot \frac{dH}{dt}$$

On integration, noting $$\frac{dW_\perp}{W_\perp} = \frac{dH}{dt}$$

The final result is (XII) $\quad \frac{W_\perp}{H} = \text{constant}$

The foregoing results demonstrate that, in all adiabatic changes of the kind described, the flux through the orbit circle of the particle remains constant, i.e., $$W_\perp = \mu = \left(\frac{e}{2mc}\right)(mv_\perp r) = \text{constant}$$

$$\therefore v_\perp r = \text{constant}$$

And also $$\frac{v_\perp^2}{H} = \text{constant}$$

Now the product of two constants is also constant. Square the first and multiply by the reciprocal of the second.

$$\therefore v_\perp^2 r^2 \cdot \frac{H}{v_\perp^2} = \text{constant}$$

$$\therefore r^2 H = \text{constant}$$

i.e., (XIII) $\quad \pi r^2 H = \text{constant}$

Thus the flux through the orbit is a constant of motion, in the perturbation approximation.

While containment has been described with particular reference to the containment of positively charged ions, i.e., ionized single nuclei as is considered appropriate under thermonuclear reaction conditions, particularly, with high kinetic temperatures, the method is not limited to operation with such particles and in connection with thermonuclear reactions alone. With appropriately adaptive modification, considered apparent from the disclosure and especially with lower temperatures, e.g., below dissociation temperatures, negatively and positively-ionized particles formed by ionizing atoms, molecules, molecular residues and the like, by methods similar to those noted herein or by conventional methods, may also be contained. Since such contained particles may be given high kinetic energies it is contemplated in accordance with teachings of the invention that chemical reactions may be conducted in such a containment zone including many which cannot be conducted with ordinary procedures to produce known or hitherto unknown materials. This is believed especially true of those reactions which do not proceed at appreciable rates in present methods due to the excessive thermodynamic activation energies required.

Other highly desirable results may be obtained also, for example, as noted hereinafter, diffusion rates of various materials from the containment zone are materially different; therefore, it is apparent that separatory processes occur with mixed ions, e.g., different masses and/or ratios of charge/mass if present in the containment zone. In general, such materials are subject to similar behavior as the positive ions in the operation of the invention, e.g., compression; therefore, it is to be expected that various procedures incorporating operations taught by the invention, when employed in chemical technology, will be found to be of considerable utility.

INJECTION

Having disclosed, in the foregoing, factors which are determinative of containment, methods of effecting disposition of a thermonuclear fuel in the containment zone will now be set forth. At the outset, it is to be noted that injection can be effected through one or both terminal reflector regions of the system or through the radial field region situated between the terminal regions and that the fuel will generally be in the form of an accelerated (preheated) space charge neutralized ionic beam directed at certain acceptance angles and with appropriate manipulation of the magnetic fields. Such injection will necessarily include the production of ionized particles and the acceleration thereof to at least the preheat temperature as by passage through an electrostatic voltage gradient or by equivalent accelerative treatment.

At the outset on elementary consideration of factors disclosed hereinbefore, it will be apparent that a particle directed from an external source through one of said reflector field regions and therefore having an axial velocity component sufficient to pass through the first reflector region, would also penetrate the second region and therefore not be contained, provided both reflector regions are similar in extent and magnetization intensity. Accordingly, with externally produced and accelerated ions, to accomplish particle trapping and accumulation in the containment zone, some procedure must be employed which effectively reduces the ratio of axial velocity to rotational velocity of the particle during transit through the containment zone in order for the particle to be reflected from the reflector regions, or, equivalently, increase the reflection capacity of the reflector fields during transit therebetween relative to the axial velocity of the particle. Ions produced, in situ, within the containment zone present a more simple problem since only containment factors, as described above, need be satisfied.

A preferred adiabetic injection, trapping and accumulation procedure which may be employed to effect disposition of a thermonuclear fuel charge in a containment zone of the character described above is described hereinafter. For the sake of simplicity a containment system will be considered in which the length of the reflector regions is short compared to the total length of the device as shown in idealized form in FIG. 4 of the drawing. As depicted therein a magnetic field of the general axial intensity profile shown in the lower graphical portion ($b$) of the figure, and which is caused to increase uniformly overall in intensity with the passage of time is established in the elongated cylindrical evacuated chamber 35 illustrated in portion ($a$) of said figure. Ion sources (not shown) are radially disposed about the longitudinal axis of the chamber 35 outwardly preferably from at least one reflector region, $H_1$, so as to direct a beam of ionic fuel particles having a substantial kinetic energy axially whereby the individual ion follows a helical path inwardly into such reflector region, $H_1$, similar to the typical particle path indicated at 36.

While it is usually preferred to dispose the ion sources axially outward from the containment zone, since various other structures, disclosed hereinafter, may then be more easily provided therein, it is equally feasible to dispose such sources radially about certain regions of the containment zone, i.e., in radial banks disposed concentrically about the containment zone between the reflector field regions. These centrally disposed ion sources may be employed either alone or with other described sources and methods of fuel injection described herein. With this central-radial arrangement, the ion beams may be directed semi-tangentially to the rotational orbits of the particles in the field providing a helical path of pitch angle determined similarly to that which is to be described with axial injection. With this injection method a rise in magnetic field intensity would be relied upon to cause the ion orbits to constrict whereby the ions would not strike the ion sources on rotation and/or the pitch angle of injection may be adjusted so as to displace the beam sufficiently to effect this purpose with the assistance of a slow simultaneous increase in the magnetic field intensity.

However, preferred axial injection, as by utilizing ion sources disposed externally so as to direct energetic ions along axially oriented paths into a reflector field region, is accomplished, as follows:

At $x=0$, the peak of field $H_1$, as indicated in FIG. 4, let $$v_{\parallel}(0)=\xi v_{\perp}(0)$$

where $\xi$=cotangent $\theta$=tangent $P$ and $P$=pitch angle of the helical path at injection, with relationships presented in the vectorial diagram of FIG. 5.

Then $$v_0=\sqrt{v_{\parallel}^2(0)+v_{\perp}^2(0)}$$

For more effective injection $\xi$ should be made small, i.e., the ion sources should be disposed in such a manner that the foregoing is achieved. The object being to impart as little axial velocity in excess of that required for the particle to penetrate the first reflector field. With the ion sources situated in a different value of magnetic field intensity, $\xi$ is obtained by a mathematical transformation of the pitch angle.

First, as the particle arrives at the peak of field, $H_1$, i.e., at $x=0$, $$\frac{W_{\parallel}(0)}{W_{\perp}(0)}=\xi^2$$

With a particle having passed through the region, $H_1$, i.e., the particle is at $x=a$, a point in the central field, $H_0$, from an above noted relationship (X), for energy transformation there is obtained.

$$\frac{W_{\parallel}(a)}{W_{\perp}(a)}+1=\frac{1}{R(a)}\left[\frac{W_{\parallel}(0)}{W_{\perp}(0)}+1\right]$$

But $$R(a) = \frac{H(a)}{H(0)} = \frac{1}{R}$$

$$\therefore \frac{W_{\parallel}(a)}{W_{\perp}(a)} = R[1+\xi^2] - 1$$

The particle travels thenceforth down to the far end of the containment zone, is reflected, in the region of $H_2$, and returns to point, $a$, after a time interval, T. Now, as is known from the reflector field Equation II in order to be reflected the particle must have an energy ratio at, $a$, and after time, T, of $$\frac{W_{\parallel}(a, T)}{W_{\perp}(a, T)} \leq R - 1$$

But in the present case the magnetic field is caused to rise overall with time (in the present case it is arranged that the field is rising in such a way that R is constant) so that, since $$\frac{W_{\perp}}{H} = \text{constant}$$

$$\frac{W_{\parallel}(a, T)}{W_{\perp}(a, T)} = \frac{H(a, 0)}{H(a, T)} \cdot \frac{W_{\parallel}(a, 0)}{W_{\perp}(a, 0)}$$

$$\therefore \frac{W_{\parallel}(a, T)}{W_{\perp}(a, T)} = \frac{H(a, 0)}{H(a, T)}[(1+\xi^2)R - 1]$$

Combining the preceding and reflector field, II, equations, it is found that to obtain internal reflection and trapping, that $$\frac{H(a, 0)}{H(a, T)} = [(1+\xi^2)R - 1] \leq R - 1$$

To a high degree of approximation the rate of rise in magnetic field intensity will be *linear* for short intervals so that over any time interval, $t$, $$H(a, T) = H(a, 0)[1 + \lambda t]$$

i.e., $$\frac{dH(a)}{dt} = \lambda H(a)$$

and $$\frac{H(a, 0)}{H(a, T)} = \frac{1}{1 + \lambda T}$$

where $\lambda =$ reciprocal of doubling time of field intensity. Therefore, during injection the following conditions must be satisfied.

$$\frac{1}{1 + \lambda T}[(1+\xi^2)R - 1] \leq R - 1$$

or $$\xi^2 \leq \lambda T \left(\frac{R-1}{R}\right)$$

demonstrating that injection pitch angles must be *less* than a certain value.

In general $$T = \beta \left(\frac{2L}{v_0}\right)$$

where $\beta$ is a quantity greater than 1 and $L =$ length of the containment zone.

$$\therefore \xi^2 \leq \lambda \left(\frac{R-1}{R}\right) \cdot \beta \cdot \frac{2L}{v_0}$$

or $$\lambda \geq \left(\frac{R}{R-1}\right) \frac{\xi^2}{\beta \cdot \frac{2L}{v_0}}$$

Now $$\frac{dH(a)}{dt} = \lambda H(a)$$

Therefore the following conditions must be satisfied for trapping of the injected particle in the containment zone XIV $$\frac{dH(a)}{dt} \geq H(a)\left(\frac{R}{R-1}\right) \frac{\xi^2}{\beta \cdot \frac{2L}{v_0}}$$

To evaluate $\beta$ for the case under consideration, proceed as follows:

From $$\frac{W_{\perp}}{H} = \text{constant}$$

and the energy transformation equation, there is obtained:

$$W_{\parallel}(a) = W_{\perp}(0)\left[(1+\xi^2) - \frac{1}{R}\right]$$

$$\therefore v_{\parallel}^2(a) = v_{\perp}^2(0)\left[(1+\xi^2) - \frac{1}{R}\right]$$

But $$v_0 = v_{\parallel}^2 + v_{\perp}^2 = (1+\xi^2)v_{\perp}^2$$

$$\therefore v_{\parallel}^2(a) = \frac{1}{1+\xi^2}\left[(1+\xi^2) - \frac{1}{R}\right]v_0^2 = \left[1 - \frac{1}{R(1+\xi^2)}\right]v_0^2$$

$$\therefore v_{\parallel}(a) = \left[\frac{1}{R(1+\xi^2)}\right]^{1/2} v_0$$

which is the velocity most of the time.

$$\therefore T = \beta \cdot \frac{2L}{v_0} \approx \frac{2L}{v_{\parallel}} = \frac{2L}{v_0} \frac{1}{\left[1 - \frac{1}{R(1+\xi^2)}\right]^{1/2}}$$

$$\therefore \beta = \left[1 - \frac{1}{R(1+\xi^2)}\right]^{1/2}$$

Thus it is found that the condition for trapping of injected particles in the present case is, $$\frac{dH(a)}{dt} \geq H(a)\left(\frac{R}{R-1}\right)\left[1 - \frac{1}{R(1+\xi^2)}\right]^{1/2} \frac{\xi^2}{\left(\frac{2L}{v_0}\right)}$$

Now it can be seen that for most efficient injection $\xi^2 \ll 1$ ($\xi^2$ should be very much less than 1) so that $$\left[1 - \frac{1}{R(1+\xi^2)}\right]^{1/2} \approx \left[1 - \frac{1}{R}\right]^{1/2} = \left(\frac{R-1}{R}\right)^{1/2}$$

The final expression indicating the condition for most efficient injection and trapping of ions is, therefore, as follows:

(XV) $$\frac{dH(a)}{dt} \geq H(a)\left(\frac{R}{R-1}\right)^{1/2} \frac{\xi^2}{\left(\frac{2L}{v_0}\right)}$$

This relationship can be used to determine a "total trapping or fuel charge accumulation time", T, during which charged particles of a particular class may be injected and may be retained in the containment zone provided other subsidiary conditions are satisfied.

For a linearly rising field, H, at the end of a time interval, $\tau$, $$H(a,\tau) = \frac{dH(a)}{dt} \cdot \tau$$

At the particular time, $\tau$, when the injection condition just ceases to be satisfied for particles of given value of $\xi$, the following holds:

$$\frac{dH(a)}{dt} = H(a, \tau)\left(\frac{R}{R-1}\right)^{1/2} \frac{\xi^2}{\left(\frac{2L}{v_0}\right)}$$

Comparing the preceding two equations it is seen (XVI) $$\tau = \left(\frac{2L}{v_0}\right)\left(\frac{R}{R-1}\right)^{1/2} \frac{1}{\xi^2}$$

Time $\tau$ is to be measured from the time that H is equal to zero. If H is begun with a finite value, somewhat later, then $\tau$ is measured from the time found by extrapolating the linear rise time interval to the beginning or zero field. Injection can never be accomplished with an intensity, $H=0$, so that the actual injection time will always be *less* than $\tau$. However the more rapidly the field is caused to rise the larger will be the fraction of rise time $\tau$, which is available for effective injection. For injection of particles with a range of values for $\xi$ as between, 0 and $\xi_0$, the effective trapping time will be much larger than that which is indicated by the above expression.

An alternative method of injection can be employed in which the central regions ($H_o$) of the containment field are maintained substantially constant or are allowed to increase relatively slowly in intensity while the intensity in the terminal reflector regions, $H_1$ and $H_2$, is caused to increase at a relatively greater rate, with the passage of time, as illustrated in FIG. 6 of the drawing.

As before (see FIG. 5), let $$v_{||}(0) = \xi v_\perp(0)$$

$$\therefore \frac{W_{||}(0)}{W_\perp(0)} = \xi^2$$

At time $t=0$ (neglecting the change in field intensity during the transit of particles from $x=0$ to $x=a$, in reflector field $H_1$), $$W_{||}(a) = W_{||}(0) - W_\perp(0)\left[\frac{H(a,0)}{H(0,0)} - 1\right]$$

Also, $$W_\perp(a) = \frac{H(a,0)}{H(0,0)} \cdot W_\perp(0) = \frac{1}{R(0)} W_\perp(0)$$

$$\therefore \frac{W_{||}(a,0)}{W_\perp(a,0)} = R(0)\frac{W_{||}(0)}{W_\perp(0)} - 1 + R(0) = (1+\xi^2)R(0) - 1$$

Now for reflection to occur after the particle has progressed to the reflector field, $H_2$, and returned in time T, $$\frac{W_{||}(a,T)}{W_\perp(a,T)} \leq R(T) - 1$$

In the case where the central field does not change appreciably during the time interval, T, $$\frac{W_{||}(a,T)}{W_\perp(a,T)} = \frac{W_{||}(a,0)}{W_\perp(a,0)}$$

$$\therefore (1+\xi^2)R(0) - 1 \leq R(T) - 1 \text{ for reflection, i.e., containment, or, equivalently, } R(T) \geq (1+\xi^2)R(0).$$

Now if the magnetization of the reflector regions is intensified linearly with time, i.e., if $$R(t) = R(0)(1+\gamma t)$$

where $\gamma$ is the reciprocal of the doubling time of R then $$(1+\gamma T)1+\xi^2$$

and $$\gamma \geq \frac{\xi^2}{T}$$

In this case the transit time interval, T, will no longer be independent of time of injection, i.e., the transit time for a given particle will depend on the time, $t$, when it is injected so that $$T(t) = \frac{2L}{v_{||}(t)}$$

and from the equations developed before, $$v_{||} = \left[1 - \frac{1}{(Rt)(1-\xi^2)}\right]^{1/2} \cdot v_0 \approx \left[1 - \frac{1}{R(t)}\right]^{1/2} v_0$$

$$\therefore \gamma \geq \left[1 - \frac{1}{R(t)}\right]^{1/2} \frac{\xi^2}{\left(\frac{2L}{v_0}\right)}$$

i.e., since $$\frac{dR(t)}{dt} = \gamma R(0)$$

then $$\frac{dR(t)}{dt} \geq R(0)\left[1 - \frac{1}{R(t)}\right]^{1/2} \frac{\xi^2}{\left(\frac{2L}{v_0}\right)}$$

But $$R(t) = \frac{H_R(t)}{H_0} \text{ and } R(0) = \frac{H_R(0)}{H_0} \ (H_0 = \text{being constant})$$

Notice here that in $H_R(0)$, the 0 refers to the time coordinate at which the particular particle was injected and not to the absolute zero of time when the reflector field originally began to increase in intensity.

(XVII) $$\frac{dH_R}{dt} \geq H_R\left[\frac{R(t)-1}{R(0)}\right]^{1/2} \frac{\xi^2}{\left(\frac{2L}{v_0}\right)}$$

This expression is very similar to the one found for the first case noted above, except that one of the terms is a slowly varying function of the time. However, the rates of field rise required for adequate injection are comparable, and, therefore, the time intervals available for effective injection and trapping are comparable in the two methods.

The foregoing calculations can be utilized to compute the approximate quantities of particles available for reaction at the termination of one injection cycle since the ratio of density at the end of injection to source beam density will be given approximately by the fuel accumulation time, $\tau$, divided by the one way transit time, i.e., $$\tau = \left(\frac{2L}{v_0}\right)\frac{1}{\xi^2}\left(\frac{R-1}{R}\right)^{1/2}, \ T = \beta\frac{2L}{v_0}$$

$$\frac{\tau}{\frac{1}{2}T} = \frac{\left(\frac{2L}{v_0}\right)\frac{1}{\xi^2}\left(\frac{R-1}{R}\right)^{1/2}}{\frac{1}{2}\beta\left(\frac{2L}{v_0}\right)} = \frac{2\left(\frac{R-1}{R}\right)^{1/2}}{\beta\xi^2}$$

$$\approx \frac{2}{\xi^2}\left(\frac{R-1}{R}\right)^{3/2}$$

Thus at the end of the injection interval, the number of particles injected and trapped, $n_I$, will be about, $$n_I \approx \frac{2}{\xi^2}\left(\frac{R-1}{R}\right)^{3/2} n_0$$

or for large R, (XVIII) $$n_I \approx \frac{2}{\xi^2} n_0$$

where $n_0$ is the density of the ions in the ion source beams.

The foregoing methods of disposing a thermonuclear fuel charge in a containment zone of the character described may be employed with particles of greatly varied energies thereby permitting great flexibility in the choice of injection energies and selection of operating conditions in the associated operations of the process. Particles may be injected and accumulated with low energies (ordinary thermal velocities) suitable, for example, as in chemical reactions, at intermediate energies wherein thermonuclear reactions would proceed only slowly or not appreciably or at high kinetic energies whereby appreciable thermonuclear reaction rates may be immediately obtained. In the event that thermonuclear fuel ions are injected at low or intermediate energies additional energy may be applied subsequently with densification (as described hereinafter) and as required to provide the conditions favorable for initiating and promoting the reaction.

Alternative and/or auxiliary injection methods may be provided as, for example, by applying alternating electrostatic fields in the vicinity of the reflector regions by a method productive of an "enhanced magnetic reflector field," ions may be injected and accumulated with or without variation of the magnetic field intensities; neutral atoms entering the plasma (once established), are ionized and some fraction are retained therein, thus provision of a tenuous atmosphere (as by forming T from Li in the evacuated zone) or the injection of jets of appropriate gaseous forms of the thermonuclear fuel directed into the containment zone may constitute auxiliary injection methods; other manipulations of the reflector fields, e.g., outward translatory motion thereof during injection may also be employed to trap the ions; secondary accumulation zones established outwardly from a relatively diminished reflector region may serve to retain fuel ions lost from the primary reaction zone and to accumulate newly injected material, thereafter to be reintroduced into the reaction zone, and other equivalent methods may also be employed.

Furthermore, once the reaction is proceeding as under compression, noted hereinafter, fuel ions accelerated to kinetic temperatures (energies) equivalent to or above those at which the reaction proceeds with appreciable vigor, may be injected and trapped as by methods described above so as to aid in sustaining the reaction by replenishing fuel and perhaps effectively increasing ionic temperatures. In this manner, and/or with those described above, the length of the combustion cycle may be increased to the point that depletion of the fuel ceases to be a factor determinative of the period during which a reaction will continue.

COMPRESSION

Due to the peculiar nature of the magnetic fields employed to establish the containment zone, as noted hereinbefore, two somewhat separable containment modes are provided, (1) a radial containment along the length of the zone, and (2), axial containment or closure provided by the gradientially-intensified magnetic reflector field regions. Similarly, compression is divisible into radial and axial components or modes, radial compression being obtained whenever a portion of the magnetic field enclosing an appreciable plasma volume is intensified and axial compression being obtained by inward translatory motion of the position of at least one of said reflector field (also, intensification of the reflector field regions producing an axial "bulging" of the field region also shortens the path length therebetween and thereby produces some axial compression).

The term compression as employed herein is intended to relate to the process wherein a contained plasma is transformed from a tenuous state into a more dense state with attendant increase in the kinetic energy of the contained particles, containment pressure increase and other properties analogous to ordinary gas compression. Accordingly, the compression process may be considered to involve initial and final containment states corresponding to the containment of relatively low and relatively higher density plasmas and, likewise, particles of low and higher kinetic energies. Moreover, compression provides an ideal, exceedingly useful, means of converting a tenuous, low-kinetic energy (temperature) plasma into a densified plasma wherein at least a large proportion of the particles have a high kinetic energy, thereby to initiate and promote a thermonuclear reaction in a fuel plasma provided as described hereinbefore. Maintenance of a compressive state at any particular level will, therefore, constitute a state of containment and such a state of containment, if sustained following initiation of the thermonuclear reaction, provides a means for maintaining such a reaction for a considerable period and at a corresponding rate, i.e., regulation of the compression controls the reaction rate. Moreover, maintenance of the compressive containment state following initiation of the reaction allows replenishment of the fuel plasma as it is depleted, as described hereinbefore, with long reaction periods then being feasible.

Large thermonuclear power and other product outputs from reasonably small volumes of containment zone require, as indicated by reaction kinetics, considered hereinafter, particle densities of the order of $10^{14}$ particles per cc. and correspondingly high kinetic temperatures, conditions provided simultaneously by compression of tenuous fuel charges; however, reactions, thermonuclear or chemical, at lower and higher densities and/or kinetic temperatures are also useful.

Compression may be employed for other purposes. For example, the compressive method, particularly the radial mode, described herein may be applied to shape or confine the region occupied by the plasma and/or with appropriate manipulation of the reflector fields, to move the plasma from one location to another in the evacuated region. In this manner the contained plasma may be restrained from striking structures disposed in the evacuated region, the plasma may be formed in a particular locale and transported for more efficient use into another area and other plasma manipulations as considered apparent from the disclosure.

The following portions of the disclosure will describe the compressive process as occurring after a relatively rapid injection period employed to dispose a more or less fixed quantity of fuel ions in the containment zone, such fuel ions being heated generally to an intermediate kinetic temperature as noted above; however, it will be understood that compression may be applied at any temperature level or may be applied for containment of ions injected at high kinetic temperatures whereby the reaction may proceed immediately, i.e., as soon as sufficient ion density is obtained.

RADIAL COMPRESSION

With the foregoing in mind, consider now the process of radial compression of a plasma disposed in the containment zone and its optimization. As noted above, radial compression is obtained whenever the magnetic field is intensified along a substantial length of the containment zone, e.g., as by increasing the electrical current in a solenoidal winding, distributed along a length of the containment zone. An approximate derivation of the equations for radial compression will be made at the outset with reference, later, to more general verifications of the phenomenon. First consider the motion of a particle in crossed electric and magnetic fields. If a particle is moving in a magnetic field, $\vec{H}$, and is subjected to an electric field, $\vec{E}$, it can be shown that the center of rotation of the particle will drift with a velocity given by the equation, $$\vec{v} = c\frac{\vec{E} \times \vec{H}}{H^2}$$

This velocity is independent of the charge or the mass of the particle and consists of a cycloidal motion of the particle perpendicular to $\vec{E}$ and $\vec{H}$; towever, the relative direction of rotation will be dependent on the sign, positive or negative, of the charge on the particle as indicated in the accompanying FIG. 7.

Now consider an axially symmetrical magnetic field system where the field strength, $\vec{H}$, is varying as a function of time. If the field is increasing with time there must be an electric field associated (since, $\oint \vec{H} \cdot d\vec{A}$, is changing) and the electric field will appear as circular force lines, $\vec{E}$, as shown in accompanying FIG. 8, wherein $\vec{H}$, is in the axial direction. If the orbit diameters, of the particles, are small compared to the total size of the system, the field strength will be approximately constant across the orbit, and the particles will be urged radially inward with the velocity noted above.

Here E is ⊥ to H and so $$v = \frac{dR_z}{dt} = c\frac{E}{H}$$

From Maxwell's equations the following is obtained:

$$\vec{\nabla} \times \vec{E} = -\frac{1}{c} \cdot \frac{d\vec{H}}{dt}$$

$$\therefore \int \vec{E} \cdot d\vec{l} \int = -\frac{1}{c} \int \frac{d\vec{H}}{dt} \cdot d\vec{A} = -\frac{1}{c} \frac{d\phi}{dt}$$

Wherein $A$=area enclosed by the orbit.

Since the electric field is circular about the axis, the value at, $R_g$, the coordinate of the center of gyration of the particle, can be found simply from:

$$\int \vec{E} \cdot d\vec{l} = E \cdot 2\pi R_g$$

Through this circle $$\frac{d\phi}{dt} = \pi R_g^2 \cdot \frac{dH}{dt}$$

$$\therefore E = -\frac{1}{c} \cdot \frac{\pi R_g^2}{2\pi R_g} \cdot \frac{dH}{dt}$$

$$\therefore \frac{dR_g}{dt} = c\frac{E}{H} = -R_g \frac{dH}{dt} \cdot \frac{1}{2H}$$

$$\frac{1}{R_g} \frac{dR_g}{dt} = -\frac{1}{2H} \frac{dH}{dt}$$

This can be integrated immediately, and gives a result independent of time which is, $$\therefore \log R_g H^{1/2} = \text{constant}$$

$$\therefore \frac{R_{gF}}{R_{g0}} = \left(\frac{H_0}{H_F}\right)^{1/2}$$

Wherein, $H_0$, is the initial magnetic field intensity and, $H_F$, is the final magnetic field intensity.

This can also be written as $\pi R_g^2 H$=constant, and again demonstrates that the flux enclosed between the particle and the center of the system is a constant. It is then immediately apparent that since the relation above holds for all possible paths, $R_g$, all particles are uniformly compressed inward and the density will vary inversely as the change in volume (i.e., as the change in cross sectional area with a system of constant length).

$$\therefore \frac{n}{n_0} = \frac{\pi R_{g0}^2}{\pi R_g^2} = \frac{H}{H_0}$$

Before considering the characteristics of optimum compression it will be very instructive to consider certain fundamentals of thermonuclear reaction theory. Illustrative reference will be made to reactions involving isotopes of hydrogen; however, it will be understood that the method is not thereby to be limited to these materials as the teachings of the invention are applicable to thermonuclear reactions of all suitable materials, particularly the lighter elemental species, either natural or synthetic. Since, in general, the thermonuclear reactions are to occur in a heated plasma of appropriate density, it is necessary to determine the probability of a reaction occurring as well as determining the factors which are important in promoting such a reaction under attainable conditions. In thermonuclear reactions it is usually considered necessary that the reacting particles must collide and to collide with sufficient force to produce fusion thereof, with attendant results then following as inherent consequencies. Such reaction therefore is concerned with the motions of energetic particles, e.g., deuterons, tritons, etc., in a heated (high kinetic temperature) plasma and the probability that collisions effective to produce thermonuclear reaction will occur therein. To determine this value, it is necessary to obtain a measure of the length of the mean free path, $\lambda_f$, of a particle before a reaction occurs: By definition, $$\lambda_f = \frac{1}{n\sigma}$$

where $n$=the density.
$\sigma$=the cross section of the reaction.

For example, at 100 kev., $\sigma_{D-D} \approx 10^{-25}$ cm.$^2$, i.e., this is an approximate cross section value for a D—D thermonuclear reaction as determined experimentally. Thus, if, $n=10^{-14}$ deuterons/cc., $$\lambda_f = \frac{1}{10^{14} \times 10^{-25}} = 10^{11} \text{ cm.} = 10^6, \text{ kilometers}$$

A corresponding mean reaction time, $T_R$, can then be determined since, $$T_R = \frac{\lambda_f}{v}$$

where $v$=particle velocity calculable from the conventional relationship $$v = c\sqrt{\frac{2W}{mc^2}}$$

where $c$=the velocity of light
$W$=kinetic energy of ion
$mc^2$=rest energy of ion For a deuteron (W and $mc^2$ in volts), $$mc^2 = (2.015)(931) = 1875 \text{ mev.} \approx 2 \times 10^9 v$$

$$\therefore \text{at 100 kev., } v = \approx 3 \times 10^{10} \frac{2 \times 10^5}{2 \times 10^9} = 3 \times 10^8 \text{ cm./sec.}$$

$$\therefore T_R = \frac{10^{11}}{3 \times 10^8} \approx 300 \text{ seconds under the conditions noted}$$

For T-D (triton-deuteron) reactions the cross sections are about 50 fold larger and the mean reaction time would be reduced to only about 6 seconds. Mixtures of various proportions of these materials would have intermediate reaction rates and other light nuclide ions, as is known in the art, have cross sections of this order or larger but within attainable limits.

A mean total reaction rate per unit volume is a very useful criterion for easily appraising overall performance. The mean reaction rate per particle, $\nu$, is the reciprocal of $T_R$, i.e., $$\nu = \frac{1}{T_R} = n\sigma v$$

To find the mean total rate, N, per unit volume, note that each particle has a rate, given above, for reacting with neighbors, of which there are $n$ per unit volume. Therefore, (for a one-component fuel, for example D—D)

$$N = \frac{1}{2} n(n\sigma v) = \frac{1}{2} n^2 \sigma v$$

wherein the factor of one-half corrects for the fact that the above procedure includes each particle twice. As the velocities of the particles will rarely be mono-energetic, in a more correct evaluation, some factor should reflect the distribution of velocities relevant to energies more nearly representing the actual state of the particles in the plasma. Typical variations of cross sections, $\sigma$, with variation of particle energy (D—D, T—D), as determined experimentally, are graphically illustrated in the accompanying FIG. 9. Using such a plot one may evaluate the above equation with an averaged term, i.e., $\overline{\sigma v}$, e.g., (XIX) $$N = \frac{1}{2} n^2 \overline{\sigma v}$$

The relation indicated in the foregoing equation is considered to be of great importance in the present instance since the compressive process of the invention is capable of greatly increasing the original densities and, therefore, benefiting from the situation represented by the large dependence on the, $n^2$, factor by increasing the reaction probability.

If the thermonuclear reaction system has an effective reacting plasma volume, $V_F$, then the total number of reactions per second of effective containment time is given by:

(XX) $\qquad N_T = \frac{1}{2} n_F^2 \overline{\sigma v}(W_F) V_F$ where, $\sigma v(W_F)$ is the mean reaction rate parameter at the final relative light nuclide ion, e.g., deuteron energy.

Consider the determination of the optimum compression for a simplified case with reference to radial compression alone and the effects of finite containment time are ignored. The generalized case of combined radial and axial compression will be considered later.

The parameters which are fixed in any design are: (a), the final magnetic field, $H_F$; (b), the initial volume of the injected plasma (taken as the overall initial effective volume of the reaction zone, $V_I$); and (c), the initial radius of curvature of the injected particle, $r_0$, (determined by physical structures in proximity to the containment zone since it is clear that $r_0$, must be chosen to be reasonably small compared to the diameter of the evacuated physical chamber). In that which is to follow, $r_0$, is defined as the radius of curvature of the injected particle when it traverses a terminal reflector region at injection, and thus when the particle motion is almost entirely rotational. Later it will be proved that during most of the reaction time after a long reaction cycle the ion distribution will be not far removed from Maxwellian; however, during injection and accumulation the particle energies distribution may quite abnormally favor higher energies and this will not be true for small systems with short reaction times where thermalizing, i.e., Maxwellizing, does not have time to occur, but this will not significantly modify the results obtained in the following:

Thus the total reactions, $N_T$, should more properly be written in terms of a final ion temperature, $T_F$ (reaction temperature).

(XXI) $\qquad N_T = \frac{1}{2} n_F^2 \overline{\sigma v}(T_F) V_F$

Upon radial compression the quantities of interest are transformed to the following:

$$n_F = n_I \cdot \alpha, \text{ where } \alpha \equiv \frac{H_F}{H_0}$$

$$V_F = V_I \cdot \frac{1}{\alpha}$$

and $$kT_F(\tfrac{2}{3}) \alpha W_0$$

(neglecting the initial parallel energy, which is generally small compared to $W_\perp(0)$.).

In $T_F$, the factor ($\tfrac{2}{3}$) appears from the fact that the mean kinetic energy in a Maxwellian distribution is, $\tfrac{3}{2} kT$.

To relate $r_0$ to the final energy employ the relationship:

$$\frac{m v_\perp^2(0)}{r_0} = \frac{H_0 e v_\perp(0)}{c}$$

$$v_\perp(0) = H_0 r_0 \left(\frac{e}{mc}\right)$$

But $$v_1(0) = (1+\xi^2)^{-1/2} v_0$$

$$\therefore (1+\xi^2)^{-1/2} v_0 = H_0 r_0 \left(\frac{e}{mc}\right)$$

$$\therefore W_0 = \frac{1}{2} m v_0^2 = \frac{1}{2}(1+\xi^2) m H_0^2 r_0^2 \frac{e^2}{m^2 c^2}$$

$$= \frac{(1+\xi^2)}{2} \cdot H_0^2 r_0^2 \cdot \frac{e^2}{mc^2}$$

$$= \frac{(1+\xi^2)}{2} \cdot \frac{H_F^2 r_0^2}{\alpha^2} \cdot \left(\frac{e^2}{mc^2}\right)$$

$$\therefore T_F = \frac{2}{3} \alpha W_0 = \frac{(1+\xi^2)}{3} \cdot \frac{e^2}{mc^2} \cdot \frac{(H_F r_0)^2}{\alpha}$$

Having shown that, very closely, $$n_I = n_0 \cdot \frac{2}{\xi^2} = \frac{2}{\xi^2} \frac{i_0}{\left(\frac{e}{c}\right) v_0} \quad (i_0 \text{ in emu amps cm.}^{-2})$$

Then, $$n_I = \frac{2}{\xi^2} \cdot \frac{i_0}{\left(\frac{e}{c}\right)} \cdot \frac{1}{H_0 r_0 (1+\xi^2)^{1/2}} \cdot \left(\frac{mc}{e}\right)$$

$$= 2\left(\frac{mc^2}{e^2}\right) \cdot \frac{i_0}{(1+\xi^2)^{1/2} \xi^2} \cdot \left(\frac{\alpha}{H_F r_0}\right)$$

Thus, $$n_F = \alpha n_I = 2\left(\frac{mc^2}{e^2}\right) \cdot \frac{i_0}{(1+\xi^2)^{1/2} \xi^2} \cdot \frac{\alpha^2}{(H_F r_0)}$$

For $\xi \ll 1$, $(1+\xi^2) \approx 1$, and for $n_F^2$ we have $$n_F^2 = 4\left(\frac{mc^2}{e^2}\right)^2 \frac{i_0^2}{\xi^4} \frac{\alpha^4}{(H_F r_0)^2}$$

The total reaction rate is then given by:

$$N_T = 2\left(\frac{mc^2}{e^2}\right)^2 \frac{i_0^2}{\xi^4} V_I \left\{ \frac{\alpha^3}{(H_F r_0)^2} \overline{\sigma v}\left(\frac{1}{3} \frac{e^2}{mc^2} \frac{(H_F r_0)^2}{\alpha}\right) \right\}$$

Let, $$F(\alpha, H_F r_0) = \left[\frac{\alpha^3}{(H_F r_0)^2} \overline{\sigma v}\left(\frac{1}{3} \frac{e^2}{mc^2} \frac{(H_F r_0)^2}{\alpha}\right)\right]$$

Then it is apparent that F ($\alpha$, $H_F r_0$) has a maximum as a function of $\alpha$ for fixed $H_F r_0$. This comes about from the physical fact that too large an $\alpha$, i.e., too low an initial field, does not raise the temperature to a high enough value, whereas, too small an $\alpha$ leads to a high particle energy, but does not take sufficient advantage of the increase in reaction rate due to densification.

Inserting numerical values and converting to practical units, e.g., for D—D:

$$N_T = 3.4 \times 10^{32} \frac{i_0^2}{\xi^4} V_I F(\alpha, H_F r_0) \text{ kev.}$$

$$n_F = 2.6 \times 10^{16} \frac{i_0}{\xi^2} \frac{\alpha^2}{H_F r_0}$$

$$T_F = \left[1.65 \times 10^{-8} \frac{(H_F r_0)^2}{\alpha}\right] \text{ kev.}$$

with $i_0$ in practical amperes/cm.² and $V_I$ in cc.

Also $$F(\alpha, H_F r_0) = \frac{\alpha^3}{(H_F r_0)^2} \overline{\sigma v}\left(1.65 \times 10^{-8} \frac{(H_F r_0)^2}{\alpha}\right) \text{ kev.}$$

Taking $H_F = 2 \times 10^4$ gauss, $r_0 = 6$ cm., for example, F and $T_F$ assume the following tabulated values as a function of $\alpha$:

Table

| $\alpha$ | F | $T_F$, kev. | $W_0$, kev. |
|---|---|---|---|
| 2 | $2.3 \times 10^{-26}$ | 102 | 90 |
| 4 | $6.7 \times 10^{-26}$ | 51 | 23 |
| 6 | $12 \times 10^{-26}$ | 35 | 10 |
| 8 | $15 \times 10^{-26}$ | 25.5 | 5.6 |
| 10 | $18 \times 10^{-26}$ | 20 | 3.6 |
| 12 | $21 \times 10^{-26}$ | 17 | 2.5 |
| 14 | $24 \times 10^{-26}$ | 14.5 | 1.8 |
| 16 | $33 \times 10^{-26}$ | 13 | 1.4 |
| 18 | $37 \times 10^{-26}$ | 11.5 | 1.1 |
| 20 | $32 \times 10^{-26}$ | 10.0 | 0.9 |

It can be seen that F is not a rapidly varying function of $\alpha$ except for small values of $\alpha$. It will also be noted that the maximum of F occurs at a relatively low $T_F$. This is because in this calculation no account has been taken of the variation of containment time with final temperature and of the variation of $i_0$ with injection voltage. The term $N_T$, being a reaction *rate*, must be multiplied by a factor related to the containment time to obtain total yield per combustion cycle. The general effect will be to depress the maximum to somewhat smaller values of $\alpha$, and thus to higher $T_F$ and $W_0$. A value of $\alpha$ of about 12 is considered near the optimum value under the conditions of this example.

To indicate the approximate behavior of the quantities of interest, tabulate $\alpha_{max}$, $F_{max}$, $F_{(\alpha=12)}$, $T_{F(max)}$, $T_{F(12)}$, and $W_{0(\alpha=12)}$ as a function of, $r_0$, with, $H_F = 2 \times 10^4$ gauss. As, for example, in the D—D reaction.

*Table*

| $r_0$ | $\alpha_{max}$ | $F_{max}$ | $F_{(12)}$ | $T_{F(max)}$, kev. | $T_{F(12)}$, kev. | $W_{0(12)}$, kev. |
|---|---|---|---|---|---|---|
| 3 cm | 6 | $4 \times 10^{-26}$ | | 10 | | |
| 6 cm | 18 | $37 \times 10^{-26}$ | $21 \times 10^{-26}$ | 11.5 | 17 | 2.5 |
| 12 cm | 28 | $350 \times 10^{-26}$ | $70 \times 10^{-26}$ | 30 | 70 | 10 |

In this example, which is considered to be representative of practically attainable values, corresponding to an individual combustion cycle in a medium to low power reactor, it is found, for $\xi=0.1$, $i_0=0.15$ amp./cm.$^2$ (i.e., one ampere per square inch), and $V_I = 3 \times 10^6$ cm.$^3$ (diameter$\approx$2 feet, length$\approx$30 feet, of containment zone) for the reaction:

$$N_T \approx 1.6 \times 10^{17} \text{ reactions/second}$$

$$N_F \approx 2.3 \times 10^{14} \text{ deuterons/cc.}$$

From the foregoing it is clearly apparent that the function F passes through a maximum value, and is a value which is a sharply varying function of $H_F r_0$, i.e. for $r_0 = 3$ cm., $\alpha_{max} = 6$ and for $r_0 = 6$ cm., $\alpha_{max} = 18$. Accordingly, small size systems of the character described can not effectively utilize radial compression alone, as the efficiency would be low. However, practical uses do exist for such low efficiency devices and radial compression is a significant factor in large systems.

AXIAL COMPRESSION

Now consider axial compression, i.e., the compression which is obtained by causing the reflector field regions to undergo translatory motion inwardly along the longitudinal axis of the system and the heating process associated herewith. Several means and methods of accomplishing such motion are considered equivalent including actual mechanical motion of the solenoids and/or other current carrying elements employed to produce the reflector fields, the switching of a series of coil segments distributed along the length of the containment zone, the use of field shaping means either in combination or alone, and others. In view of the phenomena associated with the behavior of a particle in such reflector regions, as noted above, one may intuitively discern that movement of two such reflector regions convergingly inward (proximally) along a radially contained magnetic field would result in restriction of particle paths to a smaller volume, i.e., produce a compressive effect somewhat analogous to the action of doubly opposed pistons in compressing a gas in a cylinder bore. However, that such a manipulation would produce heating of the particles in the plasma, is much more intangible. One manner of explaining the heating phenomena might note that the particles rebounding from the inwardly moving reflector regions undergo an upward "Doppler" shift by gaining energy and attendant velocity therefrom at every reflection. Liouville's theorem can also be invoked to explain the heating process on a statistical mechanical basis and determine the magnitude of the heating effect. A more rigorous derivation will be presented hereinafter.

To demonstrate the heating principle, consider the situations illustrated in FIGS. 10(a) and (b), representing typical particle "orbit" regions O at beginning and near completion of axial compression, respectively, with compression indicated in the Z (axial direction) while confined in the space PZ, Z, wherein PZ = Z component of the momentum in the Z direction. Upon moving reflector regions ($H_1$ and $H_2$) as shown in FIG. 10a to the positions ($H_1'$ and $H_2'$) in FIG. 10b, since the area A must remain constant (Liouville's theorem), $P_z$ must increase. From this consideration it may be seen that the following proportionalities exist, $$P_z \propto \frac{1}{Z_{Reflector}}, \text{ but } P_z \propto v_z, \text{ therefore, } v_z \propto \frac{1}{Z_{Reflector}}$$

and $v_z^2 \propto W_{\parallel} \propto \frac{1}{Z^2}$

Accordingly, it is found that the axial energy must increase at a rate proportional to the square of the axial compression, i.e. (L=distance between reflector fields).

(XXII) $\qquad \dfrac{W_{\parallel}('t)}{W_{\parallel}(0)} = \left[\dfrac{L(0)}{L(t)}\right]^2$ It was shown above, that $W_{\parallel}$ can not be increased disproportionately, otherwise the capabilities of the reflector fields are exceeded thus there will be a limitation as to the proportions of axial to radial compression which is permitted. Such limitation can be evaluated by a derivation which appears hereinafter.

Consider an operation proceeding through; (1), an injection cycle; (2), radial compression; and (3), axial compression, as follows: At the end of the injection cycle, the following conditions exist between the reflectors $$\frac{W_{\parallel}(Z)}{W_{\perp}(Z)} = (1+\xi^2)R_0 - 1$$

After radial compression $$\frac{W_{\parallel}(Z)}{W_{\perp}(Z)} = \frac{1}{\alpha}[(1+\xi^2)(R_0-1)] \approx \frac{1}{\alpha}[R_0-1]$$

After an axial compression, such that $$K.L_F = L_0, K > 1$$

$$\frac{W_{\parallel}}{W_{\perp}} = \frac{K^2}{\alpha}(R_0-1)$$

using a result obtained previously.
But for reflection to occur, $$\frac{W_{\parallel}}{W_{\perp}} \leq (R_F - 1)$$

$$\therefore \frac{K^2}{\alpha}(R_0-1) \leq (R_F-1)$$

(XXIII) $\qquad \therefore \dfrac{K^2}{\alpha} \leq \dfrac{R_F-1}{R_0-1}$ where $R_0$ = initial reflector ratio
$R_F$ = final reflector ratio This relationship demonstrates that $R_F$ should be a design feature made as large and $R_0$, as small as practicable to maximize the attainable axial compression, in the above-indicated mode of operation.

The foregoing may be derived in a more rigorous manner by noting that the energy gain in a reflection process occurring in moving reflector frame can be found by performing a Lorentz transformation to the frame in which the magnetic field is at rest. In this latter frame the field is static and can transfer no energy, so that an elastic "collision" (reflection) takes place. Finally, transforming in reverse to the laboratory or practical frame one finds the energy gain.

In the present instance, the problem will be treated relativistically and thus deal with the relativistic energy and momentum components of the particles.

Let $p_r$ = transverse momentum $p_z$ = axial momentum $p_r^2 = p_x^2 + p_y^2$

The angle of the particle helix path is given by the relation $$\frac{p_r}{p_z} = \tan \theta$$

as indicated in FIG. 11.

In general the relativistic momentum is defined by $$p_{x,y,z} = \frac{mv_{x,y,z}}{\sqrt{1-\frac{v_0^2}{c^2}}}$$

Thus in the notation herein employed, $$p_z = \frac{mv_{\parallel}}{\sqrt{1-\frac{v_0^2}{c^2}}}$$

$$p_r = \frac{mv_{\perp}}{\sqrt{1-v_0^2/c^2}}$$

and $$E = \frac{mc^2}{\sqrt{1-\frac{v_0^2}{c^2}}} = mc^2 + (W_{\parallel} + W_{\perp}) = \text{energy}$$

The treatment of the problem can be greatly simplified when it is noted that, $p_x$, $p_y$, $p_z$ and $$\frac{E}{c^2}$$

form a 4-vector system which may be transformed similarly to $x$, $y$, $z$, and $t$.

Thus, $p_r$, $p_z$ and E may be transformed similarly to $r$, $z$, and $t$ in cylindrical coordinates, where the relative velocity of the frames is in the $z$ direction.

This mathematical transformation is performed as follows:

$$z' = \gamma(z - vt)$$
$$r' = r$$
$$t' = \gamma\left(t - \frac{v}{c^2}z\right)$$
$$\gamma = \frac{1}{\sqrt{1-\frac{v^2}{c^2}}}$$

$v$ = velocity of frame $S'$
$t$ = time

Thus the following is immediately obtained:

$$p_z' = \gamma\left(p_z - v\frac{E}{c^2}\right)$$
$$p_r' = p_r$$
$$E' = \gamma(E - vp_z)$$

Consider now the physical situation with reference to FIG. 12 wherein portion $a$ indicates the situation before reflection and, portion $b$, after reflection.

Transform to the moving frame:

$$\left.\begin{array}{l} p_z' = \gamma\left(p_z + \frac{v}{c^2}E\right) \\ E' = \gamma(E + vp_z) \\ p_r' = p_r \end{array}\right\} \text{Moving frame}$$

Reflection now takes place, $p_z$ is reversed but unchanged in magnitude and E is unchanged. Transforming in reverse $$\left.\begin{array}{l} p_z'' = -\gamma\left(p_z' + \frac{v}{c^2}E'\right) \\ p_r'' = p_r' \\ E'' = \gamma(E' + vp_z') \end{array}\right\} \begin{array}{l} \text{Laboratory or} \\ \text{practical frame,} \\ \text{after reflection} \end{array}$$

Substituting:

$$p_z'' = -\gamma\left[\gamma\left(p_z + \frac{v}{c^2}E\right) + \frac{v}{c^2}\gamma(E + vp_z)\right]$$

$$E'' = \gamma\left[\gamma(E + vp_z) + v\gamma\left(p_z + \frac{v}{c^2}E\right)\right]$$

$$p_r'' = p_r$$

$$\therefore p_z'' = -\gamma^2\left[\left(1+\frac{v^2}{c^2}\right)p_z + 2\frac{v}{c^2}E\right]$$

$$p_r'' = p_r$$

$$E'' = \gamma^2\left[\left(1+\frac{v^2}{c^2}\right)E + 2vp_z\right]$$

Noting that $p_z$ is changed and that $p_r$ is not, then only $W_{\parallel}$ is altered by the reflection.

Now $$\frac{p_r}{p_z} = \tan \theta = \frac{\frac{mv_{\perp}}{\sqrt{1-\frac{v_0^2}{c^2}}}}{\frac{mv_{\parallel}}{\sqrt{1-\frac{v_0^2}{c^2}}}} = \frac{v_{\perp}}{v_{\parallel}}$$

i.e., since $v_0^2 = v_{\parallel}^2 + v_{\perp}^2$, $$\frac{v_{\parallel}}{v_0} = \cos \theta$$

But $$p_z = \gamma_0 m v_{\parallel}, \text{ where } \gamma_0 = \frac{1}{\sqrt{1-\frac{v_0^2}{c^2}}}$$

$$\therefore p_z = \gamma_0 m v_0 \cos \theta$$

Let $$\beta = v_0/c \text{ and } B = v/c$$

$$\therefore E'' = \frac{1}{1-B^2}[(1+B^2)E + 2Bc\gamma_0 m\beta c \cos \theta]$$

$$= \frac{1}{1-B^2}[(1+B^2)E + 2\beta B \cos \theta(\gamma_0 mc^2)]$$

$$\therefore \frac{E''}{E} = \frac{1 + 2\beta B \cos \theta + B^2}{1-B^2}$$

Now $$E'' = mc^2 + W_{\parallel}(1) + W_{\perp}(1)$$

(1) denotes after one reflection.

$$E = mc^2 + W_{\parallel}(0) + W_{\perp}(0)$$

$$\therefore \frac{1 + \left[\frac{W_{\parallel}(1)}{mc^2} + \frac{W_{\perp}(1)}{mc^2}\right]}{1 + \left[\frac{W_{\parallel}(0)}{mc^2} + \frac{W_{\perp}(0)}{mc^2}\right]} = \frac{1 + 2\beta B \cos \theta + B^2}{1-B^2} = \frac{E''}{E}$$

Now in the present case:

$B_c \approx 3 \times 10^3$ cm./sec. for example $\beta_c \approx 3 \times 10^8$ cm./sec.

$\therefore B \approx 10^{-7}, B^2 \approx 10^{-14}$ $\beta \approx 10^{-2}, \beta B \approx 10^{-9}$ and also $$\frac{W_{\parallel}}{mc^2} \approx 10^{-4} \text{ at most}$$

$$\therefore \left(1 + \frac{W_{\parallel}(1)}{mc^2} + \frac{W_{\perp}(1)}{mc^2}\right)\left(1 - \frac{W_{\parallel}(0)}{mc^2} - \frac{W_{\perp}(0)}{mc^2}\right) \approx$$

$$1 + 2\beta B \cos \theta + 2B^2$$

i.e., $$1 + \frac{W_{\parallel}(1)}{mc^2} - \frac{W_{\parallel}(1)}{mc^2} \approx 1 + 2\beta B \cos \theta + 0(B^2)$$

i.e., $W_{\shortparallel}(1) - W_{\shortparallel}(0) \approx 2mc^2\beta B \cos\theta$ to linear terms in B.

$$\Delta W_{\shortparallel} = 2m\frac{v_0}{\not{c}} \cdot \frac{v}{\not{c}} \cos\theta = 2mv_{\shortparallel}v$$

Now, as in compression, if a first reflector is located $L(t)$ from a second, the number of reflections per unit time is $=\frac{v_{\shortparallel}(t)}{2L(t)}$ Thus the energy gain per second is, noting that $$v = -\frac{dL}{dt}:$$

$$\frac{dW_{\shortparallel}}{dt} = 2mv_{\shortparallel}v \cdot \frac{v_{\shortparallel}}{2L(t)} = \left(\frac{1}{2}mv_{\shortparallel}^2\right)\left(-2\frac{dL}{dt}\cdot\frac{1}{L}\right)$$

i.e., $$\frac{1}{W_{\shortparallel}}\frac{dW_{\shortparallel}}{dt} = -2\frac{1}{L}\frac{dL}{dt}$$

which yields $$\frac{W_{\shortparallel}}{W_{\shortparallel}(0)} = \left[\frac{L(0)}{L(t)}\right]^2$$

the identical relation found above, which relation signifies that, provided the compression is accomplished in a time period which is shorter than the thermalizing time, the axial compression results in a quadratic increase in $W_{\shortparallel}$, and no appreciable change in $W_{\perp}$.

The energy gains in radial and axial compressions have thus far been computed not only under the assumption that they were adiabatic compressions, but also under the assumption that a negligible number of interactions would occur between the particles during the compression times. As shown hereinafter, for the rapid compressions and correspondingly short times contemplated herein, this is indeed the case for the heavy particles, but that it is not true for the electrons. Thus the ions are far from thermodynamic equilibrium during the compressions, but the electrons pass through a continuous set of "equilibrium" states.

To deduce this fact calculate the order of magnitude of the collision times for a large angle encounter of the particles. The result is that the thermalizing time of a group of particles, that is, the time that it takes an ordered group of particles to become nearly random, is about equal to the mean time for a single large angle scattering process. However, to find the collision time it is necessary to determine the collision cross-sections. Assuming that no collective phenomena (e.g., plasma oscillations) of comparable importance are present, the coulomb cross-section for one close encounter is approximately equal to $$\sigma_c \approx \frac{e^4}{\overline{W^2}}$$

where $\overline{W^2}$=mean square energy and $e$=charge.

This can be shown by simply computing the distance to which two charges must approach so that their mutual coulomb repulsive energy is equal to the kinetic energy, i.e., $$\frac{e^2}{r} \approx W$$

$$\therefore r \approx \frac{e^2}{W}$$

and thus $$\sigma_c \approx r^2 \approx \frac{e^4}{W^2}$$

Now it is found that the effect of distant collisions is more important than the close ones, since they are so much more frequent. This can be shown from the following considerations:

The impulse given to a particle by a coulomb interaction as it passes another equal mass particle is just $F \cdot dt$ for the collision. $F \cdot dt = d(mv)$. Now $F = Ee$, and $dt$ is about the time required to pass through a distance equal to the collision parameter of the other particle, i.e., $$dt \approx \frac{r}{v}$$

as is conventionally illustrated in FIG. 13 of the drawing.

$$\therefore d(mv) \approx Ee \cdot \frac{r}{v} = \frac{e}{r^2} \cdot e \cdot \frac{r}{v} = \frac{e^2}{rv}$$

The distant collisions are random in their momentum transfer, so that the net momentum change is proportional to the square root of the number of encounters, i.e., $$\overline{(\Delta P)^2} \propto \text{the number of encounters}$$

Also, the number of particles which lie in a cylinder of radius $r$ and thickness $dr$ as the particle moves a distance $\lambda$ is simply $n_0 \pi r dr \cdot \lambda$. Thus the total mean square momentum transfer in moving a distance $\lambda$ is $$\overline{(\Delta P)^2} = \frac{e^4}{r^2 v^2} \cdot 2\pi r dr \cdot \lambda n_0 = 2\pi \frac{e^4}{v^2} \cdot \frac{dr}{r} \cdot \lambda n_0$$

To find the total momentum transfer integrate the above expression over $r$.

$$\therefore \overline{(\Delta P)^2} = \frac{2\pi e^4}{v^2} \cdot \log \frac{r_{max}}{r_{min}} \cdot \lambda n_0$$

Leaving for the moment the question of what the value of the logarithmic ratio represents, consider the significance of the ratio $$\frac{\overline{(\Delta P)^2}}{P^2} = 2\pi \frac{e^4}{m^2 v^2} \cdot \log \frac{r_{max}}{r_{min}} \cdot \lambda n_0$$

When $\lambda$ is large enough so that $$\frac{\overline{(\Delta P)^2}}{P^2} \approx 1$$

then enough momentum will have been transferred to the particle to change its direction through a large angle. (On the average the mean square momentum change will be about $\frac{1}{3}P^2$ along each coordinate axis.) Thus $\lambda$ is the mean free path for the occurrence of a large angle scatter process by distant collisions with particles of the same or larger mass, i.e., ion-ion, electron-electron, or electron-ion collisions. We have then $$l = 2\pi \frac{e^4}{m^2 v^4} \cdot \log \frac{r_{max}}{r_{min}} \cdot n_0 \lambda$$

But $$\lambda = \frac{1}{n_0 \sigma} \text{ by definition}$$

$$\therefore \sigma_d \approx 2\pi \frac{e^4}{m^2 v^4} \log \frac{r_{max}}{r_{min}} \approx \frac{e^4}{W^2} \log\left(\frac{r_{max}}{r_{min}}\right)$$

It can be seen that $\sigma_d$ (distant collisions) is just $\sigma_c$ (close collisions) multiplied by the factor $$\log\left(\frac{r_{max}}{r_{min}}\right)$$

The value of $r_{min}$ in the logarithm corresponds to the minimum distance of approach of the particles—given approximately by the distance at which the coulomb energy equals the particle energy. As before $$\frac{e^2}{r_{min}} = W$$

$$r_{min} = \frac{e^2}{W}$$

The value of $r_{max}$ is clearly not infinite, since it can surely be no more than the size of the plasma itself. Thus the cross-section is bounded. Actually, $r_{max}$ is much less than the dimensions of the plasma because the plasma itself acts to shield the effect of one particle from another. That is, as a particle moves through the plasma cloud, the presence of intervening charges will tend to shield the effect of another charge. This shielding distance ($\lambda_D$) is the so-called Debye length, $$\lambda_D = \sqrt{\frac{kT_e}{4\pi n e^2}} \quad (kT_e \text{ is } kT \text{ for the electrons})$$

Later the significance of $\lambda_D$ in the behavior of a plasma will be considered; however, the magnitude of $\lambda_D$ will be determined.

Firstly, consider a representative case:

$kT_e \approx 10$ kev., i.e., $T_e \approx 10^3$ °K $\therefore kT_e \approx 10^4 \times 1.6 \times 10^{-12} \approx 1.6 \times 10^{-8}$ ergs.

$n = 10^{14}$ (an appropriately representative practical density)

$$\therefore \lambda_D = \sqrt{\frac{1.6 \times 10^{-8}}{4\pi \times 10^{14} \times 25 \times 10^{-20}}} = r_{max.} \approx 7 \times 10^{-3} \text{ cm.}$$

Also, for $W \approx 100$ kev.=particle energy $$r_{min.} \approx \frac{25 \times 10^{-20}}{10^5 \times 1.6 \times 10^{-12}}$$

$$\approx 2 \times 10^{-12} \text{ cm.}$$

$$\therefore \frac{r_{max.}}{r_{min.}} \approx \frac{7 \times 10^{-3}}{2 \times 10^{-12}} \approx 3 \times 10^9$$

$$\log\left(\frac{r_{max.}}{r_{min.}}\right) \approx 20$$

Thus we see that the effective cross-section for distant encounters is estimable at about 20 times the cross-section for close encounters of the particles. A more precise calculation yields $\sigma_d \approx 10\sigma_c$ $\sigma_d$=distant encounters $\sigma_c$=close encounters The cross-sections for large angle encounters for ions (e.g., deuterons) can now be calculated and from these results collision frequencies and times can be determined (e.g., deuterons at 100 kev.+$n=10^{14}$).

$\overline{W}_D \approx 200$ kev.

$$\sigma_c \approx \frac{5 \times 10^{-38}}{(2 \times 10^5 \times 1.6 \times 10^{-12})^2}$$

$\approx 0.5 \times 10^{-24}$ cm.² (due to ion-ion collisions; electron-ion collisions are almost always less important, as will be seen later)

$$\therefore \tau_D = \frac{1}{n\sigma_d} v_D \approx \frac{1}{10^{14} \times 5 \times 10^{-24} \times 4 \times 10^8}$$

$\approx 5$ seconds (thermalizing time as only an approximation)

At injection the electron temperature will probably be around 50 volts or perhaps even less in the space charge neutralized beam.

$\therefore$ with $n=10^{12}$ (density injection)

$$\sigma_c(\text{electrons}) \approx \frac{5 \times 10^{-38}}{(50 \times 1.6 \times 10^{-12})^2} \approx 10^{-17} \text{ cm.}^2$$

$\therefore \sigma_d \approx 10^{-16}$ cm.² (Thermalizing time for electrons due to electron-electron and electron-ion collisions becoming much less for lower initial temperatures)

$$\tau_e = \frac{1}{n\sigma_d} v_e \approx 2 \times 10^{-4} \text{ seconds}$$

Thus it is seen that the "thermalizing," i.e., "Maxwellizing" time for the deuterons is long compared to the compression times, whereas, the same time for the electrons is short compared to compression times. The term "thermalizing" is used herein to indicate the process whereby a system having an ordered distribution of particle energies is transformed to a system of disordered or random distribution of particle energies. In the present process, the energy of the ionic fuel particles as they are injected may be a highly ordered distribution, i.e., the majority of the particles are heated to about the average injection energy with only a few cool ions present. The implications of this state of facts are of great significance since the compression processes for the ions described hereinbefore, proceed, not in thermodynamic equilibrium, i.e., the various coordinate or component energies are uncoupled from each other, whereas for the electrons the processes are in quasi-equilibrium. Therefore it is necessary to consider the temperature relationships in an adiabatic compression, where the number of degrees of freedom is different for different particles of the system.

We have in general $$\frac{T}{n^{\gamma-1}} = \text{constant or } Tv^{\gamma-1}$$

$\qquad =$ constant (where $v$=specific volume)

The ratio $$\gamma = \frac{c_p}{c_v} = \frac{f+2}{f}$$

where $c_p$=heat capacity at constant pressure $c_v$=heat capacity at constant volume $f$ is the number of degrees of freedom of the system. For the electrons $f=3$ (i.e., all degrees of freedom are coupled), so that $$\gamma = \frac{3+2}{3} = \frac{5}{3}, \gamma - 1 = \frac{2}{3}$$

$$\therefore \frac{T}{N^{2/3}} = \text{constant or } Tv^{2/3} = \text{constant}$$

i.e., $$\text{i.e., } \frac{T_2}{T_1} = \left(\frac{v_1}{v_2}\right)^{2/3}$$

For axial compression by a factor K, $$\frac{T_2}{T_1} = \left(\frac{L_0}{L_F}\right)^{2/3} = K^{2/3}$$

This is a much less marked gain of energy than in the case of the ions, signifying that most of the compressive energy is used to heat the ions, a very desirable result.

Similarly for the electrons in the radial compression:

$$\frac{T_2}{T_1} = \left(\frac{n_F}{n_0}\right)^{2/3} = \left(\frac{H_F}{H_0}\right)^{2/3}$$

The foregoing means that unless compression is performed very slowly the ions are not thermalized during the compression while the electrons are quite continuously thermalized.

As discussed in a preliminary fashion hereinbefore, certain processes contribute to the loss of an ion from the machine by "thermalizing," i.e., by changing the original preferred orientation in space to one where it may lie in the loss cone for the mirrors. It was therein approximated than an ion distribution would be randomized in a time about equal to the mean time for the occurrence of one large angle encounter. As has been shown supra, the cross-section for a large angle scatter due to distant ion-ion (D-D) collisions is:

$$\sigma_d \approx 10 \frac{e^4}{\overline{W}_D^2}$$

so that $$t_{ii} \approx \frac{1}{n\sigma_d \overline{v}}$$

To a zeroth approximation $$\overline{\sigma_d v} \approx 10 \frac{e^4}{W_D{}^2} \cdot c \sqrt{\frac{2W_D}{mc^2}} \cdot \sqrt{2}$$

$$\approx 10 \frac{e^4 c}{\sqrt{mc^2}} \cdot W_D{}^{3/2}$$

$$\approx 3.8 \times 10^{-25} W_D{}^{3/2}$$

(XXIV) $\therefore t_{ii} \approx 2.6 \times 10^{24} \frac{W_D{}^{3/2}}{n}$

This is roughly the time for one large angle scatter process due to distant encounters (as judged by the time for a change of the energy of the ion such that the change along a coordinate axis is on the average about equal to the original energy).

Comparing with the similar case for electrons, in which $$t_{ei} = 2.2 \times 10^{25} \frac{\overline{W_e}{}^{3/2}}{n_e} \quad (\overline{W_e} \ll W_D)$$

it is seen that since $n_e = n$ the electrons have a smaller effect as $\overline{W_e}$ approaches $W_D$. But since it has been shown above that the electron temperature must lie somewhat below the ion temperature the two processes actually compete on an approximately equivalent basis. To more fully appreciate the significance, consider now a physical picture of the thermalizing process and the losses by diffusion through the reflectors, initiated thereby. At the end of the compression processes, which may be assumed to be accomplished in times short compared to the ion thermalizing times, the energy component ratios $$\frac{W_\perp}{W_{||}}$$

of all the ions will be in fairly well defined ranges, so that if one plots a distribution of the ions versus angle (now measured with respect to an axis *perpendicular* to the magnetic field), one would have distributions at this time, as illustrated, approximately, in FIG. 14(*a*), within the containment zone, with ions proceeding in both directions in fairly narrowly defined ranges of helical angles. As time passes this distribution will broaden, as shown in FIG. 14(*b*). If there were no losses at the reflectors, the distribution would assume a constant value independent of $\phi$, i.e., isotropic in velocity space, as shown in FIG. 14(*c*). Actually, as soon as a particle reaches a critical angle $\phi c$, defined by the reflector field ratio R it may be lost, so that the distribution approaches zero at these points, as shown in FIG. 14(*d*). Therefore, at about this time loss of particles will commence. The loss will proceed at a rate determined by the fractional solid loss angle of the mirrors and by the rate of change of angle of the ions of the, now, thermalizing fuel ions, e.g. (deuterons). The decay will follow a $$\frac{1}{t}$$

law to a first approximation. Roughly speaking, the time for loss of half of the particles should be given by the thermalizing time, $t_{ii}$, multiplied by the reciprocal of the fractional loss solid angle. Thus the time for loss of one-half of the fuel should be considerably larger than the thermalizing time, particularly for large reflector to radial magnetic field ratios R; therefore, loss of this nature is tolerable and subject to minimization by appropriate procedure.

The foregoing indicates that ionic fuel charge loss from the containment zone proceeds in two stages:

(1) An initial thermalization.
(2) A much slower process (particularly with large reflector ratios) in which the ions repeatedly encounter the reflector regions before successfully penetrating the barrier and being lost from the system.

In summary:

$$t \text{ loss} = t\left(\frac{2\pi}{r \text{ loss}}\right) \approx \frac{2H_R}{H_0} t_{ii}$$

Density decays as $\frac{1}{t}$, i.e.

$$n_{\text{contained at any time}} \sim \frac{t_{\text{loss}}}{t}$$

OPTIMIZATION OF COMPRESSION

With the foregoing in mind return now to the problem of optimizing compressions, i.e., combination of radial and axial compressions. Two cases may be considered, i.e., that in which (1) Axial compression is rapid compared to ion thermalizing times.
(2) Axial compression is slow compared to ion thermalizing times (or comparable in time). This latter case will be deferred until the discussion of decompression.

For case (1), it is necessary to modify the expression found above for radial compression to include this axial compression. This is simple if one remembers that $\alpha$ and K must be chosen to satisfy the condition of reflection found above, i.e., $$\frac{K^2}{\alpha} \leq \frac{R_F - 1}{R_0 - 1}$$

$R_F$ = final reflector ratio
$R_0$ = initial reflector ratio

Letting $$\frac{R_F - 1}{R_0 - 1} = M$$

a new parameter of the design, which is to be made as large as possible to maximize the containment time, then $K^2 = \alpha M p$, with $p < 1$, and chosen to assure a safe margin of reflection. The choice, of $p$ depends on more detailed knowledge of the containment time as a function of $$\frac{W_{||}}{W_\perp}$$

at the end of the compression cycle. Then the following is obtained:

$$T_F = \frac{2}{3} \alpha W_0 f(p) \frac{1}{3} \frac{e^2}{mc^2} \cdot \frac{(H_F r_0)}{\alpha} f(p)$$

where $f(p)$ is to be calculated from the chosen value of $p$ and the resulting value of $K^2$. For example, if $p$ is so chosen that at the end of the compression $\theta = 45°$, i.e., $W_\perp = W_{||}$, then $f(p) = 2$ (neglecting the initial energy parallel to the magnetic field). Also, from above:

$$n_F = \alpha K n_1, \therefore n_F{}^2 = \alpha^2 K^2 n_I{}^2 = \alpha^3 M p n_I{}^2$$

$$V_F = V_I \cdot \frac{1}{\alpha K} = V_I \cdot \frac{1}{\alpha} \cdot \frac{1}{\alpha^{1/2} M^{1/2} p^{1/2}}$$

Thus the total reaction rate can be written:

$$N_T = 2\left(\frac{mc^2}{e^2}\right) \frac{i_0{}^2}{\xi^4} V_I \cdot G(\alpha, H_F r_0, M, p)$$

where G is found from the above and from the previous function F to be:

$G(\alpha, H_F r_0, M, p) =$ $$\left\{ \frac{M^{1/2} p^{1/2}}{(H_F r_0)^2} \alpha^{7/2} \cdot \overline{\sigma v} \left[ \frac{1}{3} \frac{e^2}{mc^2} \frac{(H_F r_0)^2}{\alpha} \cdot f(p) \right] \text{ kev.} \right\}$$

The function G, for typical values of $p$, will have a maximum at somewhat higher values of $\alpha$ than F ($\alpha$, $H_F r_0$) considered hereinbefore, but will not be greatly different otherwise. Small systems will benefit considerably in the above because of the higher value of $T_F$, that can be achieved. In larger systems the optima are about as before; however, the larger systems benefit for other reasons noted hereinafter. It should be noted that by the use of axial compression the total volume within which a high magnetic field must be maintained is reduced by a factor of $1/K$, so that the *yield per unit length of high magnetic field* is increased by the factor $K^2$. Other advantages attending the use of axial compression and decompression will be discussed later.

In order to fully appreciate the foregoing, it is necessary now to discuss the problem of the rate of energy transfer from deuterons to electrons. This is of importance in estimating the electron temperature relative to ion kinetic energy throughout the cyclic operation of the system, and thus to be able to compute the effect of the electrons on the ion diffusion, in simple cases, at least. By using the same sort of calculation method which was discussed above, an expression can be derived for the rate of energy transfer from an energetic deuteron to a cloud of cold electrons. This expression was derived a few years ago by the astrophysicists, was published in an astrophysical journal and has come to be of great importance in the thermonuclear field, generally.

Such expression is as follows:

$$\frac{dW_D}{dt} = \frac{4\pi n_e^4}{\sqrt{\pi m_e k T_e}} \cdot \frac{m_e}{m_D} \left(\log \frac{r_{max}}{r_{min}}\right)\left(1 - \frac{W_D}{\frac{3}{2}kT_e}\right) \text{ ergs/sec.}$$

This expression is not quite correct, and when bremsstrahlung is taken into account it must be modified somewhat.

For $\frac{3}{2}kT_e \ll W_D$ this becomes $$\frac{1}{W_D}\frac{dW_D}{dt} = -\frac{4\pi e^4 \left(\frac{m_e}{m_D}\right) n_e \cdot 10}{\sqrt{\pi m_e} \cdot \frac{3}{2}(kT)^{3/2}}$$

$$\approx 4.5 \times 1^{-26} \frac{n_e}{\overline{W}_e^{3/2}} \text{ where } \overline{W}_e = \frac{3}{2}kT_e$$

$$= -\rho \frac{n_e}{\overline{W}_e^{3/2}} \text{ (where } \rho \text{ represents the number } 4.5 \times 10^{-26}\text{)}$$

The expression bears a little study, for it has significant implications relating to the criteria of feasibility of certain approaches to the provision of controlled thermonuclear reactions. One typical proposal is to bombard a very low energy plasma with a high energy deuteron beam. If the plasma temperature is assumed to be fixed by the constants of the discharge, then $\overline{W}_e$ is constant, and for any given deuteron initial energy one can integrate the expression and find $$\frac{W_D(t)}{W_D(0)} = e^{-\frac{t}{t_{ei}}}$$

where $$t_{ei} = \frac{\overline{W}_e^{3/2}}{n_e} \times 2.2 \times 10^{25} \text{ seconds}$$

With $\overline{W}^{3/2} = -0$ volts, for example, and $n_e = 10^{14}$ $$\underline{\underline{t_{ei} = \frac{(10 \times 1.6 \times 10^{-12})^{3/2}}{10^{14}} \times 2.2 \times 10^{25} = 14 \times 10^{-6} \text{ seconds}}}$$

Thus every deuteron has lost all but $1/e$ of its energy in 14 microseconds. This is obviously much less than the mean reaction time, which at this density is 250 seconds for D-D and 5 seconds for, D-T, and only a few reactions might ensue in such a system. The exchange times become appreciable with much higher electron energies. For example at 20 kev., $$t_{ei} = 12 \times 10^{-6} \left(\frac{2 \times 10^4}{10}\right)^{3/2} \approx 2 \text{ seconds}$$

Actually, in the systems of the invention, the electron temperature is not held fixed, but rises with time by energy transfer from the ions from the adiabatic compressions. Thus the energy transfer times above do not apply and, therefore, do not prohibit reactions when performed in accordance with the invention.

In the present case it is necessary to rearrange the expression somewhat, taking account of the fact that energy lost from the deuterons is energy gained by the electrons, i.e., $$\frac{dW_D}{dt} = -\frac{d\overline{W}_e}{dt}$$

Thus $$\frac{1}{W_D} \cdot \frac{dW_D}{dt} = -\frac{1}{W_D}\frac{d\overline{W}_e}{dt} = -\rho \frac{n_e}{\overline{W}_e^{3/2}}$$

and therefore, $$\overline{W}_e^{3/2}\frac{d\overline{W}_e}{dt} = +\rho n_e W_D$$

wherein $\rho =$ density.

Under the assumption that this mechanism is the most important means of energy transfer to the electrons, this expression can be integrated to find $\overline{W}_e$ as a function of time.

$$\int_0^T \overline{W}_e^{3/2} d\overline{W}_e = \rho \int_0^T n_e(t) W_D(t) dt$$

$$[\overline{W}_e(T)]^{5/2} = \frac{5\rho}{2}\int_0^T n_e(t) W_D(t) dt$$

inasmuch as $\overline{W}_e(0) \ll \overline{W}_e(t)$.

The function $n_e(t)$ can be found immediately from the compression equations. Also, the function $W_D(t)$ can be written immediately from the compression equations if it can be shown that the most important energy changes in the deuteron component come about through the compression energy gains. It is of interest to compute the initial transfer time, $t_0$, at the beginning of the compression cycle and compare this to the energy gain times.

Assume initially, $n_e \approx 10^{12}$, $\overline{W}_e \approx 100$ volts (very roughly). Then $$t_0 \approx \frac{(100 \times 1.6 \times 10^{-12})^{3/2}}{10^{12}} \times 2.2 \times 10^{25}$$

$$\approx 5 \times 10^{-2} \text{ seconds}$$

if the electrons are kept at 100 volts. Actually their temperature will rise immediately, and thus the transfer rate will decrease with ever increasing rapidity. Now if the compression cycle itself is performed, for example, in between $10^{-2}$ and $10^{-1}$ seconds, it can be seen that the deuterons are overwhelmingly controlled in their energy by the compression process and ion heating will occur as shown above.

Thus if the compression time (radial for example) is $T$, to a fairly accurate approximation, $n_e$ and $W_D$ are linear functions of the time, such that at, $t=0$, $n=n_1$, and at $t=T$, $n=n_2$, and also that at $t=0$, $W_D=W_1$, and at $t=T$, $W_D=W_2$.

$$\therefore n_e(t) = n_1\left[1 + \frac{n_2 - n_1}{n_1}\frac{t}{T}\right]$$

and $$W_D(t) = W_1\left[1 + \frac{W_2 - W_1}{W_1}\frac{t}{T}\right]$$

$$\therefore \overline{W}_e^{5/2} = \frac{5\rho}{2}\int_0^T n_1 W_1\left[1 + \frac{n_2 - n_1}{n_1}\frac{t}{T}\right]\left[1 + \frac{W_2 - W_1}{W_1}\frac{t}{T}\right]dt$$

$$= \frac{5\rho}{2}n_1 W_1 T\left[-\frac{1}{3}\left(\frac{\overline{n}}{n_1} + \frac{\overline{W}}{W_1}\right) + \frac{4}{3}\left(\frac{\overline{n}}{n_1}\right)\frac{\overline{W}}{W_1}\right]$$

with $$\frac{\overline{n}}{n_1} \gg 1 \text{ and } \frac{\overline{W}}{W_1} \gg 1$$

$$\frac{\overline{n}}{n_1} = \frac{n_2 + n_1}{2n_1} \approx \frac{n_2}{2n_1}, \frac{\overline{W}}{W_1} \approx \frac{W_2}{2n_2}$$

and $$\frac{\overline{W}}{W_1} \cdot \frac{\bar{n}}{n_1} \gg \frac{n}{n_1} \text{ or } \frac{\overline{W}}{W_1}$$

$$\therefore \overline{W_e}^{5/2} \approx \frac{5\rho}{2} n_1 W_1 T \left[ \frac{\overline{k}}{3} \frac{n_2}{\sum n_1} \frac{W_2}{\overline{Z} W_1} \right]$$

i.e., $\overline{W_e} \approx (5/6 \rho T n_2 W_2)^{2/5}$ at the end of the compression.

It is apparent that the final electron temperature is determined primarily by the final values of the fuel ion (deuteron) densities and energies and is a slowly varying function of these and of the total compression time.

To more easily visualize the orders of magnitude involved, take an example wherein $n_2 = 10^{14}$, $W_2 = 100$ kev., and $T = 0.1$ second.
Then $$\overline{W_e} \approx (5/6 \times 4.5 \times 10^{-26} \times 0.1 \times 10^{14} \times 10^5 \times 1.6 \times 10^{-12})^{2/5} \text{ ergs}$$

$\approx 2.1 \times 10^{-8}$ ergs
$\approx 13$ kev.

At the end of the cycle of compression, $n_2$ and $W_2$, will be approximately constant and $$\overline{W_e} \propto t^{2/5}$$

so that at the end of 1 second $\overline{W_e} \approx 13$ kev. $(10)^{2/5}$
$\approx 32$ kev.

As the temperature of the electrons begins to approach within less than an order of magnitude of $W_D$, the transfer rate is reduced (see original equation) and other mechanisms become important. Other investigators have shown that for a plasma in equilibrium at 100 kev., the energy transfer to the electrons is so slow that bremsstrahlung will keep the electron temperature at about 50 kev. At lower electron temperatures this effect is much less pronounced. It should be noted, in this limit where the energy lost by bremsstrahlung is equal to and is thus limited by the energy transfer rate from deuterons to electrons, that the effect of higher Z additives or contaminants in the system would be to depress the electron temperature until the energy transfer rates were again high enough to maintain the bremsstrahlung radiation rate, the emission of which varies as $\overline{Z}^2$. Since the bremsstrahlung also varies at $T_e^{1/2}$, and the energy transfer rate as $$\frac{T_D}{T_e^{3/2}} \left( \frac{\overline{Z}^2}{A} \right)$$

then $$\overline{Z}^2 T_e^{1/2} \propto \frac{T_D}{T_e^{3/2}} \cdot \left( \frac{Z_2}{A} \right)$$

where, $$\left( \frac{\overline{Z}^2}{A} \right) \text{ is the mean of } \left( \frac{Z^2}{A} \right)$$

and $A$ = atomic weight. The term $$\left( \frac{\overline{Z}^2}{A} \right)$$

is to be incorporated in the energy transfer rate if the contaminant particles are in thermal equilibrium with the deuterons. Actually the contaminant atoms are not at all near equilibrium during the containment times contemplated so that $$\left( \frac{\overline{Z}^2}{A} \right)$$

will be more nearly that of the deuterons alone. Moreover, because of the large difference between $\overline{Z}^2$ and $$\left( \frac{\overline{Z}^2}{A} \right) \approx \overline{Z}$$

the correction introduced is almost negligible in any case. More fully:

$$T_e^2 \propto \frac{T_D}{\overline{Z}^2} \left( \frac{\overline{Z}^2}{A} \right)$$

$$\therefore T_e \propto \frac{T_D^{1/2}}{(\overline{Z}^2)^{1/2}} \left[ \left( \frac{\overline{Z}^2}{A} \right) \right]^{1/2} \approx T_D^{1/2} \left( \frac{\overline{Z}}{\overline{Z}^2} \right)^{1/2}$$

if it is assumed $Z \approx A$ so that $$\left( \frac{\overline{Z}^2}{\overline{Z}} \right) \approx Z$$

which means that the actual energy loss to bremsstrahlung is not as large as it is normally stated, but varies as:

$$\frac{dW_{\text{Brems}}}{dt} \approx \frac{T_D}{T_e^{3/2}} \left( \frac{\overline{Z}^2}{A} \right) \approx \frac{T_D \overline{Z}}{\left[ T_D^{1/2} / \frac{(\overline{Z}^2)^{1/2}}{(\overline{Z})^{1/2}} \right]^{3/2}}$$

$$\approx T_D^{1/4} (\overline{Z}^2)^{3/4} (\overline{Z})^{1/4} \approx T_D^{1/4} (\overline{Z}^2)^{3/4}$$

if the $\overline{Z}$ term is ignored. Thus, the bremsstrahlung loss increases only as $(\overline{Z}^2)^{3/4}$ rather than as $(\overline{Z}^2)$ when the ion temperature is high enough. Bremsstrahlung losses due to the additives or contaminants are not as serious, in this case, relatively, as in cases where the ion temperature is lower. Furthermore, the materials of high Z may be added to reduce the mean electron temperature, to provide a beneficial effect, for example, if electron plasma oscillations are found to have a deleterious effect. This problem will be referred to at greater length later. Moreover, high Z elements can thusly be added to effect nuclear reactions, e.g., utilizing thermonuclear reaction produced neutrons to provide fission or syntheses of higher Z isotopes, e.g., $U^{238} \rightarrow Np \rightarrow Pu^{239}$.

Another point to note in connection with high Z contaminants is that the value of Z here of concern is the effective Z of the ion. The cross-sections for further ionization of an already highly ionized atom are much smaller than normal ionization cross-sections and thus the ionization rates for highly ionized states are relatively slow. For ionization by ions themselves, the cross-sections are very small indeed, e.g., with 10-fold ionized atoms. For ionization by electrons the cross-sections are larger, but even in this case the rates are small. In competition with the ionization process is the process of regaining of charge by radiative recombination. This varies as $Z^2$, while the ionization cross-sections decrease with Z. It is difficult to estimate the relative magnitudes, but it is considered that 10-fold ionization is about as high a state of ionization as would be expected during the times of interest. Thus, even though contaminants are present with a much higher Z than 10, e.g., stainless steel from physical container or other structure wherein, $Z_{\text{Fe}} = 26$, the effective Z is smaller they will only be partially ionized. This consideration would be of extreme importance, e.g., in introducing small amounts of uranium into the chamber, to take advantage of fission from the neutron flux through the reactor, without thereby inducing a ruinous bremsstrahlung energy loss.

The classical expression for bremsstrahlung may be used to calculate the actual losses, as follows:

$$\frac{dW_{\text{Brems}}}{dt} = 1.5 \times 10^{-27} n^2 \overline{Z}^2 T_e^{1/2} \text{ ergs/sec./cm}^3.$$

From this it is seen that the losses by bremsstrahlung will be of the order of 0.04 watt/cm.³, for, $\overline{Z}^2 = 1$, $T_e = 50$ kev., $n = 10^{14}$. This is quite small compared to the nuclear fusion energy yield under these conditions.

As an example consider the effect of the additive of 3% of contaminant or addition with an effective $Z=10$. Then $$\bar{Z}=0.97+(0.03)10=1.27$$
$$\bar{Z^2}=0.97+(0.03)100=3.97$$

Therefore, $T_e$ is reduced by a factor $$\left(\frac{1.27}{3.97}\right)^{1/2}=0.56$$

and the bremsstrahlung is increased by a factor $$(\bar{Z^2})^{3/4}(\bar{Z})^{1/4}=3.0$$

Now it will be seen that the thermalizing time of the contaminant ions will be smaller than that of the deuterons by at least a factor $$\left(\frac{A}{Z^2}\right)\approx\frac{1}{Z}$$

Thus, high Z ions will be lost much faster than low Z ions from the reaction zone. This result will tend to purify the contained plasma as a function of time and the containment density will be set by an equilibrium mechanism involving the rates of loss of the ions and the rate at which they are introduced into the system. This preferential diffusion of higher Z ions compared to lower Z ions suggests various practical uses of the method such as in separatory processes.

Bremsstrahlung radiation generated in the reaction represents a mechanism of loss from the reaction zone. Energy in this form is recoverable exteriorly in various ways as in a radiation-adsorptive, heat transfer structural arrangement; however, for comparison with the quantity of fusion energy produced, consider the following: As stated above, the number of reactions per cc. per second, e.g., with D—D, is given by $$N=\tfrac{1}{2}n_D^2\sigma v_{DD}$$

(N is the rate for the D—D reactions only and does not include the secondarily occurring reactions)

The $\sigma v$ of the slowest reaction, namely D—D, alone is considered here. Now the energy produced per *deuteron* burned is $1.15\times10^{-5}$ ergs, i.e., per D—D reaction it is three times this, when the subsequent reactions are included, since immediately upon the burning of two deuterons, another combines with the reaction products, as noted above. Therefore, the energy generated per second ($P_n$) per cubic centimeter is $$P_n(DD)=\frac{1}{2}n_D^2\overline{\sigma v}_{DD}(3\times1.15\times10^{-5})$$
$$=1.7\times10^{-5}n_D^2\overline{\sigma v}_{DD}\text{ ergs sec.}^{-1}\text{ cm.}^{-3}$$

By way of comparison, in the D-T reaction the power is $P_n(DT)=2.81\times10^{-5}\,n_D n_T\,\sigma n_{DT}$ ergs sec.$^{-1}$ cm.$^{-3}$.

Now the amount of bremsstrahlung energy ($P_B$) emitted per second is $$P_B\begin{cases}=1.5\times10^{-27}n_e^2(\bar{Z^2})\,T_e^{1/2}\\=1.5\times10^{-27}n_e^2(\bar{Z^2})^{3/4}(\bar{Z})^{1/4}T_D^{1/2}\end{cases}$$

where, $T_e$ and $T_D$ are expressed in degrees Kelvin. Note that both energy generation and bremsstrahlung loss increase quadratically with increase of density so that the competition between these processes is independent of density.

Relative to thermonuclear reactions a quantity called the "ideal ignition temperature" is often employed. This term is defined as the temperature at which the thermonuclear energy yield is just equal to the bremsstrahlung loss, all other energy losses being disregarded. Taking, $\bar{Z^2}=1$ and $n_e=n_D$, the following ratio is obtained:

$$\frac{P_n(DD)}{P_B}=\frac{1.7\times10^{-5}}{1.5\times10^{-27}}\frac{\overline{\sigma v}_{DD}}{T_e^{1/2}}=1.13\times10^{22}\frac{\overline{\sigma v}_{DD}}{T_e^{1/2}}$$

Noting that the electron and deuteron temperatures are nearly equal at low temperatures, the ideal ignition temperature may be defined as that at which $$\frac{P_n}{P_B}=1$$

In thermonuclear work it is sometimes more convenient to express T in kilovolts.

$$1\text{ kilovolt}=1.16\times10^{7\circ}\text{ K.}$$

With the temperature in kilovolts denoted by $\theta$, $P_n/P_B$ then becomes $$\frac{P_n}{P_B}=3.4\times10^{18}\frac{\overline{\sigma v}_{DD}}{\theta_e^{1/2}}$$

From tables of $\overline{\sigma v}_{(DD)}$ as a function of $\theta_D$ the ideal ignition temperature is found to be, $$\theta_e\approx10\text{ kev.}$$

Now since $\overline{\sigma v}$ increases very rapidly compared to the rate of rise of bremsstrahlung losses, the nuclear power yield ($P_n$) rapidly outstrips the bremsstrahlung loss ($P_B$) with increasing temperature. At a mean deuteron energy of 100 kev., ($\theta_D\approx67$ kev.), $\overline{\sigma v}_{DD}\approx2\times10^{-17}$ and the electron means kinetic energy will not be higher than about 50 kev. ($\theta_e=33$ kev.), as shown above.

$$\therefore\frac{P_n}{P_B}\approx\frac{3.4\times10^{18}\times2\times10^{-17}}{(33)^{1/2}}=11.3$$

Thus bremsstrahlung power is small compared to nuclear (fusion) power—sufficiently small that one could afford the increase associated with the use of higher Z diluents, in the manner above discussed, in order to reduce the electron temperature below the normal equilibrium value; however, the loss shown would, in large reactors, be sufficient to energize an external thermal cycle.

Radial diffusion is perhaps the most crucial problem concerned in the containment of controlled thermonuclear reaction. As will be shown, if the rate is that predicted from two-body collisions alone, the diffusion rate is very small, and the containment time should be very long indeed if radial losses alone are determinative. Consider therefore the physical picture of diffusion across a field due to two-body collisions alone. From foregoing considerations it is known that in the absence of collisions a fuel ion will be bounded in its radial motion and would never leave the system. When collisions are present, however, the center of rotation can be shifted, so that the ion can perform a radial random walk and thus ions can gradually diffuse across the system.

The magnitude of this diffusion may be calculated by assuming that in every large angle encounter or scattering process the ion moves (in any direction perpendicular to the field) a distance of one radius. If the mean free path in the absence of the magnetic field is $\lambda$, the motion in one mean collision time is reduced by the ratio $(r/\lambda)$. Since $\lambda$ is very long and $r$ may be only a few centimeters, the reduction can be a great one. Thus according to this view the velocity of diffusion of a particle across a magnetic field, in the presence of a density gradient, is very much reduced by the magnetic field. For example, in the limit of zero particle density, the time for loss by "diffusion" without a magnetic field approaches the transit time of an ion, whereas, with a magnetic field, the time approaches infinity.

A mathematical expression representative of the diffusion velocity has been set forth as follows:

$$v_{\text{drift}}=3.5\times10^{-2}\frac{\nabla n}{T_D^{1/2}H^2}$$

Note that this velocity decreases with $H^2$ and with $T^{1/2}$, so that higher temperatures and more dense magnetic fields favor containment. For example, for $T_D=100$ kev. ($1.2 \times 10^{9\circ}$ K.), $$\nabla_n \approx \frac{10^{14}}{10^2}$$

and $H=10{,}000$ gauss, compute the drift velocity $v_{\text{drift}}$:

$$v_{\text{drift}} \approx \frac{3.5 \times 10^{-2} \times 10^{12}}{(1.2 \times 10^9)^{1/2} \times 10^3} \approx 10^{-2} \text{ cm./sec.}$$

This velocity is a negligibly small amount and is so small because of the infrequency of collisions at the density and temperature assumed. Experimental results are expected to diverge considerably from the value shown and in a more optimistic direction.

PRACTICAL MAGNETIC FIELDS

To effect the containment in the most expeditious manner certain practical considerations relevant to the magnetic field are to be noted. These include consideration of the magnetic field power, magnetic field intensities and the like, relevant power outputs. In these considerations it is of assistance at the outset to elucidate the mechanism by which a magnetic field contains a plasma of the character described. The plasma exerts a gas pressure, which is essentially independent of the existence of inter-particle collision processes and which, since the plasma is nearly an ideal gas, is equal to $nkT$ dynes/cm.$^2$. In a practical reactor this outward pressure must be balanced by an inward force which prevents the gas from expanding indefinitely. In an ordinary system this gas containing force is supplied by a physical wall; however, in the present instance the "wall" of the system is a magnetic field, and the force is supplied by the pressure of the field, $$\frac{H^2}{8\pi} \text{ dynes/cm.}^2$$

being eventually transferred to solenoid and other physical structures. More properly, the gradient of the particle pressure is countered by a gradient in the magnetic field as has long been understood and has been treated by several authors, for example, Alfven, Cosmical Electrodynamics, p. 61. A reasonably general expression can be constructed for the form of the pressure relationships by adopting a set of equations previously used describing diffusion of a plasma in the ionosphere. (M. H. Johnson & E. O. Hulburt, Phys. Rev. 79, 802 (1950).) Simply consider the plasma as two independent, oppositely charged, fluids and determine the force balance equation for these fluids, i.e., the electrons and the ions, giving the total forces acting on a unit volume. In equilibrium the forces which can act as the ordinary kinetic pressure force, the magnetic force, the electrical forces, gravitational forces, and frictional forces between the component fluids as they flow with respect to each other. Gravitational forces and frictional forces which are the result of collisions are negligible. The force balance equation for each fluid is thusly:

$f$ (electric) $+ f$ (magnetic) $= f$ (kinetic)

The kinetic pressure force on each unit volume is just $\nabla p$, in dynes, while the electric force is $n e \vec{E}$, and the magnetic force is $$ne\frac{\vec{v}}{c} \times \vec{H}$$

Since it is necessary to determine values for an equilibrium state and since this will not include the inertia terms, $mn\vec{v}$, which would describe the force due to acceleration of the plasma as a whole, the force balance equation becomes, for the two components:

$$n_1 e\left[\vec{E} + \frac{\vec{v}_1}{c} \times \vec{H}\right] = \nabla p_1$$

$$-n_2 e\left[\vec{E} + \frac{\vec{v}_2}{c} \times \vec{H}\right] = \nabla p_2$$

where the minus sign in the second equation arises from the fact that the charge of $n_2$, is opposite to that of $n_1$. Also, remember that in a plasma $n_1 = n_2 = n$ and, as in ordinary hydrodynamic equations, the velocities $\vec{v}_1$ and $\vec{v}_2$ refer to average velocities of the fluid and not to the individual particle velocities.

$$\therefore ne\left[\vec{E} + \frac{\vec{v}_1}{c} \times \vec{H}\right] - \nabla p_1 = 0$$

$$-ne\left[\vec{E} + \frac{\vec{v}_2}{c} \times \vec{H}\right] - \nabla p_2 = 0$$

The electric field term can be eliminated by adding the two equations, which yields $$ne\left[\left(\frac{\vec{v}_1 - \vec{v}_2}{c}\right) \times \vec{H}\right] - \nabla p = 0$$

where $p \equiv p_1 + p_2$. Now $$ne\left(\frac{\vec{v}_1 - \vec{v}_2}{c}\right)$$

is just the net electric current density in the plasma, since positive and negative charges moving in opposite directions produce electric currents which *add*. This current density $\vec{j}$ is the diamagnetic current generated in the plasma. Thus is obtained $$(\vec{j} \times \vec{H}) - \nabla p = 0$$

Now in an equilibrium state, $\vec{E} = 0$, so that, from Maxwell's equations, $$\nabla \times \vec{H} = 4\pi j$$

because the only components of the field for which, curl $\vec{H}$, does not vanish are those due to the plasma currents. Thus is obtained, $$\frac{(\nabla \times \vec{H})}{4\pi} \times \vec{H} - \nabla p = 0$$

i.e., $$\vec{H} \times \frac{(\nabla \times \vec{H})}{4\pi} + \nabla p = 0$$

Now $$\vec{H}(\nabla \times \vec{H}) = \tfrac{1}{2}\nabla(H^2) - (\vec{H} \cdot \nabla)\vec{H}$$

Thus it is found, that $$\nabla\left(p + \frac{H^2}{8\pi}\right) = \frac{1}{4\pi}(\vec{H} \cdot \nabla)\vec{H}$$

The term $(\vec{H} \cdot \nabla)\vec{H}$, is proportional to the directional derivative of $\vec{H}$ parallel to itself. In all parts of the system except at the reflector fields this term is expected to vanish, since the field is in the Z direction and is uniform in Z. In such regions then $$p + \frac{H^2}{8\pi} = \text{constant}$$

where $p = n_1 k T_1 + n_2 k T_2$.

Now at the outer walls the pressure must diminish to zero and at the axis the density should be maximum, thus as a function of $r$, a typical equilibrium distribution would appear about as indicated in FIG. 15. However, it should be noted that a particular radial distribution, although satisfying the condition, $$p + \frac{H^2}{8\pi} = \text{constant}$$

may not necessarily represent the actual equilibrium value. Whether any given distribution is stable or not is determined not by the above condition alone but must be separately established with due regard to other factors, for instance, diffusion equilibrium.

It is clear that it is not possible to have an equilibrium state where $p$ is greater than $$\frac{H_0^2}{8\pi}$$

$H_0$ being the value of the field in the absence of the plasma. Or, amounting to the same thing, the value, $p$, in the central section, cannot exceed the limit set by the field strength at the wall of the container. How nearly, $p$ may approach $$\frac{H_0^2}{8\pi}$$

depends on the system under consideration. In a linear system such as here considered, such limitation is not serious and high material pressure to magnetic pressure ratios can be sustained. It is even thought possible to operate at a limit such that the magnetic field is excluded from much of the volume, by a diamagnetic fluid effect of the plasma, as indicated in FIG. 16, and as will be discussed later. In any event it is believed that the particle pressure cannot be sustained at a value higher than the smallest value of $$\frac{H_0^2}{8\pi}$$

present inside the system, i.e., the maximum pressure contained cannot exceed the retaining strength of the weakest zone in the field. Thus for fixed temperature, the limiting density varies as $H_0^2$. From this relation follows the consequence that the limiting reaction rate varies as $H_0^4$. Since, roughly speaking, the power required to maintain the magnetic field varies as $H_0^2$, it is apparent that it is of great benefit to employ as dense magnetic fields as are practical. This requirement is in competitive conflict with the requirement, in the systems of the invention, that as high a reflector ratio as possible be maintained, and, therefore, an optimum compromise may advantageously be established.

A consideration of the expected density distribution near the peak of the reflector fields indicates that in this radial plane the density should become small. This is because any particle which reaches the peak plane will be lost across the reflector, beyond which plane the density approaches zero, consequently, the diamagnetic field depression at the mirror peak field should be small. From this, in the event the limiting density is reached in the reaction region (central region of the containment zone) resulting in large diamagnetic field depression, it is apparent that the effective reflector ratios (R) could be thus considerably enhanced over their unperturbed value. This circumstance would lead to more effective particle containment in the presence of a plasma than in its absence and greatly in excess of that predicted above.

Values of the minimum magnetic field necessary to contain a plasma of given temperature and density can now be calculated and, from this result, the power required to sustain the field. As an example consider deuterons at a mean kinetic energy of 100 kev. ($\frac{3}{2}kT_D = 100$ kev., $\theta_D = 67$ kev.).

Then $$\frac{3}{2}kT_e \approx 50 \text{ kev. } (\theta_e = 33 \text{ kev.}), n = 10^{14}$$

Now $$\frac{3}{2}kT_D = 100 \text{ kev.} = 100 \times 10^3 \times 1.6 \times 10^{-12} \text{ ergs}$$

Therefore, $$nkT_D = p_D = 10^{14} \times \frac{2}{3} \times 100 \times 10^3 \times 1.6 \times 10^{-12}$$
$$= 1.07 \times 10^7 \text{ dynes/cm.}^2 \text{ or ergs/cc.}$$

and $$nkT_e = p_e = \frac{p_D}{2} = 0.53 \times 10^7 \text{ dynes/cm.}^2$$

Therefore $p = p_D + p_e = 1.6 \times 10^7$ dynes/cm.$^2$ (approximately 15 atmospheres or 200 lbs./in.$^2$). Thus the minimum magnetic field required for containment is given by $$\frac{H^2_{\min}}{8\pi} = 1.6 \times 10^7$$

$$H^2_{\min} = 4 \times 10^8$$

$$H_{\min} = 2 \times 10^4 \text{ gauss}$$

In a long solenoid of constant radial proportions, the magnet power per centimeter of magnet length is independent of the magnet diameter for fixed magnetic field intensity values. This is apparent by noting that the magnetic field intensity (H) of a long solenoid is approximately, $$H = \frac{4\pi I}{10}$$

where $I$ is the current per unit length of solenoid.

The power loss per unit length of solenoid $P_M$ amounts to $RI^2$ watts/cm., where $R$=resistance per unit length and $I$ is the energizing current in amperes. Now if $I$ is held fixed, so that $H$ is fixed, and the diameter of the magnet is increased, keeping the same proportions, then $$R \propto \frac{\text{length}}{\text{area}} = \text{constant}$$

since the length of the current path and the area per unit length of coil through which it flows increase in the same proportion.

Labeling the inner radius of the coil with the term $R_1$ and the outer radius with $R_2$, as shown in FIG. 17, the calculation of the losses per centimeter length of magnet in the reactor is as follows:

If, $J$=current density in amp./cm.$^2$, then $$H = \frac{4\pi I}{10} = \frac{4\pi}{10}(R_2 - R_1)J$$

$$P_M = \rho J^2 [\text{volume/unit length}]$$

where $\rho$ here is the specific resistivity, $$= \rho J^2 [\pi(R_2^2 - R_1^2)]$$

Solving $$J = \frac{10 \cdot H}{4\pi(R_2 - R_1)}$$

$$\therefore P_M = \frac{100 \rho H^2 \cdot \pi (R_2^2 - R_1^2)}{16\pi^2 (R_2 - R_1)^2} = \frac{100 \rho H^2 (R_2 + R_1)}{16\pi(R_2 - R_1)}$$

$$P_M = \frac{100 \rho H^2}{16\pi} \frac{\left(\frac{R_2}{R_1} + 1\right)}{\left(\frac{R_2}{R_1} - 1\right)} \text{watts/cm.}$$

$$= 2.0 \times 10^{-3} \rho H^2 \frac{\left(\frac{R_2}{R_1} + 1\right)}{\left(\frac{R_2}{R_1} - 1\right)} \text{kw/cm.}$$

It can be seen that for fixed H, $P_M$, is dependent only on the ratio $R_2/R_1$ and not on the diameter of the magnet.

Although larger and larger values of, $R_2/R_1$, lead to reduced losses, the gain is slight after a ratio of about 2:1 is achieved, whereas the cost of the magnet becomes very large. A usually accepted maximum practical value of the ratio $R_2/R_1$ is about 2. Taking $\rho \approx 2 \times 10^{-6}$ ohm-cm. (copper at 60° C.) and 2 for the ratio of $R_2$ to $R_1$, $$P_M = 1.2 \times 10^{-8} H^2 \text{ kw./cm.}$$

With
$$H = 2 \times 10^4 \text{ gauss}, P_M = 4.8 \text{ kw./cm.}$$

Magnet power required per centimeter of magnet length as a function of magnetic field strength is graphically shown in accompanying FIG. 18. Curves are plotted for various values of the parameter $$X = \left(\frac{R_2}{R_1}\right)^2$$

proportional to the volume of copper required per centimeter of length. The volume of copper per centimeter $= \pi R_1^2 X$ cm.$^3$, and the specific resistivity $\rho$ is taken as, $2.0 \times 10^{-6}$ ohm-cm., which value makes allowance for a reasonable space factor and temperature rise in the solenoid.

It is apparent that since the nuclear fusion power varies as the volume per unit length of magnet, whereas the magnet power is independent of the volume per unit length, a large enough containment zone diameter should allow the nuclear power production per centimeter to easily outstrip the magnet losses. It will therefore be quite instructive to calculate the power yield for a plasma radius (effective) of 150 cm. as a typical possible value, assuming a magnet field of $2 \times 10^4$ gauss, and an ion density consistent with this field.

From above $$P_n \text{ (DD)} = 1.7 \times 10^{-12} \, n^2 \, \sigma v_{DD} \text{ watts/cc.}$$

At $\tfrac{3}{2}kT_D = 100$ kev., i.e., $\theta_D = 67$ kev., $\sigma v_{DD} \approx 2 \times 10^{-17}$, $n = 10^{14}$ (limiting ion density at $H = 2 \times 10^4$ gauss), therefore;

$$P_n \text{ (DD)} \approx 1.7 \times 10^{-12} \times 10^{28} \times 2 \times 10^{-17}$$
$$\approx 0.33 \text{ watts/cc.}$$

For additional comparison similarly the power ($P_n$DT) from a D-T reaction under the same conditions (50% D, 50% T, $n_D + n_T = 10^{14}$) is found to be, $P_n$ (DT) $\approx 7$ watts/cc. Thus if the effective radius of the plasma is 150 cm., $$P_n \text{ (DD)} = 0.33 \times \pi \times (150)^2 \text{ watts/cm.} = 24 \text{ kw./cm.}$$

Also from the previous calculation $$P_B = 2.1 \text{ kw./cm.}$$

Thus the total power losses (excluding diffusion) amount to about $4.8 + 2.1 = 6.9$ kw./cm., or about ⅓ of the total power output. Of the 24 kw./cm., a fraction, about $$\frac{4.43}{7.2} = 0.62$$

will appear as energy of charged particles in the plasma, i.e., 15 kw./cm. A large fraction of this energy is recoverable directly as electrical energy.

The gross nuclear energy yield per unit volume increases as the fourth power of the magnetic field at constant temperature and, since the magnet power increases only quadratically with field intensity, it is strongly indicated as more economical to increase the magnetic field intensity considerably above the assumed 20 kilogauss, and thus allow operation with a much higher plasma density. Moreover, under practical operating conditions, it is probable that the assumed mean kinetic energy of 100 kev. is not the optimum but may lie below this value, e.g., with hydrogen isotopes and above this value with some fuels. The actual optimum operating conditions will depend, among other things, on the practical values of containment time which are attainable with any particular system and the choice of fuels which may depend to a considerable amount thereon.

A first approximation of the variations of certain quantities with applied magnetic field strength, viz., the total nuclear power ($P_N$), bremsstrahlung loss ($P_B$), and magnet power ($P_M$), is graphically illustrated in the accompanying FIG. 19 for conditions which are thought to be indicative of those employable in a large scale reaction system, i.e., $\tfrac{3}{2}kT_{\text{(ion)}} = 100$ kev.; $\tfrac{3}{2}kT_e = 50$ kev.; $r_{\text{(plasma)}} = 150$ cm.; and $$\frac{R_2}{R_1} = 2 \text{ (reflector ratio)}$$

No account has been taken of losses through the reflector fields or energy transfer problems in this example, which example is simply intended to indicate the magnitude of yields which might be expected from a large machine operating under ideal conditions. It is clear, however, that at sufficiently high magnetic field intensities considerable latitude for additional losses exists without destroying the possibility of showing a large exothermic power output. (The nuclear power ($P_N$) shown is *total* output.) With the D-D reaction, as has been shown in the foregoing, about 62% of the exothermic thermonuclear reaction energy appears in the charged reaction products, is recoverable in large part by hereinafter described methods and of the remaining 38%, carried off as kinetic energy of the neutrons, perhaps 30% could be converted to electrical energy by a thermal cycle, as desired above. Thus a maximum of about 70% of the reaction energy may be converted to electrical energy. (The energetic neutrons may be employed advantageously in producing subsidiary nuclear reactions.) From this must be subtracted the magnet electrical power, the net electrical power loss in the ion sources, and in the imperfect recovery of kinetic energy from the non-reacted fuel, as noted hereinbefore.

Considerable latitude in design is permitted by the overall flexibility of the present system. For example, to reduce the capital cost of the magnet, in cases in which this appears desirable, it is possible to reduce the radial dimensions of the magnet. A change from $$\frac{R_2}{R_1} = 2 \text{ to } \frac{R_2}{R_1} = \frac{5}{4}$$

reduces the amount of copper required by a factor of 5⅓, but increases energy required to power the magnet by a factor of only 3, which in the example shown is still small compared to the nuclear power production. It may also be desirable to refrigerate the coils to liquid nitrogen temperatures, or perhaps lower, to reduce energy loss due to resistance of the conductor and also the amount of copper required. It can be shown that a considerable gain may be realized in this way, possibly in total capital investment, or definitely in decreased energy loss in the magnet windings.

The present example has ignored the additional losses due to the reflector fields since, in a sufficiently long machine, they are smaller than the main field losses. This will not be strictly true in a machine in which the length is curtailed; however, those end losses may be reduced by employing long systems, tandem multiple zone systems and by other means.

It would be obvious that to obtain large amounts of external electrical power the system would be relatively large; however, since the reaction system yields products other than power, e.g., high energy, radiation, nuclear particles, neutrons, etc., relatively small machines, or systems operated at low power, are useful for many other purposes. One especially valuable use of both large and small systems would be in the production and utilization of neutrons, particularly high energy neutrons which may be employed in nuclear fission, subcritical breeder reactors, for fuel regeneration and the like.

In order to ascertain the design features of such large and small systems, consider now the scaling laws which apply to controlled thermonuclear reaction devices, which laws are largely determinative of the minimum practical size of such a device relevant to the results to be obtained. First, consider the laws obeyed in scaling the magnetic field coil parameters. This subject has been considered briefly hereinbefore in connection with the discussion of magnet losses. One of the quantities significant herein is the *stored energy* in the magnetic field. The total energy stored in the unperturbed field limits the total particle stored energy, since at every point in the field, $$nkT_{max} = \frac{H_0^2}{8\pi}$$

and the particle energy is $\tfrac{3}{2}nkT$ per cc.

The unperturbed magnetic stored energy can be computed most simply from the inductance. For any coil as shown in FIG. 20, if constant proportions are maintained in scaling, $$\frac{b}{a} = \text{constant}$$

$$L = a.f \text{ (ratios of dimensions)}$$

$$\frac{c}{a} = \text{constant}$$

where $a$ is the radius of the coil. In magnet design, the current density is the parameter which usually limits the design; therefore results will be expressed in terms of this parameter. Now, $W_{stored} = \tfrac{1}{2}LI^2 \propto aI^2$, because inductance varies linearly with a geometrical scaling.

However: $I \propto Ja^2$, therefore $$W_{stored} \propto a.J^2 A^4$$

$$W_{stored} \propto a^5 J^2$$

Thus for fixed current density, the total amount of stored magnetic energy varies as the *fifth power* of the dimensional scale. Now the power required to maintain this field is proportional to $\rho J^2$ per unit volume of magnet winding material and thus the total magnet power scales in accordance with $P_M \propto \rho J^2.a^3$ where $\rho$=specific resistivity.

Thus $$\frac{W_{stored}}{P_M} \propto \frac{a^5 J^2}{\rho J^2 a^3} \propto \frac{a^2}{\rho}$$

Of interest here, the time constant of the magnet $$\frac{L}{R}$$

is also proportional to $$\frac{a^2}{\rho}$$

The larger the system the less the electrical power required to obtain a given total stored magnetic field energy. Total nuclear power yield and capital investment must also be considered. The cost of the magnet varies as the volume of magnet, while the nuclear power output varies (for fixed $kT$) as the square of the limiting density integrated over the volume, and the particle density is limited as a quadratic function of local field strength, as has been shown.

$$H \propto \text{current per unit length of magnet} \propto \frac{Ja^2}{a} \propto Ja$$

Therefore $$\frac{H_0^2}{8\pi} \propto J^2 a^2$$

Consequently, $n_{max} \propto J^2 a^2$ for fixed $Kt$, and $n^2 \propto J^4 a^4$. Then $$P_n \propto \int n^2 dv \propto J^4 a^7$$

The total nuclear power output thus varies as $a^7$ within the range of validity of the field scaling laws, but the total magnet power varies as $a^3$ indicating the extreme advantages with reference to efficiency of employing large systems, and therefore, $$\frac{P_n}{P_M} \propto \frac{J^4 a^7}{\rho J^2 a^3} \propto \frac{J^2 a^4}{\rho} \text{ (nuclear power per unit magnet power)}$$

Also the capital investment in the magnet should vary nearly linearly with the volume of the magnet, i.e., as $a^3$. Therefore, $$\frac{P_n}{C_M} \propto \frac{J^4 a^7}{a^3} \propto J^4 a^4 \text{ (nuclear power per unit cost)}$$

Thus the nuclear power yield per unit magnet size (cost) can be made as favorable as desired by scaling if the current density is held constant, or at least if it is varied less rapidly than $$\frac{1}{a} \text{ (constant field)}$$

It should be also noted that since the usual limiting factor on air solenoid magnet coil design is current density, the attainment of high magnetic fields becomes relatively easier from this standpoint as larger installations are used. Although high magnetic fields imply large total mechanical forces on the coil structures, in scaling to larger sizes, this factor is compensated for by the greater radial depth of the windings through which the stresses are distributed. Whether the compensation is partial or complete depends on whether the structure is scaled at constant current density or at constant magnetic field intensity.

Another quantity of interest in this connection is the time for a particle to diffuse out of the reactor. For all known radial diffusion mechanisms, $$v_{drift} \propto \nabla n \propto \frac{1}{a} \text{ for fixed, } n_0$$

Also, the time to diffuse to the wall, $$t_{drift} = \frac{a}{v_{drift}}$$

Therefore, $t_{drift} \propto a^2$, and the time of radial containment scales as a quadratic function of the size. Another quantity of interest is the effect of relative magnetic field inhomogeneity. This is because local field inhomogeneities can be shown to lead, in idealized cases, to drifts across a magnetic field; however, because of peculiar properties of a linear magnetic field, these drifts do not occur appreciably in the present containment system. Apparently, the gradient of the gradient of the magnetic field intensity is the important quantity to be considered here, with the net sidewise drift velocities being proportional to this function. From an off-center current element, such as an emergent conductor, $$\frac{\nabla H_L}{H_S} \propto \frac{1}{r^3}$$

where $H_L$ is the field arising from the current element and $H_S$ is the solenoidal field.

Thus $$\frac{\nabla |\nabla H_L|}{H_S} \propto \frac{1}{r^4} \propto v_{drift'}$$

A scaling increase by a quantity $a$ thus reduces $v_{drift'}$ by $a^4$ or $$v_{drift'} \propto \frac{1}{a^4}$$

Similarly, for a dipole (two parallel current elements carrying opposite currents), $$\frac{\Delta H_L}{H_S} \propto \frac{1}{r^4}, \quad \frac{\nabla |\nabla H_L|}{H_S} \propto \frac{1}{r^5}$$

and therefore, $$v_{drift} \propto \frac{1}{a^5}$$

Thus in the above two cases the time for a particle to be lost by this type of drift across the field should vary about as $$t_{drift} \propto a^5, \text{ current element}$$
$$t_{drift} \propto a^6, \text{ dipole}$$

These of course assume perturbing elements of constant moment, an assumption which may not be quite satisfied in practice.

One of the simplest of the scaling factors has to do with the surface-to-volume ratio. For example, it should be true that the amount of outgassing which will occur will be proportional to the inside surface area of the evacuated chamber wall. The outgassing of neutral particles could cause particle losses by charge exchange, for example. Thus the rate of this loss will vary as $$\frac{a^2}{a^3} = \frac{1}{a}$$

Other surface effects will of course be decreased in the same way by scaling.

UTILIZATION

Numerous applications for the process of the invention are either disclosed or are suggested in the foregoing. At the outset there is provided a method for containing energetic charged particles of an unlimited variety under conditions, i.e., tenuity, whereunder such particles exist in isolation for rather lengthy periods of time and therefore are subject to only slow exchange of energy and infrequent collisions whereby various operations may be performed thereon without the usual limitations imposed by normal densities. Moreover, the containment method is of such a nature that various characteristics of the particle, e.g., ionization state, mass, velocities, etc., modify quantities such as diffusion rates whereby higher Z ions preferentially leave the system. Therefore, use of the process to effect separation of various materials and other operations taking advantage of these modified quantities is possible.

In a broad sense, the compression operation is an accelerative technique which may be applied to effect a large increase in the velocity of injected particles. With containment sustained at the end of the compressive operation, the acceleration and densification produced thereby may be utilized to initiate and promote thermonuclear reactions of light nuclide ions; however, it will be apparent that ions of whatever mass, provided that they are not physically disrupted in the process, may also be injected and accelerated in the compression operation. Moreover, since such ions may be contained, they may be introduced into the system to undergo various reactions, chemical and nuclear, in the latter case, e.g., the target ions being introduced simultaneously with various other ions (thermonuclear fuels) productive of reaction products which may undergo nuclear reactions therewith.

Moreover, it is not necessary that the compression be sustained since, if desired, the accelerated ions may be released from the system immediately following compression for utilization in various structures and to effect various reactions with materials disposed in proximity to the containment zone. Two general methods of so obtaining a beam or usable quantity of accelerated ions are apparent in the foregoing, i.e., rapid radial decompression in a limited area to cause impingement on target structures disposed outwardly of the containment zone and utilization of the mechanism of escape through the reflector fields to provide a beam which may be collimated under conditions whereby velocities are conserved. Many reactions described in the literature may utilize particles accelerated in this manner and also the energetic products of various nuclear reactions including both thermonuclear fusion or nuclear fission products derived of reactions conducted simultaneously in the containment zone.

Thermonuclear reaction products, obtained from thermonuclear reactions conducted as described hereinbefore, generally comprise nuclear particles and various forms of energy which may be utilized in many novel manners or in conjunction with various known methods. Radiative and particle kinetic energy may generally be adsorbed and converted into thermal energy transportable to appropriate auxiliary apparatus for utilization in the conventional manner.

Energetic nuclear particles, particularly the neutrons, may be employed in various basic nuclear processes such as fission, transmutation, nuclear synthesis and in conjunction with the numerous practical applications thereof including neutron reactors, particularly, sub-critical reactors intended for power and fissionable material breeder operation. Methods of accomplishing the foregoing will be described more fully in conjunction with the description of the apparatus.

The kinetic energy residing in the energetic charged products may be converted directly into electrical power and a large proportion of the energy introduced into the system, either in the form of kinetic energy of the injected particles or of magnetic field, may be recovered therewith by a decompression method described hereinafter. With reactions which are conducted in a continuous fashion or with only occasional cessation decompression may not contribute significantly to the power output due to the low duty period, however, with cyclic operations, decompression provides the means for recovering large amounts of power conveniently.

DECOMPRESSION

*Radial.*—The term decompression as used herein indicates a state wherein a plasma of given volume is allowed to expand to occupy a larger volume. Decompression is divisible into two modes, radial and axial, i.e., decompression represents the process which is the reverse of compression. A plasma expansion is possible in cases where the energy of the reaction increases the expansive force of the plasma attended by an increase of containment pressure; however, decompression is intended primarily to apply to a process in which the containment pressure decreases. It will be noted that either decompression or the expansion resulting from the reaction energy may be employed to produce external power by the methods noted hereinafter.

Radial decompression occurs whenever a radial portion of the magnetic field is caused to decrease in intensity while axial decompression results whenever the magnetic reflector field region is displaced outwardly and/or the magnetic reflector field intensity is reduced. Inverted sequencies of operations to those employed in compression may be employed to effect the decompression by adaptations in which the decrease in the magnetic field intensity is employed to generate an electrical current while displacement of the reflector field region may also be related to generation of electrical power or of mechanical thrust.

As indicated hereinbefore, radial decompression provides a convenient means for quite preferentially directing the charged particles against radially disposed surfaces for more effective utilization when accomplished along a localized segment of the containment zone enclosing said surfaces by regulating the current in corresponding solenoid segments. Diminution of reflector field intensities likewise may be employed to direct preferential discharge of the charged particles in axial directions for similar purposes and also for storage and recycling. Decompression may be partial or complete with the overall operation being operated sequentially through fuel injection and accumulation, compression (sustained as indicated) and decompression somewhat similarly to the cycles in internal combustion engines.

While some analogies exist between operating cycles of the invention and classical heat engines many important differences exist. In the present case the expansion zones are not fixed by cylinder bores and pistons but by expansible or displaceable magnetic fields having no rigid dimensions. Moreover, the particles of the heated plasma are coupled to this magnetic field and therefore to the solenoid producing the field whereby there is provided an interesting electrical circuit which is adaptable to several modes of operation and possibilities of energy generation.

At the outset, consider certain energy relationships which exist in the contained plasma-magnetic field system including the following equation derived hereinbefore:

$$nkT + \frac{H^2}{8\pi} = \frac{H_0^2}{8\pi}$$

This is a pressure equation, but it may also be considered as an energy density equation. The total energy content of the system at any time is the value integrated over the volume expanse occupied by the particle energy density, $\tfrac{3}{2}nkT$, plus the field energy, $$\frac{H^2}{8\pi}$$

Consider a case in which there is maintained a fixed current in the magnetizing solenoid and, consequently, fixed $H_0$. Then, $$W = \int \left(\frac{3}{2}nkT + \frac{H^2}{8\pi}\right)dv = \int \frac{1}{2}nkT\,dv + \int \frac{H_0^2}{8\pi}dv$$

This value, however, differs from the stored energy of the field in the absence of the particles only by one third of the total amount of particle stored energy. The increase in the particle energy owing to contained charged reaction products (at least 90 to 95% of which may be contained in a typical case), would be from $\int \tfrac{3}{2}n_1kT_1 dv$ to $\int \tfrac{3}{2}n_2kT_2 dv$, and in this case arises from an increase of the volume of the plasma, i.e., decompression or expansion of the plasma. However, as can be seen from the equation for W, above, only one-third of this energy change appears in the internal energy of the system and the remaining two-thirds must eventually appear as electrical energy in the magnet energizing circuits and therefore extractable into external load circuits. In the present case, that of constant current, this means an induced voltage appears across the terminals of the magnet. Physically this is to be understood from the fact that in expanding isobarically against the magnetic field the heated plasma does work equivalent to, $pv$, in pushing the magnetic field outward which work must appear as an electrical energy flow from the solenoid. At the same time the internal energy of the magnetic field, initially introduced into the system from outside, is likewise released, i.e. the field collapses, and the energy therefrom also appears as an electrical energy flow out of the system. In this manner a direct conversion from reaction energy to electrical energy is effected. It is instructive to calculate a simple case, particularly, to discern additional details of the nature of the process.

Assume an idealized case wherein, initially, the plasma completely excludes the magnetic field from a central cylindrical region, and the plasma expands against the field at constant pressure. For the initial and final states $$n_1 k T_1 = n_2 k T_2$$

since I is fixed $$\left(\text{constant current which fixes } \frac{H_0^2}{8\pi}\right)$$

Also, since the same number of particles are present per unit length (cm.) of reaction zone before and after the expansion (decompression)

$$\pi r_1^2 n_1 = \pi r_2^2 n_2$$

$$\frac{r_2}{r_1} = \sqrt{\frac{n_1}{n_2}} = \sqrt{\frac{T_2}{T_1}} \qquad \begin{array}{l} r_1 = \text{initial radius} \\ r_2 = \text{final radius} \end{array}$$

Now the circuit equation for each unit length (cm.) of coil is $$V = -RI - N\frac{d\phi}{dt}$$

where V is the voltage, N is the number of turns per unit length (cm.), R is the total resistance of the wire in each unit length of coil, and I is the current carried by the magnet conductor. The signs are taken so that the voltage is negative (power in) when $$\frac{d\phi}{dt} = 0$$

and positive (net power out) when $$\frac{d\phi}{dt}$$

is sufficiently less than zero due to the expulsion of the magnetic flux out of the containment zone by the plasma.

Therefore the power P and energy W produced in the magnet coil winding per unit length (cm.), $$P_{\text{coil}} = VI = -RI^2 - NI\frac{d\phi}{dt}\ \text{cm.}^{-1}$$

and, $$W_{\text{coil}} = \int_0^{t_0} P\,dt = -RI^2 t_0 - NI\int_0^{t_0}\frac{d\phi}{dt}\cdot dt$$

$$= -RI^2 t_0 - NI(\phi_2 - \phi_1)$$

Now $$\phi_1 = \pi(R_1^2 - r_1^2)H_0$$
$$\phi_2 = \pi(R_1^2 - r_2^2)H_0$$

so that $$\phi_2 - \phi_1 = \pi(r_2^2 - r_1^2)H_0$$

and $$W_{\text{coil}} = -RI^2 t_0 + \pi NI(r_2^2 - r_1^2)H_0$$

or $$W_{\text{transfer}} = W_{\text{coil}} + RI^2 t_0 = \pi NI(r_2^2 - r_1^2)H_0$$

Now $H_0 = 4\pi NI$, and so $$W_{\text{transfer}} = \frac{H_0^2}{8\pi}[2\pi(r_2^2 - r_1^2)]\ \text{per centimeter}$$

This is seen to be just equal to twice the magnetic energy stored between the radii $r_1$ and $r_2$. The factor of two can be thought of arising from the fact that the expanding plasma does $pv$ work in the amount:

$$\int p\,dv = nkT[\pi(r_2^2 - r_1^2)] = \frac{H_0^2}{8\pi}[\pi(r_2^2 - r_1^2)]$$

At the same time there is expelled from the region between $r_1$ and $r_2$ an amount of magnetic energy equal to $$\frac{H_0^2}{8\pi}[\pi(r_2^2 - r_1^2)]$$

The total transferred energy is the sum of these two values $$W_{\text{transfer}} = \frac{H_0^2}{8\pi}[2\pi(r_2^2 - r_1^2)]$$

as before and which is equivalent to $$W_{\text{transfer}} = \pi R_1^2 \left(\frac{H_0^2}{8\pi}\right)\left\{2\left[\left(\frac{r_2}{R_1}\right)^2 - \left(\frac{r_1}{R_1}\right)^2\right]\right\}$$

Since $r_2$ can never be larger than $R_1$, it is seen that the maximum energy which can be electrically transferred by this method alone must always be less than twice the magnetic stored energy of the coil system with no particles therein.

Another case of practical interest is that in which the reaction is conducted in such a manner that constant total magnetic flux condition exists. This will be very nearly the case if the magnetic field coils are of long time constant and are short-circuited at the beginning of the reaction cycle and are maintained shorted until partial or total decompression is effected. In this case the simple density distribution model, used above, may again be employed.

The flux conservation condition requires that $$\pi(R_1^2 - r_1^2)H_1 = \pi(R_1^2 - r_2^2)H_2$$

and therefore, $$\frac{H_2}{H_1} = \frac{R_1^2 - r_1^2}{R_1^2 - r_2^2}$$

The total energy per unit length at the beginning is $$W_1 = \int \frac{H_1^2}{8\pi} dv + \int \frac{3}{2} n_1 k T_1 dv = \pi R_1^2 \left(\frac{H_1^2}{8\pi}\right) + \int \frac{1}{2} n_1 k T_1 dv$$

$$= \pi R_1^2 \left(\frac{H_1^2}{8\pi}\right) + \frac{1}{2} \pi r_1^2 \left(\frac{H_1^2}{8\pi}\right)$$

At the end total energy is, $$W_2 = \int \frac{H_2^2}{8\pi} dv + \int \frac{3}{2} n_2 k T_2 dv = \pi R_1^2 \left(\frac{H_2^2}{8\pi}\right) + \frac{1}{2} \pi r_2^2 \left(\frac{H_2^2}{8\pi}\right)$$

The difference represents the reaction energy accumulated in the increased particle energy and magnetic field energy:

$$W_2 - W_1 = W_R =$$

$$\pi R_1^2 \left\{ \left[ 1 + \frac{1}{2}\left(\frac{r_2}{R_1}\right)^2 \right] \frac{H_2^2}{8\pi} - \left[ 1 + \frac{1}{2}\left(\frac{r_1}{R_1}\right)^2 \right] \frac{H_1^2}{8\pi} \right\}$$

Eliminating $H_2$, $$W_R = \pi R_1^2 \left(\frac{H_1^2}{8\pi}\right) \left\{ \left[ 1 + \frac{1}{2}\left(\frac{r_2}{R_1}\right)^2 \right] \left[ \frac{1 - \left(\frac{r_1}{R_1}\right)^2}{1 - \left(\frac{r_2}{R_1}\right)^2} \right]^2 \right.$$

$$\left. - \left[ 1 + \frac{1}{2}\left(\frac{r_1}{R_1}\right)^2 \right] \right\} \text{(constant flux)}$$

In the case $r_1^2 \ll r_2^2$, this simplifies to $$(\text{XXV}) \quad W_R \approx 2\pi r_2^2 \left(\frac{H_1^2}{8\pi}\right) \left\{ \frac{5 - 2\left(\frac{r_2}{R_1}\right)^2}{4\left[1 - \left(\frac{r_2}{R_1}\right)^2\right]^2} \right\}$$

By way of comparison, the similar limiting expression for the case of constant current is (XXVI)

$$W_{\text{transfer}} \approx 2\pi r_2^2 \left(\frac{H_0^2}{8\pi}\right) \text{ (constant current, } r_1^2 \ll r_2^2\text{)}$$

It can be seen that the two expressions differ only by the term in brackets, but that this term diverges as $r_2$ approaches $R_1$ (in the idealized case assumed). Thus, either calculated from the exact expression or from the approximate one, there exists no stringent limit on energy as in the former, i.e., the constant current case. For example if, $$\frac{r_2}{R_2} = 0.8, \ r_1^2 \ll r_2^2$$

$$\frac{W_R \text{ (constant flux)}}{W_{\text{transfer (constant current)}}} \approx 7$$

Either of the foregoing methods of operation, as well as intermediate combinations of the two, are adaptable to supply electrical energy to an exterior circuit. The simpler methods would involve merely connecting the exterior circuit to the solenoidal magnetic coil for an appropriate period during the reaction cycle or at the conclusion thereof and draining power from the magnetic field thereinto. As the magnetic field begins to decay, overall, due to this energy drain, energy of the charged particles is transferred into the magnetic field and then into the exterior circuit by the inverse mechanisms which effected heating on compression. It is interesting to note that in the constant flux method, the reaction generates current effective in the solenoid to assist in maintaining compression.

However, as the magnetic field decreases during decompression, the diameters of the particle orbits increase and eventually increasing numbers of particles are lost radially and the energy appears in a thermal form on collisions with physical containment surfaces from which it can be recovered by suitable heat transfer media and employed in ordinary thermal equipment. The proportions of energy recoverable electrically and thermally will depend on the physical dimensions of the system and rates of decompression. When decompression (expansion) occurs rapidly, $W_\perp$ mainly is reduced and not $W_{\shortparallel}$, leading to loss preferentially out of the end regions. If decompression is done more slowly, i.e., in a time period above that equivalent to the thermalizing time, the energy distribution remains more nearly Maxwellian, i.e., $W_{\shortparallel}$ transforms into $W_\perp$ as the latter decreases and a greater total energy is available to the external circuit.

DECOMPRESSION

*Axial.*—Axial decompression, i.e., a decompression accomplished in such a fashion that the increasing volume of the containment zone is principally in the longitudinal axial direction can be used to recover the energy, e.g., in mechanical and equivalent electrical methods.

The structural portions of the solenoid employed to provide the gradientially increased magnetic reflector field regions are subjected to an axially outward mechanical force by the interaction of the plasma expansive forces with the reflector magnetic fields. Arranging such solenoidal reflector coil structure on carriage mounts mechanically coupled to mechanism for utilizing the thrust converts the expansive force of the plasma into mechanical energy similarly to an internal combustion or steam piston engine. In corollary inward mechanical motion of the reflector solenoids compresses the plasma. Analogous electrical conversion is also possible by utilizing electrical arrangements described hereinafter. It is contemplated that some combination of axial and radial decompression performed in some inverse order in which compression is obtained may provide optimum operating conditions since duration of times when peak magnetic fields are maintained over substantial lengths of the system would be greatly reduced and input power would be proportionately reduced thereby.

Charged particles which escape from the reaction zone during reaction and during decompression represent both a loss of energy and fuel from the system. Usually the loss will quite preferentially occur through the reflector region as a behavior which is unique in the system of the invention. A particle, on the average, encounters each of the reflector regions many times before successfully penetrating. As a consequence, the loss can be made to occur almost exclusively through one reflector region by maintaining the magnetic field intensity thereof at a slightly lower value than for the other reflector region. Accordingly, these particles may be retained in a secondary "accumulator" zone, at low densities and with long thermalizing time constant, to later be decompressed and/or reinjected into the reaction system utilizing multiple zone reactors in which reaction and secondary accumulator zones are arranged, effectively in tandem, as described more fully in conjunction with the description of Apparatus and Operation which will now be set forth.

APPARATUS AND OPERATION

As noted hereinbefore, a controlled thermonuclear reactor, i.e., apparatus for conducting a thermonuclear reaction in accordance with the invention will comprise, in essence, means establishing an evacuated zone, means for providing an axially symmetric magnetic field having longitudinally spaced, gradientially-intensified magnetic reflector field regions within the said evacuated zone, means for supplying the electrical energizing currents for said magnetizing means, said magnetizing means and/or electrical energization means comprehending further means for causing longitudinal movement of the gradientially increased magnetic reflector field regions and for correlating magnetic field intensities as required for injection, compression, decompression, etc., and thermonuclear fuel injection means. Accessory equipment for utilizing the various products may also be provided for use in conjunction therewith.

Basic components and organization of a single zone controlled thermonuclear reactor, suitable for conducting a thermonuclear reaction process in accordance with the invention, is indicated, generally, at 40, in FIG. 21 of the drawing. As illustrated therein, said means establishing an evacuated zone is provided as a vacuum chamber 41, pervious to magnetic fields which, due to the elongated nature of the magnetic fields employed, is preferably constructed as an elongated closed cylinder, said chamber being coupled as by means of a conduit 42, to vacuum pump and cold trap means 43 of conventional design and arranged to provide recovery and recycling of gaseous materials exhausted from such chamber 41.

Means for providing the axially symmetric magnetic containment field within said evacuated chamber 41 may comprise a solenoidal coil winding 44, disposed concentrically about the chamber 41, so as to enclose a substantial length thereof. Such solenoid 44 may be uniformly distributed and may be disposed, either within or without said chamber, optionally, as desired and is therefore capable of providing, at least, a magnetic field region of fairly uniform intensity ($H_0$) along a substantial length of the chamber, i.e., along central axial portions of the chamber 41 on being energized by electrical current from a power supply 45. Moreover, such solenoid 44 may be a single continuous winding, a segmented series of windings or any equivalent arrangement.

The gradientially-intensified magnetic reflector field regions (conventionally designated as $H_1$ and $H_2$) may be provided in terminal regions 46 and 47 of chamber 41 (which regions are enclosed by corresponding terminal portions of solenoid 44) by disposing solenoid segments 48 and 49, respectively, coaxially thereabout. Such segments 48 and 49 may be disposed exteriorly about or interiorly within the terminal portions of the solenoid 44, the latter being possible provided the operation of terminally-disposed ion sources or similar structure is not subject to interference by such a placement. Such solenoids 48 and 49 may be energized in series with solenoid 44 or independently thereof.

Translatory movement of such reflector fields, $H_1$ and $H_2$, in the axial direction as may be employed in injection, compression or decompression, may be provided by mounting either or both of such coil segments 48 and 49 by means of an appropriate mechanical arrangement, e.g., carriage means 51 (not shown) which carriage means are adapted to reciprocate and thereby carry such solenoids in concentric alignment along the longitudinal axis of the chamber. Furthermore, such carriage means 51 has associated therewith motive means 52 (not shown) of conventional types adapted to impart such a reciprocating motion. For purposes of extracting power by axial decompression as described above, suitable inertial devices, e.g., flywheels, etc., and coupled electrical current generators or the conventional equivalent may be used in conjunction with said motive means. Effective translatory motion of such magnetic reflector field regions may also be obtained by disposing the individual members of two groups of additional segments, i.e., 53, 55, and 57 and 54, 56, and 58, sequentially inward of segments 48 and 49, respectively, and employing programming circuitry 59, to switch electrical power, as from supply 45, to pairs of corresponding segments sequentially inward and thereby, in correlation with energization of solenoid 44, yielding the magnetic field configurations described hereinbefore.

Characteristics required of such a power supply 45, are believed largely apparent from foregoing considerations; however, it may be noted that such a supply must be capable of providing large amounts of electrical energy in the form of high-voltage, high-peak currents and therefore will usually, for convenience, be of large electrical or electromechanical energy storage capability, e.g., will therefore include condenser banks, storage inductors, inertial devices, storage batteries or the like. Moreover, such storage devices may be "floated" across the solenoid 44 to stabilize and adsorb excess energy during progress of the reaction and during decompression to be reemployed in subsequent cycles and/or provide a continuous supply voltage for external consumption. Of course, an auxiliary power source is required initially or where electrical power generation is not contemplated in order to charge the energy storage units.

Generally speaking, the design of the programming circuitry 59 will follow conventional practice and provide for the sequential actuation of appropriate components as required for effecting the various operations described hereinbefore and, therefore, will comprise electrical and/or electromechanical sequential timing devices controlling the operation of current control and switching gear and may include refinements such as reaction rate sensing devices coupled therewith to modify the behavior of the aforesaid components. In the case wherein translatory motion of the reflector fields is effected mechanically, the programming circuitry would be modified to correlate the translatory motion of the carriage with energization of the various solenoids in accordance with requirements apparent in the foregoing. Additional components may be incorporated into the programming circuitry, as required in performing other operations as will be noted from time to time as the description proceeds.

Ion sources 61 disposed centrally or in radial banks in one or both of the terminal regions, 46 and 47, outwardly of about the terminal planes of solenoid 44, provide fuel ion beams directed in accordance with considerations noted hereinbefore. Such ion sources 61 will essentially include, as in conventional practice, a supply of fuel material to be ionized, means for vaporizing the fuel material, if necessary, and for ionizing the fuel material, means for accelerating and focussing the fuel ions to provide a directed space charge neutralized beam of ions emergent therefrom. Acceleration of the ionized fuel material may generally be accomplished by passage through electrostatic fields produced by spaced, charged conductor surfaces, i.e., with E.M.F. existing therebetween, often in conjunction with magnetic fields and with subsequent provision for space-charge neutralization. Such accelerative conductor surfaces may be, at least partially, internal of the ion source, external thereof, e.g., with one surface disposed radially about the containment zone or combinations thereof. Appropriately these ion source means provide either low or high kinetic temperature ions in copious quantities, e.g., few hundred electron volts, whenever compressive heating and densification is to be used to initiate the reaction or up to at least several hundred thousand electron volts when continuous reaction conditions are desired. Other equivalent ion producing and accelerating means may likewise be employed to inject either the thermonuclear fuel or other material to be added.

Such ion sources 61 may be operated intermittently and with control by the programming circuitry 59, to effect injection and containment of preheated fuel ions, correlatively with manipulation of the magnetic containment fields as described hereinbefore, whereby initiation of the reaction is facilitated by subsequent compression. However, during periods when a sustained reaction is occurring, additional material may be injectioned by continuous operation of at least a few of the ion sources since, with a plasma present, considerable additional material may be trapped therein without variation in the magnetic fields. Other methods of introducing the initial charge of fuel ions or supplementary thermonuclear fuel charge have been noted hereinbefore.

With devices which embody the basic feature ascribed to the controlled thermonuclear 40, certain fundamental operations and associated processes may be performed in accordance with the teachings of the invention. Such basic operations, which may be also performed in similar fashion as integrated steps in more complicated apparatus and processes described hereinafter, include the following:

(1) Fuel injection, at least initially, may be effected by first establishing the magnetic containment field, i.e., $H_1$, $H_2$ and $H_0$, at an appropriate level, as directed by the programming circuitry in actuating the power supply 45 to energize solenoids 44, 48, and 49, whereby an ion containment zone is established in central regions of the evacuated chamber 41. Then such circuitry 59 actuates the ion sources 61 to direct a space charge neutralized beam of the fuel ions into the reflector field regions correlatively with an increase in magnetizing current to at least solenoid segments 48 and 49, with or without increase in the current in solenoid 44, as described hereinbefore, whereby a fuel charge is trapped and accumulated in the said containment zone. Such fuel ions being preheated to a high kinetic temperature if reaction is to be initiated immediately by accumulation to sufficient density in a high intensity field or at a much lower preheat temperature in the event that compression is to be employed to heat and densify the thermonuclear fuel charge to initiate and promote the reaction.

(2) Compression may be viewed as a continuation of manipulations begun in fuel injection with extension to include intensification of the central radial field, $H_0$, and inward translatory motion of the reflector fields $H_1$ and $H_2$. More particularly, the programming circuitry is so designed that, at about the time injection of the fuel charge has been completed, the power supply 45 is caused to supply more energizing current to solenoid 44 and causes solenoid segments, 48 and 49, to be moved mechanically inward or causes the sequentially inward switching of pairs of solenoid segments 53, 54; 55, 56; and 57, 58, as described above.

The relative motion of such reflector fields and intensification of the radial field and therefore the compression ratio are determined from factors noted in the foregoing. Factors to be considered in determining the compression ratio to be employed include the preheat temperature of the fuel ions, the ion density obtained by injection, trapping and accumulation, the reaction characteristics of the particular fuels employed, e.g., $\sigma$ and activation energy, and others apparent from the disclosure or known in the art.

Compression may be sustained or regulated by designated operation of said programming circuitry to sustain and/or regulate the reaction rate with additional fuel injection as required. Therefore compression (sustained) may also be viewed as containment at high kinetic temperatures and with associated high pressures and equivalent temperatures. Generally speaking, the thermonuclear reaction proceeds during the compression stage of the process whereby certain products, i.e., neutrons and radiation emerge immediately and charged particle energy may be recovered subsequently. Compression may be sustained by either the constant current, constant flux or intermediate combination methods described above for as long as is necessary to burn sufficient fuel, the reaction becomes too slow, power removal is desired, or other purposes.

(3) Decomposition is then effected under appropriate control and direction of the programming circuitry 59, whereby the reflector fields are moved outwardly and the energy resident in the magnetic fields and/or in the particles is dissipated, stored for subsequent use and/or delivered externally. These operations may be cyclically repeated with decompression allowed to proceed to the point where all of the energy in the magnetic field and particles is extracted whereby no appreciable residual quantity of contained ions remains or may be only partial whereby a substantial residual quantity of the ions are retained in the containment zone and additional fuel ions are injected by repetition of foregoing manipulations.

In the general annular area 62, additional ion sources may be disposed to effect central radial injection of fuel materials or various structures adapted to utilize various products of reactions occurring in the containment (reaction) zone enclosed thereby may be disposed in this general area. Radiation adsorptive (including high Z) materials incorporated as heat transfer system components may be so disposed to convert impinging radiation and particle energy into thermal energy to be transported exteriorly and used in conventional power generating and other devices. Secondary fuel generating materials capable of utilizing products of the reaction, e.g., lithium, may be disposed in such a location and subjected to bombardment with neutrons emerging from the reaction zone to generate tritium which can be removed from materials exhausted from the system or by processing of the bombarded materials and cycled into the ion sources or used otherwise. Materials which may undergo various nuclear reactions with products of the reaction (or with the accelerated ions) e.g., materials fissionable by the energetic neutrons may be so disposed or may be arranged in the form of lattices as in subcritical neutron reactor configurations or targets in this region.

Similarly, primary and secondary structures may be disposed in the annular belt area 63 which encircles the central length of the solenoid 44 and, likewise, the area 62, substantially, in coaxial relation. Structures may be employed simultaneously in each area (62 or 63) to perform individual and separate functions or in a mutually cooperative fashion. Consideration of the products of typical reactions which may be conducted in the containment zone will reveal the nature of structures which may be employed in such areas 62 and 63.

Certain thermonuclear fuels and reactions therewith which may be conducted in the containment zone have been indicated or are suggested in the foregoing including the following:

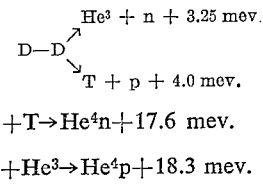

$D+T \rightarrow He^4 n + 17.6$ mev.

$D+He^3 \rightarrow He^4 p + 18.3$ mev.

Other possible thermonuclear reactions involve light nuclides e.g., $He^3$, Li, and Be either alone or in combination with the others noted. Moreover, secondary reactants, e.g., heavy elements which may undergo fission with neutrons produced in the system may be introduced and thereby produce other products, e.g., additional neutrons and increase the amount of radiant energy escaping from the containment zone and utilizable as in a continuous thermal cycle.

It will be noted that the majority of the reactions generate a variety of energetic charged and uncharged particles. The energy of the charged particles may be converted into either thermal or electrical power as noted above. Also, provided sufficient energy resides therein, these energetic charged particles may be utilized in transmutation and other nuclear reactions. The energetic neutrons generated by the reactions offer exceedingly attractive possibilities of utilization in fast and slow neutron reactor systems.

More particularly, neutrons produced in thermonuclear reactions may emerge from the system with up to several mev. of energy, e.g., the 14 mev. neutrons of the TD reaction. Therefore, if an isotope or element of high Z is disposed in the area 62 or 63, with or without moderator fission both slow and fast and other reactions may take place. Therefore, for example, thorium, uranium and possibly other high Z materials may be disposed in subcritical neutron reactor configurations in area 62 and/or 63 whereby a supplementary energized neutron sustained nuclear chain reaction may be promoted therein with output of additional amounts of power and with the possibility of producing either fissionable or fusionable fuels therein, as well as other materials analogous to the use of the conventional, critical neutron reactor systems.

Neutron multiplying materials may likewise be disposed in such a structure in proximity to the containment zone whereby such energetic neutrons may impinge thereon with the minimum of moderation to effect, n, 2n or xn, in elastic scattering reactions usable in said subcritical neutron reactor system or otherwise. Elements and isotopes in the high Z region of the Periodic System, e.g., $U^{238}$, $U^{235}$, $Pu^{239}$, Pa and others in the actinide series constitute high Z neutron multiplying materials. Neutron multiplication by (n, xn) reactions also take place with low Z elements. The neutrons produced by such a reaction are of an intermediate energy very effective for use in producing T from $Li^6$ or for energizing neutron reactors designed for neutron energies somewhat above thermal (intermediate or fast).

Examples of possible neutron multiplying reactions are as follows:

$$U^{238} + n_1 \longrightarrow U^{237} + 2n \text{ (int. energy)}$$
$$\xrightarrow{\beta} Np^{237}$$
$$U^{235} + n_1 \longrightarrow U^{(235-x)} + xn$$
$$n_{(14\text{ mev.})} + Li^7 \longrightarrow Li^7 + n \longrightarrow T + He^4$$

$n_{(1)} = 14$ mev. neutron (high energy neutron)

Desirable thermonuclear fuels such as tritium may be produced by reactions with neutrons, as follows: (it will be noted that the immediately foregoing reaction produces T and multiplies neutrons).

$$Li^6 + n \longrightarrow T + He^4$$
$$Li^7 + n_{(1)} \longrightarrow Li^{7*} + n_{(\text{Int})} \longrightarrow T + He^4$$
*Activated state.

Possible combinations of foregoing reactions utilizing these intermediate energy neutrons and/or the other neutrons of the thermonuclear reaction are possible, for example, as follows:

The T–D reaction would occur in the reaction zone while the $U^{238}$ and $Li^6$ reactions would be made to occur in a lattice structure in which the $U^{238}$ may be arranged as the primary target and the Li as the secondary target. Conventional neutron reactor or accelerator design may be employed to effect the foregoing. The tritium produced in the secondary target material may be allowed to diffuse therefrom to enter the reaction zone as described hereinbefore, be exhausted and recycled, or recovered from solid target material by chemical processing means and then recycled or utilized otherwise.

Therefore, the copious amounts of energetic neutrons produced in the thermonuclear reaction may be multiplied and utilized in a normally, very much subcritical neutron reactor system and with fertile material present, may breed large amounts of a desired product, for example, fissionable material, fusionable material, heat and other products. In the foregoing manner there may be provided driven neutron reactors, i.e., a neutron reactor which is effectively brought to criticality not alone by the conventional method of effecting proper geometry and employing a sufficient quantity of fissionable material, but by supplying at least sufficient driving force in the form of neutrons to balance the loss mechanisms and thereby obtain a continuous reaction at any desired level.

Omitting certain components such as the vacuum system, power supply and programming circuitry which may follow conventional design to satisfy the requirements believed apparent from the disclosure, the basic components and organization of a linear, multiple zone thermonuclear reactor 70 may be provided as illustrated in portion $a$ of FIG. 22. As shown therein, such reactor 70 incorporates axially-aligned reaction zones, 71 and 72, separated by a much larger accumulator zone 73. As will become apparent hereinafter such zones 71 and 72 are dynamically defined and exist alternately and not simultaneously, each, alternately, being combined with the accumulator zone, as required in various methods of operation. More particularly, solenoid segments 74 and 75 may be disposed to radially encircle zones 71 and 72, respectively, while the longer and, optionally, larger diameter solenoid segment 76 may be disposed between solenoids 74 and 75 so as to radially encircle the accumulator zone 73, such solenoids 74, 75 and 76 providing, generally, only radially effective containment fields, i.e., they are constructed with an approximately uniform distribution of ampere turns.

Solenoids 77 and 78, disposed in the region of the outer extremities of segments 74 and 75, respectively, provide approximately equivalent terminal closure fields, $H_1$ and $H_3$, as indicated in FIG. 22, portion $b$. Solenoid segments 79 and 81, providing movable reflector fields, e.g., $H_2$ as by being mounted on carriage means similar to 51 above (not shown) or the equivalent electrical means described hereinbefore are disposed concentrically with respect to solenoid segment 76 and are designed in such a manner that $H_1 = H_3 > H_2$, especially during final stages of compression in either zone 71 or 72, as illustrated in FIG. 22b. Moreover, $H_0$, situated therebetween in zone 71, is made less than either $H_1$ or $H_2$, by an amount required by the desired reflector field ratio and $H_0^1$ in zone 73 is very much less than $H_0$.

Under these conditions with reaction proceeding in zone 71, loss through the reflector field regions will occur almost exclusively through the lower intensity field region, $H_2$, whereby the particles are accumulated in region 73 under low density conditions due to low field strength therein, wherein their energetic state is preserved due to long thermalization times resulting from such low density conditions. To preserve space-charge neutralization in the event, e.g., positive charges preferentially are accumulated, space charge neutralizing beams of electrons or gas are injected therein.

Ion sources 61, disposed, e.g., in radial banks outwardly from solenoid segments 77 and 78, may be utilized to supply the ionic fuel and/or other sources (not shown) may be disposed to inject fuel into zone 73 either radially or terminally. Likewise, appropriate structures may be disposed in the areas 62 and 63, as described above and to serve similar purposes.

Several variations may be employed in operating such a multiple zone thermonuclear reactor; however, it is contemplated that the zones 71 and 72 will serve, primarily, as reaction zones similarly to the single zone employed above and zone 73 will serve to accumulate ions lost through the lower intensity reflector field, $H_2$, and also as a decompression zone, and for other purposes, e.g., as to receive ions injected radially therein. Such zones 71, 72 and 73 need not necessarily exist simultaneously since they are dynamically produced and manipulated by the integrated operation of the system in accord with the designed scheme of operations. Moreover, one or both of the terminal zones, 71 and 72, may at times be combined with the central zone 73 during certain phases of the operations.

With the operational state indicated in FIG. 22, reaction would be proceeding in reaction zone 71. In this case, for example, solenoids 74, 75, 76, 77, 78 and 79 would be energized to yield a magnetic field having an axial intensity profile corresponding to that shown in FIG. 22(b) with injection, fuel accumulation and compression having been accomplished as noted above, at least initially. Now if it is desired to employ an operating cycle in which reactions are conducted in zones 71 and 72, alternately, somewhat as in a double acting internal combustion cylinder, solenoid 81 may be energized and moved along solenoid 76, with additional fuel injection if necessary, whereby a thermonuclear reaction is initiated in zone 72 by compression and densification of fuel material accumulated between reflector fields $H_2$ and $H_3$, with a reflector field $H_2'$ (not shown) now being in the mirror image position of field $H_2$, accumulator zone 73 then being essentially devoid of plasma.

Now decompression of zone 71 may be effected by allowing solenoid 79 to be thrust along solenoid 76, towards solenoid 81, while delivering mechanical thrust to an external generating device and allowing the magnetic field to decay generating electrical current therein, as well as in solenoid 76 at least.

Radial decompression might be effected, at this point, as described above, to deliver particle energy to heat transfer structures in the region 62 by allowing the magnetic field to decay with generation of electrical power in solenoid 74, while maintaining the current in solenoid 79, thereby permitting accumulation of fuel ions lost from zone 72.

However, in the event that radial decompression is not employed, axial decompression by the movement of solenoid 79 along solenoid 76 with decay and modification of the magnetic field reestablish the initial condition, although in the mirror image relation, i.e., $H_2'$ (not shown) now bears a similar relationship to $H_3$, as $H_2$ originally bore to $H_1$ and $H_1$ and $H_2'$ define accumulator zone. The foregoing cycle may now be repeated to return to the initial condition and the complete cycle repeated as often as desired.

It will be noted that this multiple zone reactor maintaining low magnetic currents in the segments 74, 76 and 75 as well as terminal segments 77 and 78 continuously, allows only few particles to be lost externally or deionized. Therefore, after the initial cycle, successive operational cycles may be begun with a substantial charge disposed as a low-density, long-thermalizing time, plasma therein utilizable by repeating the foreging injection, compression and decompression operations alternatively into regions 71 and 72 utilizing common accumulator region 73.

As noted hereinbefore, the plasma subsequent to compression occupies a much smaller volume, also it is an important economic consideration that the volumes of high magnetic field intensities be as small as possible. Accordingly, the modified reactor 90 illustrated in portion (a) of FIGURE 23, may be employed to benefit from the foregoing by employing solenoids of large radii to create an accumulator zone 91 and solenoids of much smaller diameter to create the reaction containment zone 92, therein. For the sake of descriptive simplicity, similar components which have been described in the foregoing will be omitted. At the outset it will be apparent that such an arrangement is particularly useful in applications wherein the reactor arangement is to be surrounded by product utilization structures described hereinbefore, due to large reductions in the physical dimensions permitted thereby. Although the reactor is shown with the constricted region arranged terminally, it is believed apparent that such region could likewise be centrally disposed between similar accumulator regions adapted for simultaneous compression into the constricted region.

More particularly, the reactor 90 may be provided with a relatively long and large diameter solenoid 93, the magnetic field of which radially defines the accumulator and initial compression zone 91, with an axially symmetric field $H_0$, while solenoids 94 and 95 provided as disclosed hereinbefore and disposed concentrically in the terminal regions of solenoid 93, provide terminal reflector fields $H_1$ and $H_2$, of FIG. 23b, respectively. The magnetic field of a solenoid segment 96 arranged coaxially and in abutment with solenoid 95 and which is of a much smaller internal diameter and usually of shorter length than segment 93 radially defines the thermonuclear reaction zone 92 while a solenoid 97 arranged either concentrically with reference to or coaxially in abutment with solenoid 96 may be employed to provide the outward terminal reflector field $H_2'$ of FIG. 24b.

Certain possible variations in the structural configurations of such solenoids may be noted, e.g., to avoid a sharp discontinuity in the magnetic fields the solenoid 93 may be physically tapered over a portion of its length to produce a smoothing of magnetic contours in the regions of abutment with segment 96. Ion sources as in banks, e.g., 61, may be arranged coaxially outward from solenoid 94 to supply the fuel ions as described hereinbefore or other described methods may be employed.

Essentially, the modus operandi with embodiment 90, comprises injection into the accumulator zone 91, under low-density, preheated conditions, by hereinbefore disclosed methods as by pulsed energization of solenoid segments 94, 95, and with the current to 93 held constant or only slightly increased, i.e., $H_1$ and $H_2$, increased while $H_0$ is approximately constant. Compression is begun in zone 91, by increasing the current in 93, 94, 95 ($H_1$, $H_0$ and $H_2$ increased) and causing translatory movement of said fields whereby $H_1'$, $H_0'$ and $H_2'$, as shown in FIG. 24b, define the reaction zone 92, i.e., these fields contain the plasma now situated within the solenoid 96, during reaction. Decompression then being effected into zone 91.

The foregoing translatory movement may be effected in several ways. Solenoid 94 (and 95) may be mechanically reciprocated as noted hereinbefore to cause the translatory and axial compression or the sequential switching of solenoids, i.e., the electrical equivalent may be employed. Several other methods may be employed to cause the field $H_2$ to attain the position of $H_2'$. For example, the solenoid 97 might be caused to reciprocate internally along the interior of solenoid 96 to serve to provide both $H_2$ and $H_2'$, solenoid 96 being energized only when plasma may enter therein.

In the foregoing there has been described what may be considered substantially linear systems; however, it is possible and often advantageous to arrange a series of containment zones to provide a continuous closed loop system including two or more linear and the necessary connecting curved necessary portions. End losses may be minimized thereby and, also, correlated operation of the several systems may be simplified.

For example, a closed loop multiple zone reactor system 100, illustrated in FIG. 25 may be provided with three linear vacuum chamber portions, 101, 102 and 103 arranged in equiangular, i.e., delta fashion with connecting curved portions 104, 105 and 106, disposed therebetween. Solenoids 107, 108 and 109 may be wound concentrically about sections 101–103, respectively, to provide the essentially radial containment and compression fields as noted hereinbefore. Solenoid segments 111, 112 and 113, wound in toroidal fashion along curved sections 104–106, respectively, so as to follow the curved configuration thereof may be employed to cause the axes of particle paths which enter these sections to conform therewith and be conducted therethrough.

To provide the requisite magnetic reflector fields, mechanically movable solenoid segments 114 through 119, (or the electrical equivalent) may be provided concentrically around each terminus of solenoids 101, 102 and 103, respectively; however, the toroidal segments 111–113 may be energized to supplement the reflector field solenoid segments 114–119. Fuel injection may be accomplished either by radial banks of ion sources 61 arranged in the central regions of sections 101, 102 and 103, and/or radial banks of ion sources 61 arranged at the junctures of the curved and linear vacuum chamber sections with or without other auxiliary injection means noted hereinbefore.

Accessory components, i.e., power supplies, programming circuitry, evacuating means and the like, will generally be of the character described being modified with reference to increased capacities, pluralizing of individual circuit elements, switches, etc., as required to effect multiphase operation using the various linear segments sequentially. In this connection, it may be noted that energization of the terminal reflector field segments and/or of the curved sections terminating each linear section will effect containment of the fuel ions in any of such linear sections. Moreover, particles leaking from the containment zone will be directed by the fields produced by the curved segments into the adjacent linear section, whereby accumulator zone similar to those of the multiple zone reactor above may be utilized.

Power obtained by reaction and/or decompression in one of the reaction zones may be employed by appropriate disposition of the programming circuitry, to effect containment and/or compression initiation of reaction, sequentially, in each of the linear sections, whereby overlapping output power pulses therefrom may produce substantially continuous and maintained power output levels, permitting, when used in conjunction with appropriate energy storage devices, a sustained energy output to an external circuit. Moreover, appropriate product utilization structures of the character described hereinbefore may also be employed.

Basically, the reactions in each of the linear sections 101–103, may be conducted similarly to those in the single zone and in the aforementioned linear multiple zone reactor with the added advantage that particle loss through the terminal regions can be greatly reduced. By maintaining minimum intensity fields in the linear and curved sections, particles may remain for long periods in the axial volumes thereof. Any portion of the continuous closed particle path defined thereby may be closed to the particle by increasing the magnetic field intensity, e.g., increasing the energizing current flow in any solenoid segment. By maintaining one of the reflector fields intensity at a lower level than that of a second reflector field, which fields together serve as closures of any particular containment zone, particle loss may be caused to occur substantially in a predetermined direction whereby any particular interconnected succeeding volume may be caused to serve as an accumulator zone; likewise decompression may be effected into successive interconnected zones. Also, a fuel plasma may be accumulated and compressed to a high value, i.e., a value approaching reaction conditions, in one of said accumulator zones and injected by lowering the reflector field between the accumulator and reaction zones while continuing the compression by causing the outer reflector field to move inwardly. In this manner, the newly compressed and the reacting plasma may be combined without cessation of the reaction.

In view of the many functions which may be accomplished simultaneously, independently or mutally cooperatively with such a multiple zone reactor, it will be appreciated that many variations in the operation schemes are likewise possible. Plasma may be formed, segmented, heated, compressed, decompressed, transported, densified, fractionated and otherwise subjected to many basic manipulations and to obtain various results in the various zones.

Illustratively, a thermonuclear reaction may be initiated in the section 102 by energization of the solenoid 108 and reflector field segments 116 and 117, as described above. By maintaining the field intensity of solenoid 116 at a lower value than that of solenoid 117, particle loss may be caused to preferentially enter curved portion 104 which when energized to a minimum level causes the particles to enter the linear portion 101 and be retained therein by energizing solenoids 107 and 114 to levels apparent from the foregoing.

Decompression of the reaction zone in linear segment 102 may now be accomplished utilizing a portion of the generated electrical power to initiate a second reaction in linear segment 103. At least a portion of the fuel plasma for such second reaction may be obtained by transferring the accumulated material from section 101 into section 103 by lowering the intensity of the reflector field produced by solenoid 114, sweeping the section 101 by energizing the solenoid 115 and moving it along solenoid 107 with minimum containment fields in curved segment 106 and 103 in the earliest stages of the initiation of the reaction in segment 103. Then segment 115 may be returned to the position shown to engage in the decompression of section 102.

In a similar fashion the residual plasma may be transported from section 102 into section 101 and reaction initiated therein while decompressing the reaction of section 103 into section 102. Now reaction can again be initiated in section 102 attended by decompression of the reaction in section 101 into section 103 and continuing in a similar fashion.

It will be apparent that a pulsating current with overlapping phase relationships is available in such a system from the various solenoids segments in which magnetic field decay and/or in which decompression is occurring. By employing relatively rapid compression and decompressing multiphase, alternating current may be generated and supplied to the external load. Slow repetition rates would produce either a low frequency alternating or a pulsating direct current which could be utilized as such or converted into standard alternating electrical current.

Specific details of apparatus described in the foregoing will become apparent from the description of an operative reactor apparatus, generally indicated at 130, of FIGS. 26 and 27, of the drawing. As illustrated therein, the reactor 130 includes an elongated cylinder 131 in which the containment fuel is provided and formed of material suitable for vacuum service and pervious to varying magnetic fields, e.g., Pyrex glass, porcelain, cermet, etc. To complete the evacuated system such cylinder 131 is provided with terminal flanges 132 and 133. One of the said flanges, i.e., 132, may be sealed with a transparent window 134 attached by means of ring 135 and flange bolts 136 while flange 133 is joined to a short flanged cylindrical conduit section 137 and thenceforth as by means of flanged elbow 138 to vacuum pump means 139. Ordinarily the latter will include conventional cold traps and evacuating pumps.

To provide the indicated magnetic containment field a solenoid 141 is disposed concentrically along cylinder 131. Such solenoid 141 may be formed as with a first full length uniform layer 142 of conductor winding and with series-wound overlapped layers 143 and 144 in the terminal regions thereof. As a consequence of this construction electrical current flowing in the solenoid will produce an axially symmetric elongated magnetic field having gradientially-increased magnetic reflector field intensities in the terminal regions, i.e., with the field intensities generally resembling the graphical configuration indicated in FIG. 1b. Due to the very large mechanical forces which develop in the coil structure as a consequence of the magnetic forces, the solenoid 141 must be rigidly constructed. Also, the construction must include adequate insulation to withstand the electrical stresses and, in continuously operating equipment, provision should be made for cooling.

Direct electrical current required for energizing the solenoid 141 is supplied, as illustrated in FIG. 28 of the drawing, through conductors 145 and 146, attached terminally thereto, from a power supply 147 which includes a high discharge rate direct current power source 148, means for applying such current to the solenoid 141 and means for stabilizing and terminating the discharge. For example, such power source 148 may consist of large condenser banks and condenser charging power supplies of conventional design which deliver the required current to positive and negative terminals 149 and 151, and grounded center tap 152, respectively, thereof. An ignitron 153, or equivalent means, may be utilized to apply the current as by coupling the anode 154 thereof to the positive power source terminal 149, the cathode pool 155 thereof to conductor 145 and conductor 146 to the negative terminal 151 of the power source 148. Actuation of magnetic vacuum relay 156 coupled between the anode 154 and igniter 157 of the ignitron 153 then causes the power source to discharge through the solenoid 141.

In the event that the power source includes condenser banks, as the peak current supplier, means must be employed to prevent current reversal ("ringing") which would damage the condensers, e.g., an ignitron 158 coupled across the solenoid 141.

More particularly, the cathode pool 159, of ignitron 158, is connected to conductor 145 and the anode 161 to conductor 146 together with the anode 162 of diode 163. The cathode 164 of diode 163 is then coupled to the igniter 165, of the ignitron 158, whereby, on reversal of the current flowing in solenoid 141, at termination of the initial discharge therethrough, a poriton of the reversal current, passing through the diode 163 discharges the ignitron. Thereby the main portion of the reversal current passes through the ignitron 165 damping oscillations and generally dissipating the stored and the thermonuclearly generated energy which energies optionally can be utilized externally.

Parasitic oscillations of higher frequencies may be set up in the solenoid 141 by the discharge. These may be eliminated by coupling a resistor 166 and a series condenser 167 from conductor 145 to ground and a similar resistor 168 and series condenser 169 to ground from conductor 146. It will be noted that these condensers and resistors form a damped, balanced, grounded, radio-frequency center tap for the circuit of solenoid 141.

With observance of conditions noted hereinbefore, thermonuclear fuel injection may be accomplished by any means which is capable of directing a beam or cloud of ionized fuel particles through at least one of the terminal regions into the central zone in the evacuated cylinder 131, at an appropriate time during pulsed energization of the solenoid 141. At such time it is merely necessary that the particles be supplied with an axial and radial momentum either prior to or on encountering the first reflector field region (i.e., approximately in the volume encompassed by winding 144) just sufficient to penetrate the reflector magnetic field existing therein. Once having penetrated this first reflector region the particle traverses the central region and encounters the second reflector region in which, in the interim, the magnetic field intensity has increased over the first region, and thereby the particle is reflected and contained in the reaction zone between the reflector regions as noted supra. To aid the second reflection, the solenoidal winding 143 may be made with slightly more ampere turns than are employed in winding 144.

Such fuel injection means, e.g., for hydrogen isotopes, may comprise an ion source 171, disposed axially within the cylinder 131 with the effective emission area situated in about the terminal plane of the solenoid 141 and with emission directed longitudinally toward the central region. More particularly, the exterior, longitudinally-slotted metallic cylindrical shell 172 of such ion source 171 may be supported on a face of a radially-disposed, perforated metallic disk 173 which is peripherally suspended between flange 133 and the abutting flange 174 of the cylinder 137 whereby the conical ion emitting anode tip 175 thereof, which is supported by metallic tubular section 176 disposed by means of insulators 177 coaxially within the shell 172, is axially aligned at about the terminal plane of the solenoid 141. Such anode tip 175 comprises a glass cone structure provided on the outer surface with a spiral ribbon 188 (not shown) of vapor deposited titanium having one terminus attached to an axially disposed conductor 179 which is brought exteriorly through a seal 181 in the section 137 and the other terminus attaches to source section 176 which attaches in turn to a conductor 182 also brought exteriorly through seal 181.

Such ribbon is charged with a hydrogen isotope, e.g., deuterium or tritium, by being heated, first in a vacuum and then in an atmosphere of the gaseous isotope and finally being cooled in the gas whereupon the titanium surface occludes very large amounts of the isotope. On being subjected to discharge of electrical energy through the spiral ribbon as by means of a triggered pulse generator 183, a large burst of fuel ions is emitted by the tip 175. Such pulse is timed to occur with a slight delay after the solenoid 141 is energized to permit the reflector and radial containment field to become established, thereby to permit fuel ions to be accumulated in the reaction zone. Conventional electrical or mechanical delay arrangement 184 (see FIG. 28) may be employed for this purpose.

A non-inductively wound grid 185 supported by shell 172 concentrically about tip 175 and electrically biased therefrom with an accelerating potential from a D.C. power supply 186 applied with the positive terminal attached to either conductor 179 or 182 and the negative terminal attached to disk 173. The circuit is thereby completed through shell 172. Also, the cylinder 131 is coated on the interior surface with a thin vapor-deposited, electrically-conductive layer 187 of stainless steel which is in contact with disk 173 and therefore the accelerating potential is effective also along the length of cylinder 131. (With this coating arrangement, grid 185 may be omitted, if desired.) Moreover, positive ions striking this surface are de-ionized, i.e., neutralized, and are either embedded therein or are exhausted as a neutral gas. Such a grounded conductive sheathing should usually be provided in all reactors of the character described for similar purposes; however, similar functions may be served by other structures disposed in a similar position.

On being emitted from the tip 175 by the triggered pulse the positive ions tend to be accelerated towards the negatively charged grid 185 and stainless steel layer 187; however, in the presence of the terminal axial region of the increasing magnetic field and the biasing potential a large proportion of the emitted ions, i.e., deuterons, tritons, etc., obtain the required helical (axial-radial) motion required for acceptance through the reflector fields and within the containment zone, thereby to be accumulated therein to form the thermonuclear fuel charge.

The reactor 130 may be completed by enclosure in a magnetic shield formed as of a flanged metallic cylindrical section 188 disposed concentrically about the solenoid 141 and annular end plates 189 and 191 attached to the flanges 192 and 193 thereof, and disposed between the ends of the solenoid 141 and flanges 132 and 133, respectively, of the cylinder 131. It will be appreciated that the configuration of the magnetic field will be altered somewhat by this shield and, generally speaking, the field intensities are usually reduced thereby.

In practice in operating the thermonuclear reactor 130, the cylinder 131 is evacuated to as low a pressure as practical and, preferably, below the range of about $10^{-5}$–$10^{-6}$ mm. Hg. Then the solenoid 141 is energized by actuating vacuum relay 156 (see FIG. 28) whereby ignitron 153 is fired discharging power source 148 therethrough. After the momentary delay afforded by the delay arrangement 184, the triggered pulse generator 183 is actuated and ions are caused to be emitted from the anode tip 175 and are subjected to axial and radial acceleration by the composite electrostatic and magnetic fields present in the source regions as described above. Accordingly, a substantial fuel charge is injected in a preheated state and accumulated in the reaction zone defined by the magnetic fields in the central regions of cylinder 131.

As the discharge continues through the solenoid 141 the intensity and breadth of the terminal reflector and radial fields increase, effectively producing both radial and axial compressions. The combined compressions together produce adiabatic heating and a sharp increase in the fuel charge ion density establishing the conditions required for initiation of the thermonuclear reaction. Once the reaction is initiated by the compression, the described fields effect containment whereby the reaction progresses for a substantial period of time which would be determined by factors such as the time period over which effective fields are maintained (determinative in the present instance); however, if the magnetic containment fields are maintained indefinitely other factors, such as reduction in fuel ion density as by diffusion, reaction for other process or excessive reduction in peak ion temperatures as by thermalizing, radiation losses, etc., would terminate the reaction. Therefore, when constructed as described, the present device would normally be operated cylically.

The progress of the reaction can be observed by several methods. Microwaves beamed through window 134 into the reaction zone are reflected or refracted by the heated plasma which effects may be noted by detectors properly disposed. Photo-luminosity measurements and photometric devices are capable of detecting the increased light intensity emitted by the heated plasma. Moreover, as energetic neutrons are emitted in copious quantities by the thermonuclear reaction of many light nuclides, particularly hydrogen isotopes, the progress of the reaction is observable by disposing appropriate neutron detectors near the central reaction zone, e.g., conventional gaseous boron trifluoride detectors surrounded by proper magnetic shielding and moderator are actuated by the neutrons emerging from the reaction zone. Counting and/or control equipment associated with the detectors may be employed to record neutron emission and control rates of reaction by varying magnetic field intensities, etc. Nuclear emulsions, foils and/or target materials may also be irradiated with the neutrons and the effects, photographic or induced radioactivity, later observed. It will, of course, be apparent that the emergent neutrons can be employed to produce nuclear reactions, transmutation, fission and other well-known effects, as described hereinbefore.

Specifications of an embodiment similar to the thermonuclear reactor 130 will now be set forth. Solenoid 141 as employed therein was formed with 84 turns of gauge size 1 copper wire in portion 142, 30 turns in portion 143 and 26 turns in portion 144, with an inside diameter of 7½ inches and 44 inches overall length. The inductance of such solenoid was about 0.8 millihenry. The power supply included two 318 microfarad banks of condensers which were charged to about 20 kilovolts and then discharged in series thereby applying 159 microfarads at about 40 kilovolts of energy across the solenoid. The time required to obtain peak current, i.e., peak field, was about 500 microseconds and decay to one-half peak intensity required about 7–8 milliseconds.

In the central regions, a magnetic field intensity of about 15 kilogauss ($H_0$) and in the reflector field regions about 30 kilogauss ($H_R$) were obtained. (Field intensity of reflector solenoid 143 larger than that of reflector solenoid 144.) Using a deuterium charged source and about 500 volts accelerating potential densities of above about $10^{12}$ ion per cc. are easily obtained in the containment zone under the conditions noted.

In experiments utilizing the device described hereinbefore it was found that low energy ion beams of considerable densities could be produced by the ion source. Since these low velocity ions require a relatively long time to traverse the vacuum chamber, it was found possible to pulse the ion source to release a considerable volume of plasma into the vacuum chamber followed by energization of the containment solenoid to trap and compress a sizeable proportion of the plasma. This method of trapping and compressing a plasma may be utilized to provide an accelerated or preheated plasma which may be injected as described above with reference to the use of an accumulator zone for injection. Also, it was found in practice that a considerable proportion of ions directed into a containment field produced by maintained direct current energization of the solenoid were trapped and accumulated. It is probable that collision processes or similar phenomena alter the ratio of axial to radial velocity components of the introduced particles to fulfill the requirements discussed in conjunction with containment and injection theory.

Microwaves of about 9,300 megacycles beamed into the containment zone are reflected by the plasma and may be detected with reception equipment. Containment of a plasma for time periods of the order of milliseconds is demonstrable by this method. Light intensity measurements give comparable results while various other instrumentation indicates the effectiveness of injection, compression and containment as practiced in such laboratory scale model of a thermonuclear reactor.

While there has been described in the foregoing what may be considered to be preferred embodiments of the invention, modifications may be made therein without departing from the teachings of the inveniton and it is therefore intended to cover all such as fall within the scope of the appended claims.

What is claimed is:

1. In a process wherein a plasma of energetic ion and neutralizing electrons is produced, the steps comprising providing an axially symmetric magnetic field in an evacuated region to radially define a zone in said field, establishing gradientially-intensified reflector field regions at spaced positions in said field to serve as closures for said zone effective for confining said plasma therein, and directing a space charge neutralized ion beam into said zone for confinement therein.

2. In a method of producing energetic charged particle plasma, the steps comprising establishing a magnetic containment zone in an evacuated space such containment zone being defined radially by an axially symmetric magnetic field and axially by longitudinally-spaced closure regions of intensified magnetic field strength, introducing and accumulating energetic charged particles of positive and negative polarities to form a plasma in such containment zone, and then increasing the intensity of said magnetic field, whereby such accumulated particles are accelerated to a higher kinetic energy.

3. In a method of producing energetic charged particle plasma, the steps comprising establishing a magnetic containment zone in an evacuated space defined radially by an axially symmetric magnetic field axially by longitudinally-spaced intensified magnetic field regions, introducing and accumulating charged particles of positive and negative polarities to form a plasma in such containment zone, then increasing the intensity of said magnetic field and causing such intensified field regions to move proximally, thereby accelerating the contained particles to a higher kinetic energy, and decreasing the magnetic field intensity in a selected region to allow the energetic particles to emerge from said zone.

4. In a method for producing a charged particle plasma, the step comprising establishing in an evacuated zone an elongated axially symmetric magnetic field having longitudinally-spaced, gradientially-intensified closure magnetic reflector field regions, of intensity $H_R$, separated by a central region of lower intensity, $H_0$, thereby defining a containment zone in said central region, and the step of directing a space charge neutralized ion beam into said zone whereby plasma charged particles having a ratio of kinetic energy components, $$\frac{W_{\parallel}(0)}{W_{\perp}(0)} \leq \left[\frac{H_R}{H_0} - 1\right]$$

are contained therein.

5. A method for disposing a plasma in a containment zone established by an axially symmetric magnetic field having longitudinally-spaced, gradientially-intensified reflector field regions therein comprising directing a beam of energetic ions and neutralizing electrons inwardly into at least one of said reflector field regions while intensifying said magnetic field overall under conditions satisfying the expression, $$\frac{dH(a)}{dt} \geq H(a)\left(\frac{R}{R-1}\right)^{1/2} \frac{\xi^2}{\frac{2L}{v_0}}$$

wherein $\xi^2 \ll 1$, $H(a)$ is the magnetic field intensity at a coordinate $(a)$ in the containment zone, R is the ratio of reflector field intensity to containment zone magnetic field intensity, $\xi$ is the cotangent of the injection pitch angle, L is the length of the containment zone, and $V_0$ is the original velocity of the charged particle, whereby efficient injection and trapping of said ions and neutralizing electrons in the containment zone is effected yielding said plasma.

6. A method for disposing a plasma in a containment zone established by axially symmetric magnetic field having longitudinally-spaced, gradientially-intensified reflector field regions therein comprising directing a beam of energetic ions and neutralizing electrons inwardly into at least one of said reflector field regions while intensifying said magnetic field overall under conditions satisfying the expression, $$\frac{dH(a)}{dt} \geq H(a)\left(\frac{R}{R-1}\right) \frac{\xi^2}{\beta \frac{2L}{v_0}}$$

wherein $H(a)$ is the magnetic field intensity at a coordinate $(a)$ in the containment zone, R is the ratio of reflector field intensity to the field intensity in central regions of the containment zone, $\xi$ is the cotangent of the injection pitch angle, P, $$\beta = \left[1 - \frac{1}{R(1+\xi^2)}\right]^{-1/2}$$

L=length of the containment zone and $v_0$ is the original velocity of the charged particle, whereby such ions and neutralizing electrons penetrate the reflector field and are trapped in said containment zone to form said plasma.

7. A method for disposing a plasma in a containment zone established by an axially symmetric magnetic field having longitudinally-spaced, gradientially-intensified reflector field regions therein comprising directing a beam of energetic ions and neutralizing electrons inwardly into at least one of said reflector field regions while intensifying said reflector field regions, $H_R$, and maintaining the central field regions, $H_0$, substantially constant under conditions satisfying the expression, $$\frac{dH}{dt} \geq H_R \left[\frac{R(t)-1}{R(0)}\right]^{1/2} \frac{\xi^2}{\left(\frac{2L}{v_0}\right)}$$

wherein R is the ratio of $H_R/H_0$, L is the length of the containment zone, $\xi$ is the cotangent of injection pitch angle and $v_0$ is the original velocity of the ions, whereby injection and trapping of said ions and neutralizing electrons in the containment zone is effected to form said plasma.

8. In a process which includes the production of a high temperature plasma, the steps comprising providing an axially symmetric magnetic field with spaced gradientially-intensified reflector field regions in an evacuated space, thereby establishing a containment zone for a plasma, directing energetic fuel ions and neutralizing electrons into said zone, and increasing the intensity of said axially symmetric field to a central level of about 15 kilogauss and of said reflector field regions to about 30 kilogauss while said ions are traversing said zone, whereby a fuel plasma is trapped and accumulated therein.

9. In a method which includes the production of high temperature plasma, the steps comprising establishing an elongated magnetic containment zone in an evacuated spacial region with the central regions of such zone being defined radially by an axially symmetric magnetic field and terminally by intensified axially symmetric magnetic reflector field regions, introducing and accumulating energetic light nuclide fuel ions and neutralizing electrons in said zone to form a contained fuel plasma, and compressing the contained plasma by inward motion of the terminal reflector field regions correlated with intensification of the radial magnetic and terminal reflector field regions, thereby to effect adiabatic heating and densification of the contained fuel plasma.

10. A method for conducting a thermonuclear reaction comprising establishing an elongated containment zone in an evacuated spacial region with the central regions of such zone being defined radially by an axially symmetric magnetic field and terminally by intensified axially symmetric magnetic reflector regions of said field, introducing and accumulating energetic light nuclide fuel ions in said zone to form a contained fuel plasma, and compressing the contained plasma by inward motion of the terminal reflector field regions correlated with intensification of the radial magnetic and terminal reflector field regions, thereby to effect adiabatic heating and densification of the contained fuel plasma with consequent promotion of a thermonuclear reaction.

11. In a method wherein a plasma is formed and is conducted in an evacuated spacial region, the steps comprising providing an elongated containment zone for charged particles in said evacuated region by establishing therein an axially symmetric magnetic field having at least two longitudinally-spaced, gradientially-intensified magnetic reflector field regions, whereby the magnetic field intensity, $H_R$, in the reflector regions is greater than that, $H_0$, in the intervening region; rejecting a beam of energetic light nuclide fuel ions and neutralizing electrons into said zone while increasing the reflector field intensity, $H_R$, thereby trapping and accumulating a plasma fuel charge in the region of $H_0$ intensity; compressing the contained plasma by causing the reflector fields to move proximally and the magnetic field intensities, $H_R$ and $H_0$, to increase, thereby effecting heating and densification of the plasma fuel charge; and sustaining the heated plasma charge by maintaining the magnetic fields and the attendant compression.

12. The process as defined in claim 1 wherein the said compressing of the plasma is effected in a time in the range of about $10^{-2}$ to $10^{-1}$ seconds to heat the ions preferentially.

13. In a method which includes the production of a high temperature plasma and is conducted in an evacuated spacial region, the steps comprising providing an elongated containment zone for charged particles in said evacuated region by establishing therein an axially symmetric magnetic field having at least two longitudinally-spaced, gradientially-intensified magnetic reflector closure field regions, whereby the magnetic field intensity, $H_R$, in the reflector regions is greater than that, $H_0$, in the intervening region; injecting a beam of energetic light nuclide fuel ions and neutralization electrons into said zone while increasing the reflector field intensity, $H_R$, thereby trapping and accumulating a plasma charge therein; compressing the contained plasma by causing the reflector fields to move proximally and the magnetic field intensities, $H_R$ and $H_0$, to increase, thereby effecting heating and densification of the plasma charge; and introducing gaseous fuel atoms into said containment zone to interact with and be ionized by said plasma and be trapped therewith.

14. In a method which includes the production of a plasma, the steps comprising providing in an evacuated space a plasma containment zone by establishing therein an axially symmetric magnetic field with longitudinally-spaced, gradientially-intensified reflector closure field regions, whereby central field regions have an intensity, $H_0$, and reflector field regions have intensities such that $H_{R_1} > H_{R_2}$; disposing a plasma charge in said zone; compressing said plasma charge; establishing an accumulator zone axially outward from said reflector field of intensity $H_{R_2}$ having a central field intensity less than $H_0$ and an outward reflector field intensity greater than $H_{R_2}$ to collect ions emerging through reflector field $H_{R_2}$; and reintroducing the ions collected in said accumulator zone into said reaction zone by reducing the intensity of said reflector field $H_{R_2}$.

15. In a method which includes the production of a plasma comprising establishing a plasma containment zone by providing an axially symmetric magnetic field with gradientially-intensified reflector field terminal regions in a relatively large evacuated region; injecting and accumulating energetic ions and neutralizing electrons to dispose a plasma therein; causing one of said reflector field regions to be displaced axially into a physically relatively constricted region and the second to be displaced at a relatively greater velocity in a similar manner and with intensification of said magnetic field, whereby the plasma is transported and compressed in the physically constricted region to provide heating and densification of said plasma more favorable for initiation of a nuclear fusion reaction therein.

16. A plasma device including in combination an elongated solenoid energizable to produce an axially symmetric magnetic field in an evacuated space, at least two solenoid segments spaced concentrically along said elongated solenoid and defining localized regions of increased ampere turns distribution, means for energizing said solenoid segments and elongated solenoid, whereby there is provided in said evacuated space an axially symmetric magnetic field having spaced, gradientially-intensified reflector field regions encompassed by said solenoid segments and therebetween defining a charged particle containment zone, and ion source means disposed to direct energetic charged particles including ions and neutralizing electrons into said containment zone to form a plasma of said particles therein.

17. A charged particle accelerator comprising means establishing an evacuated space, an elongated solenoid disposed so as to produce an axially symmetric magnetic field in said space when energized, at least two solenoid segments disposed at spaced positions concentrically along said elongated solenoid; power supply means for applying energizing currents to said solenoid and solenoid segments including means for increasing the energization of said solenoid segments, whereby there is provided in said evacuated space an axially symmetric magnetic field with spaced, gradientially-intensified reflector field regions defining a containment zone; ion source means disposed to direct energetic charged particles and neutralizing electrons into said zone at least during times when said elongated solenoid is energized and the energization of said solenoid segments is being increased; and target means disposed in proximity to said containment zone, whereby diminishment of the magnetic field intensity in a corresponding position permits accelerated particles to impinge thereon.

18. In a device for providing a high temperature gas plasma, in combination means establishing an evacuated space, an elongated solenoid disposed so as to produce an axially symmetric magnetic field in said space when energized, at least two solenoid segments disposed at spaced positions concentrically along said elongated solenoid, power supply means for applying energizing currents to said solenoid and solenoid segments, whereby there is provided in said evacuated space an axially symmetric magnetic field with spaced, gradientially-intensified reflector field regions defining a containment zone, and ion source means disposed to direct energetic fuel ions and neutralizing electrons into said zone at least during times when said elongated solenoid is energized and the energization of said solenoid segments is being increased.

19. The reactor as defined in claim 18 wherein said ion source means are disposed to direct said fuel ions into reflector field regions.

20. The reactor as defined in claim 18 wherein said ion sources are disposed to direct fuel ions radially into said containment zone.

21. The reactor as defined in claim 18 wherein at least one of said solenoid segments is adapted to be moved mechanically along the axis of said containment zone.

22. A Pyrotron device comprising an elongated vacuum chamber pervious to magnetic fields, vacuum pump and cold trap means for evacuating said chamber, solenoid means disposed concentrically about said chamber and having increased ampere turns terminal portions to provide an axially symmetric magnetic field having gradientially-intensified reflector field regions in said chamber, ion source means disposed to direct space charge neutralized beams of energetic ions into said reflector field regions, and power supply means for energizing said solenoid means.

23. In a Pyrotron, the combination comprising an elongated vacuum chamber pervious to magnetic fields, vacuum pump and cold trap means adapted to evacuate said chamber, means including a solenoid disposed about said chamber to provide an axially symmetric magnetic field therein, said solenoid including at least two solenoid segments disposed to provide spaced, gradientially-intensified reflector closure field having an intensity ratio greater than about 2 with respect to said axial field regions in said magnetic field defining therebetween a containment zone for energetic charged particles, ion source means disposed to direct space charge neutralized beams of energetic light nuclide ions axially into said reflector field regions, and power supply means adapted to energize said solenoid and solenoid segments in synchronism with emission of ions from said ion source, whereby such ions are introduced and trapped to form a plasma in said containment zone.

24. In a Pyrotron, the combination comprising an elongated vacuum chamber pervious to magnetic fields, vacuum pump and cold trap means adapted to evacuate said chamber, means including a solenoid disposed about said chamber to provide an axially symmetric magnetic field therein, said solenoid including at least two solenoid segments disposed to provide spaced, gradientially-intensified reflector closure field regions in said magnetic field defining therebetween a containment zone for energetic particles, ion source means disposed to direct a space charge neutralized quantity of energetic light nuclide fuel ions axially into said reflector field regions, and power supply means adapted to energize said solenoid and solenoid segments in synchronism with emission of ions from said ion source, whereby such ions are introduced and trapped as a plasma in said containment zone.

25. In a Pyrotron, the combination comprising an elongated vacuum chamber pervious to magnetic fields, means for evacuating said chamber, means including a solenoid having terminally disposed segments of increased effective ampere turns for providing an axially symmetric magnetic field with spaced, gradientially-intensified reflector closure field regions establishing a containment zone in said chamber on energization thereof, ion source means for producing and accelerating energetic light nuclide fuel ions as a pulsed, space charge neutralized beam axially into said reflector regions, and power supply means including a high current capability power source, switching means for applying current from said source to said solenoid in synchronism with pulsing of said ion source and switching means adapted to draw off reversal current from said solenoid thereby to permit the magnetic field to decay subsequent to application of the energization current.

26. In a Pyrotron, the combination comprising an elongated vacuum chamber pervious to magnetic fields and having an electrically conductive inner lining, means for evacuating said chamber, means including a solenoid having terminally disposed segments of increased effective ampere turns for providing an axially symmetric magnetic field with spaced, gradientially-intensified reflector closure field regions establishing a containment zone in said chamber on energization thereof, magnetic shield means including a flanged metallic cylindrical section disposed about said solenoid and terminal annular metallic flange plates attached thereto and disposed proximally outward from said solenoid segments, ion source means for producing an accelerating energetic light nuclide fuel ions partially at least by applying an electrostatic voltage gradient between the emission surface of said ion source and said conductive chamber lining as a pulsed, space charge neutralized beam axially into said reflector regions, and power supply means including a high current capability power source, switching means for applying current from said source to said solenoid in synchronism with pulsing of said ion source and switching means adapted to draw off reversal current from said solenoid thereby to permit the magnetic field to decay subsequent to application of the energization current.

27. In a Pyrotron, the combination comprising an elongated vacuum chamber pervious to magnetic fields and provided with a conductive inner lining, means for evacuating said chamber, a solenoid disposed to establish a plasma containment zone by providing an axially symmetric magnetic field having a linear central region of about 15 kilogauss intensity in said chamber, said solenoid being constructed with more terminally effective ampere turns relative to central regions whereby gradientially-intensified reflector field closure regions of said zone having a peak intensity of about 30 kilogauss are provided in said axially symmetric field, pulsed ion source means adapted to direct a space charge neutralized quantity of light nuclide ions into said reflector fields with acceleration provided by an electrostatic voltage gradient established between said ion source and conductive chamber lining, and power supply means including a high current capability power source, switching means adapted to apply energizing current from said source to said solenoid, variable delay means actuable subsequent to application of said current to the solenoid to pulse said ion source and discharge means switchable across said solenoid to draw off reversal current flow from said solenoid.

28. The reactor as described in claim 27 wherein means are coupled across said solenoid for eliminating transients and damping and stabilizing the solenoid circuit.

29. The reactor as described in claim 27 wherein said switching means comprise ignitrons.

30. The reactor as described in claim 27 wherein said switching means comprise at least one ignitron and said solenoid discharge means comprises an ignitron coupled across said solenoid having a diode connected from anode to the igniter electrode.

References Cited by the Examiner

UNITED STATES PATENTS

| | | | |
|---|---|---|---|
| 1,816,682 | 7/31 | Langmuir | 313—161 X |
| 1,844,420 | 2/32 | Buttolph | 313—161 |
| 2,299,792 | 10/42 | Bouwers et al. | 315—4 |
| 2,330,849 | 10/43 | Smith | 313—174 |
| 2,473,477 | 6/49 | Smith | 313—62 |
| 2,489,436 | 11/49 | Salisbury | 313—174 |
| 2,510,448 | 6/50 | Wideroe | 313—62 |
| 2,615,128 | 10/52 | Ruderfer | 313—62 |
| 2,910,414 | 10/59 | Spitzer et al. | 176—1 |
| 2,993,851 | 7/61 | Thomson et al. | 176—2 |
| 3,015,748 | 1/62 | Hartwig et al. | 176—7 X |
| 3,052,617 | 9/62 | Post | 176—9 |
| 3,113,082 | 12/63 | Imhoff et al. | 176—10 |
| 3,117,912 | 1/64 | Imhoff et al. | 176—7 X |
| 3,120,470 | 2/64 | Imhoff et al. | 176—7 X |
| 3,120,476 | 2/64 | Post | 176—7 X |

CARL D. QUARFORTH, *Primary Examiner.*

ROGER L. CAMPBELL, WILILAM G. WILES, *Examiners.*